US011821142B2

(12) United States Patent
Boswell et al.

(10) Patent No.: US 11,821,142 B2
(45) Date of Patent: Nov. 21, 2023

(54) METHODS OF PRODUCING BIODEGRADABLE AND RECYCLABLE BARRIER PAPER LAMINATE

(71) Applicant: The Procter & Gamble Company, Cincinnati, OH (US)

(72) Inventors: Emily Charlotte Boswell, Cincinnati, OH (US); Uwe Bolz, Tutzing (DE); Patti Jean Kellett, Cincinnati, OH (US); James Terry Knapmeyer, Cincinnati, OH (US); Pier-Lorenzo Caruso, Frankfurt am Main (DE); Lee Mathew Arent, Fairfield, OH (US); John Moncrief Layman, Liberty Township, OH (US); Jack Alan Hunter, Springboro, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 224 days.

(21) Appl. No.: 17/495,836

(22) Filed: Oct. 7, 2021

(65) Prior Publication Data

US 2022/0112664 A1 Apr. 14, 2022

Related U.S. Application Data

(60) Provisional application No. 63/089,601, filed on Oct. 9, 2020.

(51) Int. Cl.
| | | |
|---|---|---|
| *D21H 19/12* | (2006.01) | |
| *D21H 19/82* | (2006.01) | |
| *D21H 19/22* | (2006.01) | |
| *D21H 27/06* | (2006.01) | |

(52) U.S. Cl.
CPC ........... *D21H 19/824* (2013.01); *D21H 19/12* (2013.01); *D21H 19/22* (2013.01); *D21H 27/06* (2013.01)

(58) Field of Classification Search
CPC ............ D21H 9/12; D21H 9/22; D21H 27/06; D21H 19/82; D21H 27/10; B32B 27/10; B32B 29/00
USPC ....................................................... 162/137
See application file for complete search history.

(56) References Cited

U.S. PATENT DOCUMENTS

| | | | |
|---|---|---|---|
| 3,804,785 A | 4/1974 | Hijiya et al. | |
| 4,152,387 A | 5/1979 | Cloeren | |
| 4,197,069 A | 4/1980 | Cloeren | |
| 4,521,437 A | 6/1985 | Storms | |
| 4,765,916 A | 8/1988 | Ogar, Jr. et al. | |
| 4,846,992 A | 7/1989 | Fonsny et al. | |
| 5,391,423 A | 2/1995 | Wnuk et al. | |
| 5,498,692 A | 3/1996 | Noda | |
| 5,939,467 A | 8/1999 | Wnuk et al. | |
| 6,293,402 B1 | 9/2001 | Rogers et al. | |
| 6,509,072 B2 | 1/2003 | Bening et al. | |
| 6,966,166 B2 | 11/2005 | Kissling | |
| 8,007,895 B2 | 8/2011 | Ebina et al. | |
| 8,129,042 B2 | 3/2012 | Oosaki et al. | |
| 2001/0054567 A1 | 12/2001 | Desmarais et al. | |
| 2002/0127358 A1 | 9/2002 | Berlin et al. | |
| 2004/0126514 A1 | 7/2004 | Mcgee et al. | |
| 2006/0088707 A1 | 4/2006 | Oosaki et al. | |
| 2006/0222797 A1 | 10/2006 | Bekele | |
| 2006/0258553 A1 | 11/2006 | Catalfamo et al. | |
| 2007/0106005 A1 | 5/2007 | Bourgeois | |
| 2007/0178299 A1 | 8/2007 | Verrall | |
| 2008/0009585 A1 | 1/2008 | Catalfamo | |
| 2008/0038560 A1 | 2/2008 | Knoerzer et al. | |
| 2008/0108748 A1 | 5/2008 | Buckley | |
| 2009/0286090 A1 | 11/2009 | Ting et al. | |
| 2011/0135912 A1 | 6/2011 | Xu | |
| 2011/0293957 A1 | 12/2011 | Johansson et al. | |
| 2012/0117921 A1 | 5/2012 | Toft et al. | |
| 2012/0216718 A1 | 8/2012 | Berglund et al. | |
| 2012/0288693 A1 | 11/2012 | Stanley et al. | |
| 2014/0099455 A1 | 4/2014 | Stanley et al. | |
| 2014/0329039 A1 | 11/2014 | Neuman et al. | |
| 2014/0349047 A1 | 11/2014 | Mccaffrey et al. | |
| 2014/0376835 A1 | 12/2014 | Rogers et al. | |
| 2015/0376450 A1 | 12/2015 | Beyer et al. | |
| 2016/0230343 A1 | 8/2016 | Pang et al. | |
| 2017/0021995 A1 | 1/2017 | Corbett et al. | |
| 2020/0079922 A1 | 3/2020 | Fuchs et al. | |
| 2020/0269554 A1 | 8/2020 | Noda et al. | |
| 2020/0317413 A1 | 10/2020 | Fortin | |
| 2021/0245481 A1 | 8/2021 | Nyflött et al. | |
| 2021/0316919 A1 | 10/2021 | James et al. | |
| 2023/0087382 A1 | 3/2023 | Vishtal et al. | |

FOREIGN PATENT DOCUMENTS

| | | | |
|---|---|---|---|
| EP | 0457600 B1 | 9/1996 | |
| JP | 2005011783 A | 1/2005 | |
| JP | 2020066216 A | 4/2020 | |
| WO | 9426513 A1 | 11/1994 | |
| WO | 9605054 A1 | 2/1996 | |
| WO | 9809812 A1 | 3/1998 | |

(Continued)

OTHER PUBLICATIONS

All Office Actions; U.S. Appl. No. 17/182,265, filed Feb. 23, 2021.
All Office Actions; U.S. Appl. No. 17/386,584, filed Jul. 28, 2021.
All Office Actions; U.S. Appl. No. 17/386,586, filed Jul. 28, 2021.
All Office Actions; U.S. Appl. No. 17/495,832, filed Oct. 7, 2021.
All Office Actions; U.S. Appl. No. 17/386,590, filed Jul. 28, 2021.
U.S. Appl. No. 17/182,265, filed Feb. 23, 2021, to Martin Ian James et. al.
U.S. Appl. No. 17/386,584, filed Jul. 28, 15, 2021, to Pier-Lorenzo Caruso et. al.
U.S. Appl. No. 17/386,586, filed Jul. 28, 2021, to Emily Charlotte Boswell et. al.

(Continued)

*Primary Examiner* — Mark Halpern
(74) *Attorney, Agent, or Firm* — Kathleen Y. Carter; James E. Oehlenschlager

(57) ABSTRACT

Methods for producing biodegradable and recyclable barrier paper laminate comprising an inorganic barrier layer against permeation.

15 Claims, 9 Drawing Sheets

(56) References Cited

FOREIGN PATENT DOCUMENTS

| WO | 2007027027 A1 | 3/2007 |
|----|---------------|--------|
| WO | 2007027224 A2 | 3/2007 |
| WO | 2008053379 A2 | 5/2008 |
| WO | 2009032868 A1 | 3/2009 |
| WO | 2017072124 A1 | 5/2017 |
| WO | 2018031388 A1 | 2/2018 |
| WO | 2018108687 A1 | 6/2018 |
| WO | 2019229759 A1 | 12/2019 |

OTHER PUBLICATIONS

U.S. Appl. No. 17/386,590, filed Jul. 28, 2021, to Emily Charlotte Boswell et. al.
U.S. Appl. No. 17/495,832, filed Oct. 7, 2021, to Emily Charlotte Boswell et. al.
15897MQ PCT Search Report and Written Opinion for PCT/US2021/071756 dated Feb. 4, 2022, 12 pages.

METHODS OF PRODUCING BIODEGRADABLE AND RECYCLABLE BARRIER PAPER LAMINATE

FIELD OF THE INVENTION

The present invention relates to methods for producing biodegradable and recyclable barrier paper laminate for flexible package applications or product delivery systems such as sachets, pouches, bags, comprising a biodegradable and recyclable paper layer combined with a biodegradable polymeric layer, biodegradable primer layers, an inorganic barrier layer and a biodegradable polymeric sealing layer offering several advantages compared to prior-art paper based flexible packages.

BACKGROUND OF THE INVENTION

Paper based packaging is becoming more popular amongst consumers because it is regarded as more natural, more biodegradable and more recyclable. However, the barrier properties of uncoated paper are poor and attempts to improve the barrier properties by adding a coating often lead to reduction in the ability of the paper to biodegrade in various environments and also reduce the ability of the package to be recyclable in commercial paper recycling systems.

Uncoated paper-based packaging is typically highly biodegradable in certain environments and is very easily recyclable in commercial paper recycling systems. However, a paper with no coating or adhesive at all cannot easily be formed into a complete functional package. Also, uncoated paper-based packaging can only be used to contain dry products that do not require any type of water/moisture or gas or perfume or grease barrier. If the product is sensitive to moisture, it will be damaged by moisture entering the package very quickly. If it is sensitive to oxygen, it will oxidize. If the product is greasy then grease will migrate through the paper and leave unsightly stains on the outside of the package. If the product contains perfume, then perfume will escape out of the package and change the nature of the intended odor of the product. If the product contains any moisture it would cause the uncoated paper to soften. However, if a coating is added to the paper to improve the barrier properties and/or to make it sealable, in the event of improper disposal, it is desirable that the coating is not affecting the ability of the entire package to biodegrade across a range of the most expected environmental conditions. Failure to degrade may have adverse environmental effects such as persistent micro-plastics in seawater. In addition, when adding a coating one must be very careful to avoid negatively affecting the ability of the package to be recyclable in commercial paper recycling systems.

A common way to solve the poor barrier properties of paper and make it sealable is to add a polyethylene-based, or ethylene copolymer based or other non-biodegradable polymeric coating to the surface of the paper, either by coating, printing or lamination. However, if this polyethylene coating is too thick, it will negatively affect the recyclability of the paper laminate in typical commercial paper recycling systems. There are many examples where polyethylene coatings have caused issues in the paper recycling processes, especially where thicker coatings were used to increase seal strength and/or increase barrier properties. Examples of such issues are, but are not limited to: i) coatings that clog the filters in repulping tanks and systems; ii) coatings that hold tightly onto the paper fibers and prevent a high % of the paper fibers being released into the water of the repulping system; iii) coatings that end up being incorporated into the recycled paper and negatively affect the appearance or performance properties of the resulting recycled paper.

If such a polyethylene coating is made very thin, the overall structure might be considered recyclable in the paper recycling stream if it can be stripped off and sent to a landfill or burned to fuel the plant, leaving the paper fibers to be collected and recycled into paper. However, such a structure still has several disadvantages because if it is improperly disposed of in the environment, the paper would biodegrade, but the polyethylene coating would not biodegrade. The polyethylene layer would instead form persistent microplastics that would negatively impact the environment, appearing as a non-nutritive food source for some animals. Furthermore, many consumers notice the appearance of the shiny polyethylene layer on the inner surface of the paper laminate and react negatively to it as a non-natural material. A polyethylene coating would also adversely affect the ability of the package to be composted, either via industrial or home composting, unless the polyethylene coating could easily and reliably be removed by a consumer prior to composting.

If conversely, biodegradable polymers are used for the coating instead of polyethylene, it is well known that the barrier properties of biodegradable materials are poor against moisture. Such a biodegradable polymeric coating would necessarily be very thick, causing issues in the paper recycling process.

There is therefore an unmet need for paper laminates for flexible packaging applications, provided with a moisture barrier and a sealant layer, with reduced environmental impact in environments such as soil and aquatic environments and in composting situations and which also enable increased recycling efficiency in industrial paper repulping systems.

SUMMARY OF THE INVENTION

A biodegradable and recyclable barrier paper laminate that is compatible with home or industrial composting facilities is provided that is biodegradable if improperly disposed in the environment and is recyclable in industrial paper recycling facilities (if collected).

A method of making to produce the first biodegradable and recyclable barrier paper laminate is provided that comprises the following steps: applying a first aqueous system of a water-borne biodegradable polymeric composition onto the inner surface of a biodegradable and recyclable paper layer, said paper layer is preferably machine glazed and/or sized or is a vellum or glassine paper to avoid hydroexpansion; removing the water from the first aqueous system of a water-borne biodegradable polymeric composition to obtain a first biodegradable polymeric layer; applying a first liquid system of a biodegradable primer composition onto the inner surface of the first biodegradable polymeric layer; removing any liquid from the first system of a water-borne biodegradable primer composition to obtain a first biodegradable primer layer; applying a vapor deposited continuous layer of an inorganic barrier onto the inner surface of the first biodegradable primer layer; applying a second liquid system of a biodegradable primer composition onto the inner surface of the vapor deposited inorganic barrier layer; removing the liquid from the second aqueous system of a biodegradable primer composition to obtain a second biodegradable primer layer; applying a second aqueous system of a water-borne biodegradable polymeric composition onto the inner surface of the biodegradable primer layer; removing the water from the second aqueous system of the water-borne biodegradable polymeric composition to obtain a second biodegradable polymeric layer. For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble.

A method of producing a biodegradable barrier paper laminate is provided that comprises the following steps: applying a first aqueous system of a water-borne biodegradable polymeric composition onto the inner surface of the biodegradable paper layer, said paper layer is preferably machine glazed and/or sized or is a vellum or glassine paper to avoid hydro-expansion; removing the water from the first aqueous system of a water-borne biodegradable polymeric composition to obtain a first biodegradable polymeric layer; applying a first liquid system of a biodegradable primer composition onto the inner surface of the first biodegradable polymeric layer; removing the liquid from the first system of a biodegradable primer composition to obtain a first biodegradable primer layer; applying a vapor deposited continuous inorganic barrier layer onto the inner surface of the first biodegradable primer layer; applying a second liquid system of a biodegradable primer composition onto the inner surface of the vapor deposited inorganic barrier layer; removing the liquid from the second system of a biodegradable primer composition to obtain a second biodegradable primer layer; melting a second biodegradable polymeric composition within an extruder; thermally extruding the molten second biodegradable polymeric composition onto the surface of the second biodegradable primer layer; cooling the second biodegradable polymeric composition to form the second biodegradable polymeric layer. For cases where the water-borne biodegradable polymeric composition or primer composition is not water-soluble, an additional step is normally required to heat the biodegradable polymeric composition in order to melt it and to allow it to form a continuous biodegradable polymeric layer—this heating step is not normally not needed in the case that the biodegradable polymeric composition is water-soluble.

A method of producing a biodegradable barrier paper laminate is provided that comprises the following steps: applying a first aqueous system of a water-borne biodegradable polymeric composition onto the inner surface of the biodegradable and recyclable paper layer, said paper layer is preferably machine glazed and/or sized or is a vellum or glassine paper to avoid hydro-expansion; removing the water from the first aqueous system of the water-borne biodegradable polymeric composition to obtain a first biodegradable polymeric layer; applying a first aqueous system of a liquid biodegradable primer composition onto the inner surface of the first biodegradable polymeric layer; removing the liquid from the first system of a biodegradable primer composition to obtain a first biodegradable primer layer; applying a vapor deposited continuous inorganic barrier layer onto the inner surface of the first biodegradable primer layer; applying a second liquid system of a biodegradable primer composition onto the inner surface of the inorganic barrier layer; removing the water from the second system of a biodegradable primer composition to obtain a second biodegradable primer layer; separately obtaining a film made from a biodegradable polymeric composition that can be made by a variety of methods including solution casing, thermal cast film extrusion and thermal blown film extrusion; applying said film made from a biodegradable polymeric composition onto the surface of the second biodegradable primer layer and heat laminating them together. For cases where the water-borne biodegradable polymeric composition or primer composition is not water-soluble, an additional step is normally required to heat the biodegradable polymeric composition in order to melt it and to allow it to form a continuous biodegradable polymeric layer—this heating step is not normally needed in the case that the biodegradable polymeric composition is water-soluble.

BRIEF DESCRIPTION OF THE DRAWINGS

FIG. 7A) shows a cross-sectional image obtained via normal scanning electron microscopy and FIG. 7B) shows a cross sectional image using scanning electron microscopy combined with energy-dispersive X-rays spectroscopy of one embodiment of a biodegradable and recyclable barrier paper laminate.

DETAILED DESCRIPTION OF THE INVENTION

Figure 1:
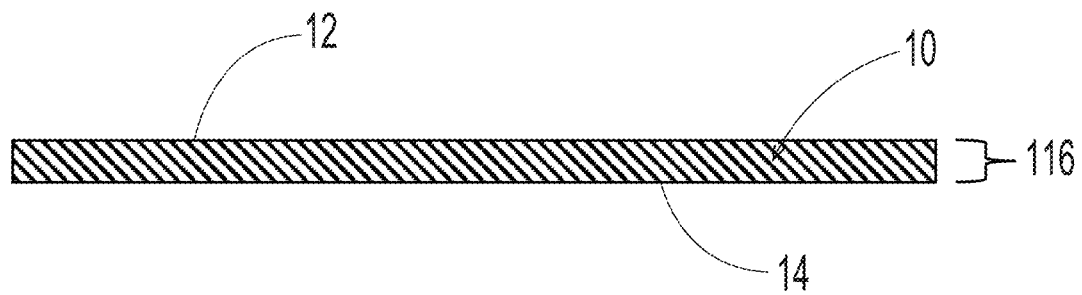
FIG. 1 shows a cross-section of an uncoated biodegradable and recyclable paper layer 10.

The invention describes a biodegradable and recyclable barrier paper laminate offering several advantages compared to prior art barrier paper laminates, and several methods for making biodegradable and recyclable barrier paper laminates.

As used herein, the term "water vapor transmission rate" or "WVTR" refers to the rate at which water vapor is transmitted through a film or substrate, when measured according to the Water Vapor Transmission Test Method set forth in the Test Methods section.

As used herein, the term "oxygen transmission rate" or "OTR" refers to the rate at which water vapor is transmitted through a film or substrate, when measured according to the Oxygen Transmission Test Method set forth in the Test Methods section.

As used herein, the term "dissolution time" refers to the time required for a water-soluble film (such as a film made of a polymeric vinyl alcohol) to be dissolved, when measured according to the Dissolution Test Method set forth in the Test Methods section.

As used herein, the term "water-dispersible" means breaking apart in water in small fragments smaller than a millimeter. These fragments can, but do not need to be stably suspended in water.

As used herein, the term "copolymer" means a polymer formed from two, or more, types of monomeric repeating units. The term "copolymer" as used herein further encompasses terpolymers, such as terpolymers having a distribution of vinyl alcohol monomer units, vinyl acetate monomer units, and possibly butene diol monomer units; however, if the copolymer is substantially fully hydrolyzed, substantially no vinyl acetate monomeric units may be present.

As used herein, the term "degree of hydrolysis" refers to the mole percentage of vinyl acetate units that are converted to vinyl alcohol units when a polymeric vinyl alcohol is hydrolyzed.

As used herein, when the term "about" modifies a particular value, the term refers to a range equal to the particular value, plus or minus twenty percent (+/−20%). For any of the embodiments disclosed herein, any disclosure of a particular value, can, in various alternate embodiments, also be understood as a disclosure of a range equal to about that particular value (i.e. +/−20%).

As used herein, when the term "approximately" modifies a particular value, the term refers to a range equal to the particular value, plus or minus fifteen percent (±15%). For any of the embodiments disclosed herein, any disclosure of a particular value, can, in various alternate embodiments, also be understood as a disclosure of a range equal to approximately that particular value (i.e. ±15%).

As used herein, when the term "substantially" modifies a particular value, the term refers to a range equal to the particular value, plus or minus ten percent (±10%). For any of the embodiments disclosed herein, any disclosure of a particular value, can, in various alternate embodiments, also be understood as a disclosure of a range equal to approximately that particular value (i.e. ±10%).

As used herein, when the term "nearly" modifies a particular value, the term refers to a range equal to the particular value, plus or minus five percent (±5%). For any of the embodiments disclosed herein, any disclosure of a particular value, can, in various alternate embodiments, also be understood as a disclosure of a range equal to approximately that particular value (i.e. ±5%).

The embodiments described below are for illustration purposes and should not be used to limit the scope of invention.

FIG. 1 shows a cross-section of a biodegradable and recyclable paper layer 10. The biodegradable and recyclable paper layer 10 has a first surface 12 and a second surface 14 opposite to the first surface 12, a thickness 116 between the surfaces 12 and 14, and a basis weight obtained from the thickness 116 and the paper density. It is preferred the surface of the paper that will be coated should be substantially flat as possible in order to achieve optimal barrier properties once the rest of the structure's layers are added.

The basis weight of the biodegradable and recyclable paper layer 10 can range from about 20 $g/m^2$ to about 200 $g/m^2$, preferably from about 40 $g/m^2$ to about 120 $g/m^2$, more preferably from about 50 $g/m^2$ to about 100 $g/m^2$ and more preferably from about 60 $g/m^2$ to about 85 $g/m^2$.

There are some cases where it may be desirable to apply this invention to carton-board that is a thick paper in the thickness range 200 g/m2 to 1000 g/m2. In such cases, the biodegradable and recyclable paper layer chosen will typically be thick enough to be considered carton-board rather than paper, especially if it is thicker than 200 g/m2. In other cases, a biodegradable and recyclable barrier paper laminate that was formed on a biodegradable and recyclable paper layer that is ≤200 g/m2·day may later be laminated (once constructed) to a carton-board layer that is ≥200 g/m2 in order to create a carton-board structure that has high barrier resistance.

Figure 2:
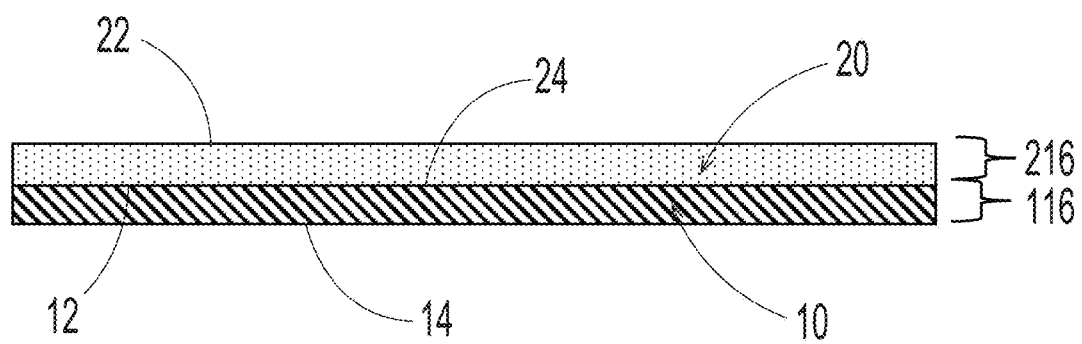
FIG. 2 shows a cross-section of a first biodegradable polymeric layer 20 coated onto a biodegradable and recyclable paper layer 10.

FIG. 2 shows a cross-section of a first biodegradable polymeric layer 20 having a first surface 22 and a second surface 24 opposite the first surface 22, and a thickness 216 between the first surface 22 and the second surface 24, applied to substantially cover at least one of the first surface 12 or the second surface 14 of the biodegradable paper layer 10.

The thickness 216 of the first biodegradable polymeric layer 20 coated onto the biodegradable and recyclable paper layer can range from about 1 µm to about 100 µm, preferably from about 3 µm to about 50 µm, more preferably from about 1 µm to about 10 µm, even more preferably between 5 µm to about 15 µm.

The biodegradable polymeric layer 20 comprises at least one biodegradable polymer. Depending on the application, the biodegradable polymer can be either water-soluble or water in-soluble. If it is chosen to be water-soluble, the biodegradable polymer(s) can be selected from among available options to dissolve in water at 23° C. temperature within seconds, or minutes, or hours. A biodegradable polymer requiring more than 24 hours to dissolve in water at 23° C. temperature will not be considered as water-soluble.

Figure 3:
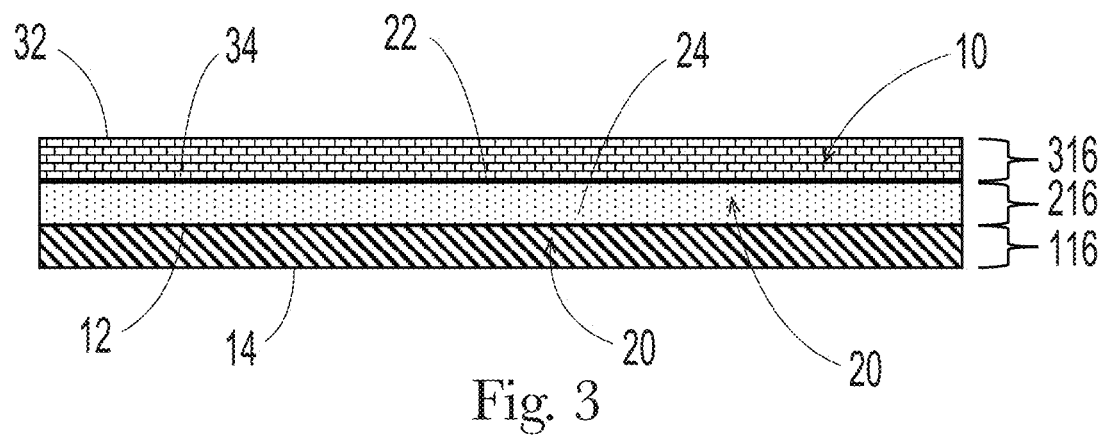
FIG. 3 shows a cross-section of a first biodegradable primer layer 30 coated onto a first biodegradable polymeric layer 20 coated onto a biodegradable and recyclable paper layer 10.

FIG. 3 shows a cross-section of a first biodegradable primer layer 30 having a first surface 32 and a second surface 34 opposite the first surface 32, and a thickness 316 between the first surface 32 and the second surface 34, applied to substantially cover at least one of the first surface 22 or the second surface 24 of the biodegradable polymeric layer 20. The first biodegradable polymeric layer 20 having a first surface 22 and a second surface 24 opposite the first surface 22, and a thickness 216 between the first surface 22 and the second surface 24, applied to substantially cover at least one of the first surface 12 or the second surface 14 of the biodegradable and recyclable paper layer 10.

The thickness of the biodegradable primer layer 30 ranges from about 0.1 µm to about 30 µm, preferably from about 0.2 µm to about 15 µm, more preferably from about 0.5 µm to about 7 µm.

The importance of the biodegradable primer layer is to flatten out the base structure consisting of the biodegradable polymeric layer lying on top of the biodegradable and recyclable paper layer, in order to maximize the properties of the inorganic barrier layer which will be laid on top of it. It is also important that it is easy for the inorganic barrier layer to deposit and stick to the biodegradable primer layer. We have found that if a biodegradable primer layer is not used and the inorganic barrier layer is placed directly onto the polymeric layer alone, then the barrier properties achieved will be up to two orders of magnitude worse than if the biodegradable primer layer was not used. This is despite the fact that the biodegradable primer layer itself has little inherent barrier resistance when tested alone. Depending on the exact application of the structure, the biodegradable primer layer can be based on a hybrid inorganic-organic chemistry; or it can be based on an organic chemistry alone.

Figure 4:
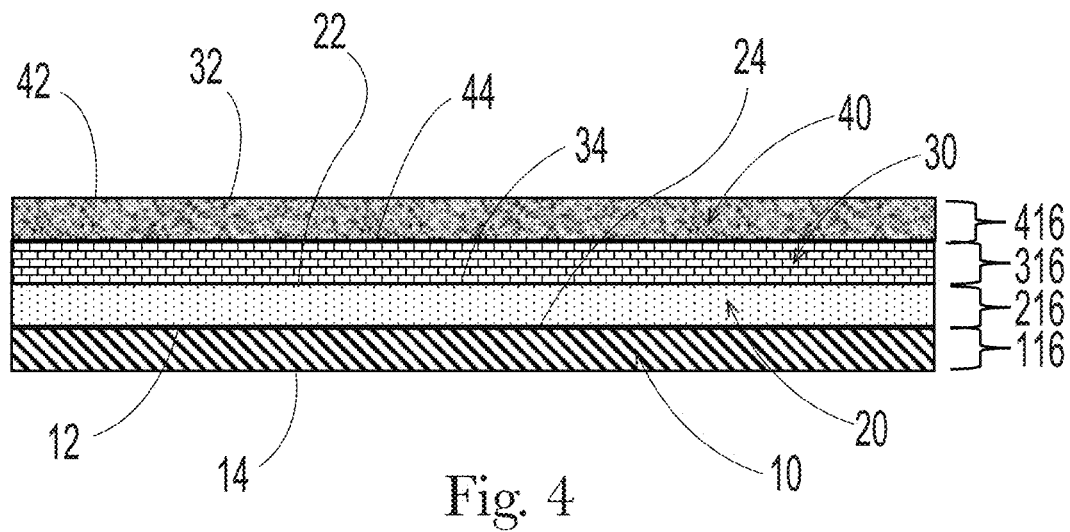
FIG. 4 shows a cross-section of an inorganic barrier layer 40 coated onto a biodegradable primer layer 30 coated onto a biodegradable polymeric layer 20 coated onto a biodegradable and recyclable paper layer 10.

FIG. 4 shows a cross-section of an inorganic barrier layer 40 with a first surface 42 and a second surface 44, opposite to the first surface 42 and a thickness 416 between the first surface 42 and the second surface 44, substantially covering the surface 32 of the biodegradable primer layer 30. The first biodegradable primer layer 30 having a first surface 32 and a second surface 34 opposite the first surface 32, and a thickness 316 between the first surface 32 and the second surface 34, is applied to substantially cover at least one of the first surface 22 or the second surface 24 of the biodegradable polymeric layer 20. The first biodegradable polymeric layer 20 having a first surface 22 and a second surface 24 opposite the first surface 22, and a thickness 216 between the first surface 22 and the second surface 24, is applied to substantially cover at least one of the first surface 12 or the second surface 14 of the biodegradable and recyclable paper layer 10.

The thickness of the inorganic barrier layer 40 ranges from about 2 nm to about 1000 nm, preferably about 10 nm to about 200 nm, more preferably from about 20 nm to about 100 nm.

The inorganic barrier layer is laid down from the vapor phase.

In certain embodiments, suitable vapor-deposited inorganic coatings can be formed of metals. In other embodiments, suitable vapor-deposited inorganic coatings can be formed metal oxides and related compounds.

In certain embodiments, a plasma-assisted chemical vapor deposition process can be used to form the vapor-deposited inorganic coating. In other embodiments, an atomic layer chemical vapor deposition process can alternatively be used. In yet other embodiments, a physical vapor deposition process can alternatively be utilized.

The inorganic barrier layer 40 according to the present invention may be optically opaque, translucent or transparent, depending on the specific chemistry applied. Typically, a metal barrier layer such as aluminum would result in an opaque barrier, whereas a metal oxide barrier such as aluminum oxide or silicon dioxide would results in a transparent barrier.

Preferably, the inorganic barrier layer 40 is somewhat flexible. When converting the paper-based structure through a line for printing, sheeting, slitting, rewinding and other typical converting operations, or when making articles such as pouches, comprising the biodegradable barrier paper laminate, the entire biodegradable barrier paper laminate structure is typically folded, bent and sometimes stretched slightly. This can cause some barrier layers to break which could reduce their performance as a barrier. It is thus preferred that the barrier layer 40 is somewhat flexible and can be stretched without breaking, as the rest of the structure is stretched. Preferably, the barrier layer 40 can be elongated at least 1%, at least 2%, at least 5%, as the underlying biodegradable paper layer, biodegradable polymeric layers and biodegradable primer layers stretch. In some cases, it may be desired for the barrier layer to stretch as much as 10% or even as much as 20%, without breaking. Typically, metal barrier layers such as aluminum would have somewhat more flexibility than metal oxide barrier layers, such as aluminum oxide or silicone dioxide. In one embodiment, this is achieved by splitting the inorganic barrier layer into multiple distinct inorganic barrier sublayers separated by multiple distinct biodegradable polymeric sublayers.

Figure 5:
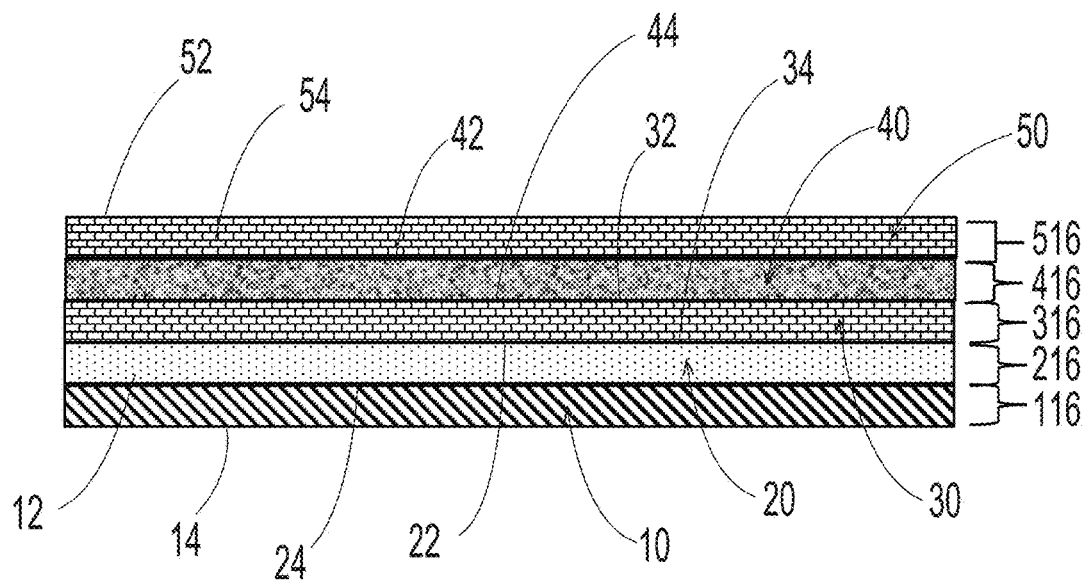
FIG. 5 shows a cross-section of a second biodegradable primer layer 50 coated onto an inorganic barrier layer 40 coated onto a first biodegradable primer layer 30 coated onto a first biodegradable polymeric layer 20 coated onto a biodegradable and recyclable paper layer 10.

FIG. 5 shows a second biodegradable primer layer 50 with a first surface 52 and a second surface 54, opposite to the first surface 52 and a thickness 516 between the first surface 52 and the second surface 54 and substantially covers the surface 42 of the inorganic barrier layer 40; an inorganic barrier layer 40 with a first surface 42 and a second surface 44, opposite to the first surface 42 and a thickness 416 between the first surface 42 and the second surface 44, substantially covering the surface 32 of the biodegradable primer layer 30; the first biodegradable primer layer 30 having a first surface 32 and a second surface 34 opposite the first surface 32, and a thickness 316 between the first surface 32 and the second surface 34, is applied to substantially cover at least one of the first surface 22 or the second surface 24 of the biodegradable polymeric layer 20; the first biodegradable polymeric layer 20 having a first surface 22 and a second surface 24 opposite the first surface 22, and a thickness 216 between the first surface 22 and the second surface 24, is applied to substantially cover at least one of the first surface 12 or the second surface 14 of the biodegradable and recyclable paper layer 10.

The thickness of the second biodegradable primer layer 50 between the first surface 52 and the second surface 54 ranges from about 0.1 µm to about 30 µm, preferably from about 0.2 µm to about 15 µm, more preferably from about 0.5 µm to about 7 µm.

Figure 6:
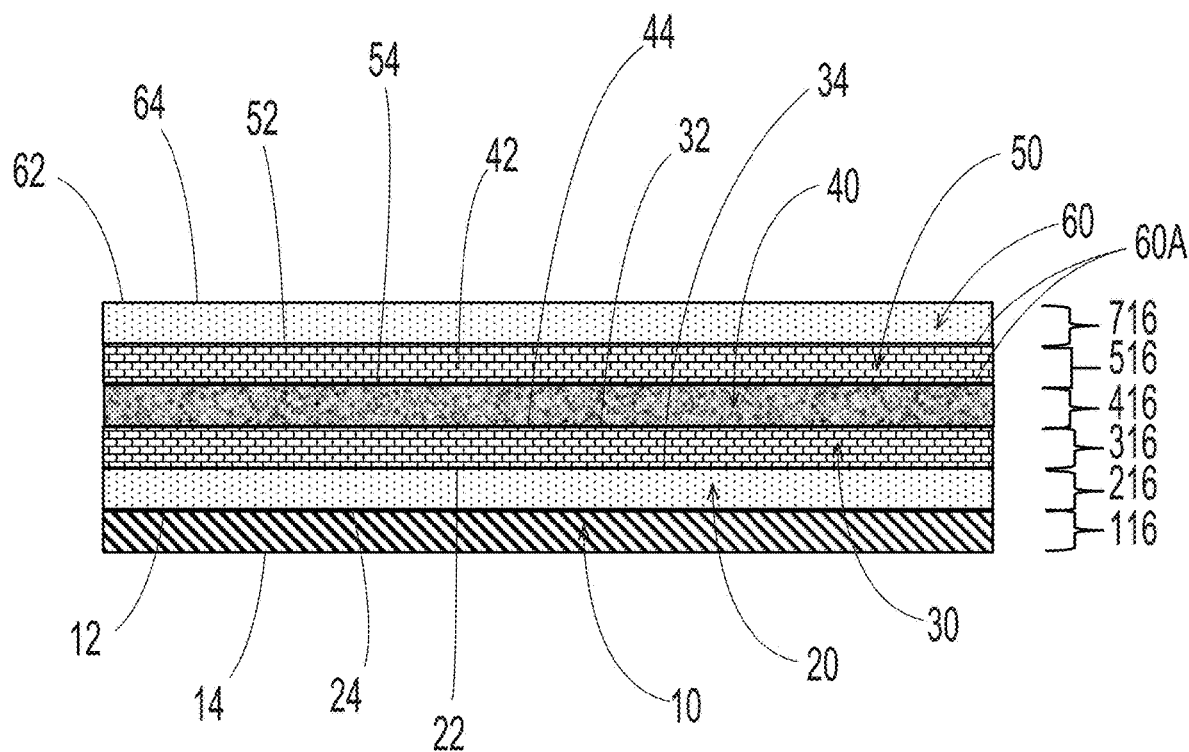
FIG. 6 shows a cross-section of one embodiment of a complete biodegradable barrier paper laminate according to the present invention which consists of a second biodegradable polymer layer 60 coated onto a second biodegradable primer layer 50 coated onto an inorganic barrier layer 40 coated onto a first biodegradable primer layer 30 coated onto a first biodegradable polymeric layer 20 coated onto a biodegradable and recyclable paper layer 10.

FIG. 6 shows a cross-section of a full biodegradable and recyclable barrier paper laminate structure —150—with multiple layers. The structure comprises a biodegradable paper layer 10 having a first surface 12 and a second surface 14 opposite to the first surface 12 and a thickness 116 between the first surface 12 and the second surface 14. To the biodegradable paper layer is attached a first biodegradable polymeric layer 20 with a first surface 22 and a second surface 24, opposite to the first surface 22 and a thickness 216 between the first surface 22 and the second surface 24 and substantially covers at least one of the first or second surfaces 12, 14 of the paper layer 10. To the first biodegradable polymeric layer is attached a biodegradable primer layer 30 having a first surface 32 and a second surface 34 opposite to the first surface 32 and a thickness 316 between the first surface 32 and the second surface 34 and substantially covers the second surface 24 of the biodegradable polymeric layer 20. To the first biodegradable primer layer is attached an inorganic barrier layer 40 with a first surface 42 and a second surface 44, opposite to the first surface 42 and a thickness 416 between the first surface 42 and the second surface 44 and substantially covers the surface 32 of the biodegradable primer layer 30. To the inorganic barrier layer 40 is attached a second biodegradable primer layer 50 with a first surface 52 and a second surface 54, opposite to the first surface 52 and a thickness 516 between the first surface 52 and the second surface 54 and substantially covers the surface 42 of the inorganic barrier layer 40. To the biodegradable primer layer 50 is attached a second biodegradable polymeric layer 60 with a first surface 62 and a second surface 64, opposite to the first surface 62 and a thickness 616 between the first surface 62 and the second surface 64 and substantially covers the surface 52 of the biodegradable primer layer 50. This final layer acts as the heat seal layer.

The thickness of the second biodegradable polymeric layer 60 between the first surface 62 and the second surface 64 can range from about 1 μm to about 100 μm, preferably from about 3 μm to about 70 μm, more preferably from about 5 μm to about 35 μm.

The second biodegradable polymeric layer 60 may also comprises at least one biodegradable polymer. Depending on the application, the biodegradable polymer(s) can be selected to be water-soluble or water in-soluble. If the application requires a water-soluble polymer, it can be chosen from among available water-soluble polymer options to dissolve in water at 30° C. temperature within seconds, or minutes, or hours. A polymer requiring more than 24 hours to dissolve in water at 30° C. temperature will not be considered as water-soluble.

Figure 7A:
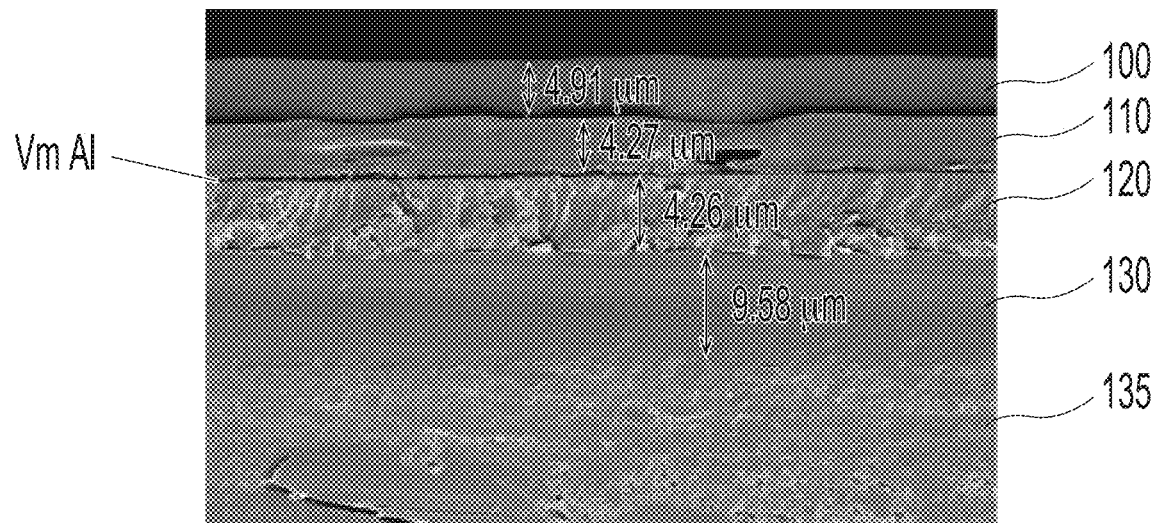
FIGS. 7A and 7B show two cross-sectional images of the biodegradable & recyclable barrier paper laminate 150 obtained via scanning electron microscopy.
Figure 7B:
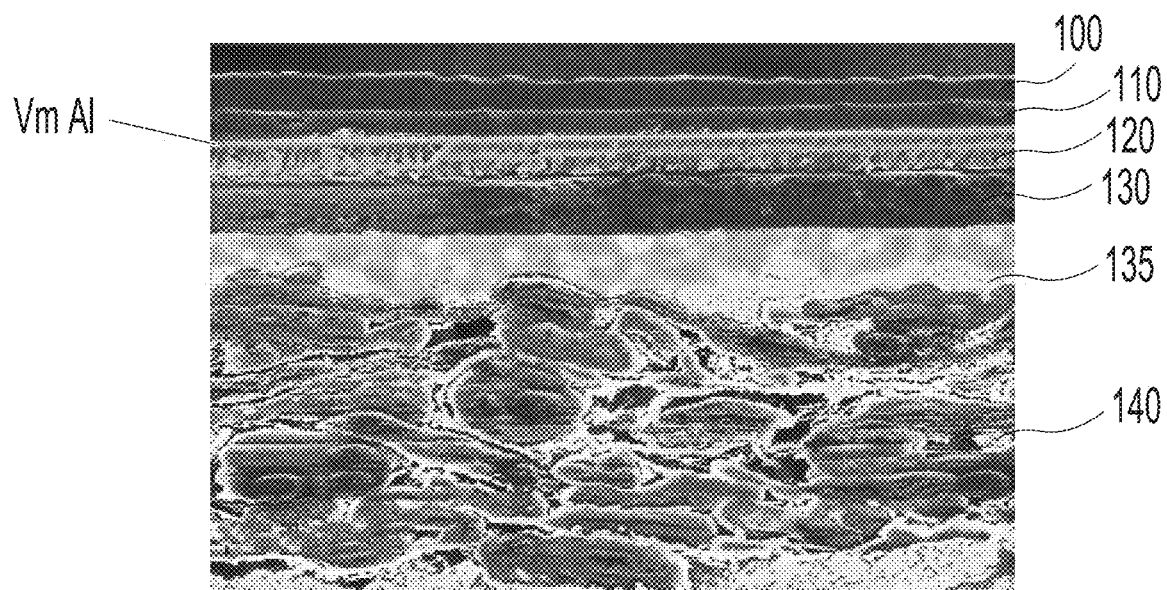

Each layer according to the present invention is distinct and separated from the others. All layers are distinguished by a large composition change over a small distance, creating a sharp boundary that is readily visible by microscopy techniques known in the art. FIG. 7 shows two cross-sectional images of the biodegradable & recyclable barrier paper laminate 150 obtained via scanning electron microscopy. FIG. 7A) shows a cross-sectional image obtained via normal scanning electron microscopy (100 PEO, 110 PVOH Lacquer, 120 bio-ORMOCER, 130 PVOH, 135 Sizing Layer); and FIG. 7B) shows a cross sectional image using scanning electron microscopy combined with energy-dispersive X-rays spectroscopy of one embodiment of a biodegradable and recyclable barrier paper laminate (100 PEO, 110 PVOH Lacquer, 120 bio-ORMOCER, 130 PVOH, 135 Sizing Layer, 140 Packing Paper).

EDX color coding helps to emphasize the difference in chemistry of each layer.

The invention describes nine different embodiments of the biodegradable and recyclable barrier paper laminate. Not every layer outlined for this first embodiment is present in the other eight embodiments described in the invention which are called 250, 350, 450, 550, 650, 750, 850 and 950.

Water-borne polymeric systems can be applied in a variety of methods, which will now be explained. Without being limited to theory, it is believed that the most important processability properties of the aqueous polymeric systems are: a) if the polymer is water-soluble—the solubility of the water-soluble polymer at a given temperature between 20-95° C.; b) if the polymer is not water-soluble—the ability of the polymer to be formed into an emulsion; c) the resulting viscosity of the aqueous water-borne polymeric systems at a given temperature between 20-95° C., with higher viscosities delivering clear distinction between the layers; d) the complete wetting of the aqueous polymeric systems either onto the biodegradable and recyclable paper layer or, if needed by the application, onto the inorganic barrier layer or the biodegradable primer layer.

In some embodiments it is desired that the second biodegradable polymeric layer 60 is applied in the molten state to the second biodegradable primer layer 50 or to the inorganic barrier layer 40. In that case, the biodegradable polymer is first melted in an extruder and then is applied directly to the surface of either the inorganic barrier layer 40, or the biodegradable primer layer 50, using an extrusion coating die.

In some embodiments it is desired that the second biodegradable polymeric layer 60 is first made into free-standing film via a separate process, non-limiting examples being thermal cast extrusion, or thermal blown extrusion or solution casting. In order to attach said film to the surface of either the inorganic barrier layer 40, or the second biodegradable primer layer 50, a biodegradable adhesive 60A is first applied to the inorganic barrier layer 40, or the second biodegradable primer layer 50. The second biodegradable polymeric layer 60 is then brought into contact with the biodegradable adhesive layer 60A to form an adhesive lamination and it then forms the heat seal layer for the biodegradable barrier paper laminate.

In some other embodiments, it is desired that the second biodegradable polymeric layer 60 is first made into free-standing film via a separate process, non-limiting examples being thermal cast extrusion, or thermal blown extrusion or solution casting. In order to attach said film to the surface of either the inorganic barrier layer 40, or the biodegradable primer layer 50, the film is attached to the rest of the substrate via heat lamination.

In some embodiments, it is desired that the second biodegradable polymeric layer 60 or the second biodegradable primer layer 50 are laid down onto a PET film or steel belt—80—for later removal after lamination to the biodegradable & recyclable paper layer 10.

In some embodiments, it is desired that the second biodegradable primer layer 50 or the inorganic barrier layer 40 are laid down onto the surface of an already made second biodegradable polymeric layer 60 (already made via into a free-standing film via a separate process, non-limiting examples being thermal cast extrusion, or thermal blown extrusion or solution casting)—for later lamination to the biodegradable & recyclable paper layer 10.

When working with polymeric compositions that are water-insoluble, the drying process normally needs to be followed by a short heating step in order to form a continuous biodegradable polymeric layer. This can also be true for the liquid composition used to form the biodegradable primer layer.

When the biodegradable and recyclable barrier paper laminate according to the present invention comes into contact with water, the various layers will behave differently depending on their particular nature. The biodegradable & recyclable paper layer will absorb water, swell and break up, releasing the cellulose fibers. The biodegradable polymeric and primer layers that lie on top of the biodegradable & recyclable paper layer could—depending on their exact nature—dissolve, swell, disintegrate and/or separate from other surrounding layers. Where bacteria are also present, the components of the various laminate layers could also be digested by the bacteria. The laminate may come into contact with water during the repulping process of a typical paper recycling plant if collected and recycled. If a laminate was flushed down the drain and/or entered a municipal water treatment plant, or if it was added to a home or industrial composting system, it would also come into contact with water and probably bacteria. If the laminate was improperly littered in municipal waterways, on land (where it experiences damp soil or other material or precipitation), on the top surface of an open dump or if it entered into an aqueous environment such as a stream, a river, a lake or the sea, it could also come into contact with both water and bacteria. In all cases, the inorganic barrier layer will break up harmlessly as the surrounding and supporting laminate layers dissolve and/or disintegrate, no matter whether the waste is preferably managed or improperly littered. If littered, the inorganic barrier layer could disperse as minerals which could potentially enrich soils. Any surface inks and/or varnishes would also biodegrade or disperse harmlessly.

All embodiments of the present invention are compatible with current paper recycling systems, i.e. these embodiments should disintegrate readily when stirred into large volumes of warm water. For typical current industrial repulping facilities, the paper-based package must fall apart within 5-20-minutes of immersion in warm water under constant vigorous stirring and release the paper fibers for collection. There is no currently universal standard globally for determining whether a paper-based laminate is recyclable, due to there being different types of paper recycling systems in different regions and due to different governmental regulations and requirements in different regions. Even within the European Union, different countries have different requirements.

However, in general, the higher the content of natural fibers in the barrier paper laminate and the lower the content of other material (such as barrier coating layers, primer layers and heat seal layers) in the barrier paper laminate, the higher is the likelihood of it being deemed recyclable in the paper recycling stream of a particular country. Some specific examples of standards which may be useful in determining whether a barrier paper-based laminate is recyclable include the PTS method and the Western Michigan method and each is described later in more detail.

If improperly littered in the environment, the package must also fall apart quickly, thus exposing the maximum surface area to the bacteria responsible for the biodegradation, ensuring full digestion in a reasonable time. Preferably, the package would biodegrade within a 6-12 month period. And if the package is composted, it must undergo full digestion within the normal time expected of a compostable package. A screening test (OECD301B) and also OECD306 have been used to assess the biodegradation of various barrier paper laminates in a range of environmental scenarios and the test method is described in more detail later.

The biodegradable barrier paper laminate according to the invention may comprise a printed area. Printing may be achieved using standard printing techniques, such as flexographic, gravure, or inkjet printing. The biodegradable barrier paper laminate according to the invention may comprise a surface coating for artwork protection purposes against incidental water, or for matt/gloss effects.

Paper

The biodegradable and recyclable paper used for making biodegradable and recyclable barrier paper laminates is biodegradable without leaving any persistent materials in the environment and is also preferably recyclable in typical paper recycling streams. Indeed, papers are not made from 100% cellulose fibers only, but will also contain polymeric binders, mineral sizing agents, whitening agents, surfactants and other additives. These other ingredients must be selected appropriately to ensure that (a) the paper will biodegrade if improperly disposed in the environment and not cause any ecotoxicity issues, or (b) the paper will disintegrate in the repulping unit at a paper recycler and release the maximum cellulose fibers for making recycled paper.

For commercial reasons, it is also important that paper recyclers can obtain at least 50 percent by weight of cellulose fibers from an incoming batch of paper waste. For this reason, it is preferred that the paper layer itself comprises at least between 50% and 100% by weight of cellulose fibers, more preferably between 65% and 98% by weight of cellulose fibers, most preferably between 75% and 95% by weight of cellulose fibers.

Since the biodegradable and recyclable paper is the thickest layer in the biodegradable and recyclable barrier paper laminate, any package made thereof will contain a high percentage biobased cellulose content by weight.

It is contemplated that the biodegradable and recyclable paper layer of the present disclosure may itself comprise recycled material that are either natural or synthetic fibers. For example, the biodegradable barrier paper laminate of the present invention may comprise more than 10% by weight, preferably more than 20% by weight, more preferably more than 30% by weight of recycled material, specifically reciting all values within these ranges and any ranges created thereby. The paper layer may comprise virgin or recycled paper or mixtures thereof between 0% and 100%.

The presence of recycled material can be made from a visual inspection of the package. For example, manufacturers typically advertise the use of recycled materials in an effort to demonstrate their eco-friendly product approach. To further expand on this example, some manufacturers may utilize a logo, e.g. a leaf, along with wording to indicate the use of recycled material in the package material. Often times, manufacturers may specify the percentage of recycled material utilized as well, e.g. over 50 percent, over 70 percent, etc.

Visual inspection can be as simple as utilizing the human eye to inspect packages for logos of the use of recycled material. Additionally, or alternatively, visual inspection may include microscopy methods such as optical microscopy, scanning electron microscopy or other suitable methods known in the art. For example, package material comprising recycled paper fibers could look different under a microscope due to the presence of a much wider range of natural fiber types than if the package material comprised 100% non-recycled paper. As another example, under a microscope, potentially scanning electron microscopy, recycled fibers, due to their processing may appear more fibrillated than their virgin fiber counterparts.

It is preferable that the paper is substantially flat as possible on at least one side, especially the side that is subsequently coated with the biodegradable polymeric layer or biodegradable primer layer. The paper may be flattened via "sizing" during the manufacturing process, which in the industry means that it is coated with an aqueous polymeric suspension containing various inorganic fillers such as clays, calcium carbonate, titanium dioxide, methyl cellulose, silicon dioxide etc. . . . . The suspension is then dried, and the paper calendared to deliver a flatter surface than before sizing, as the inorganic fillers and binders dry down to fill in the porous rough surface of the paper. In some cases, both sides of the paper are sized either to the same degree or to different degrees Alternatively, the paper may be machine glazed during the paper manufacturing process via a mechanical ironing/pressing step that sometimes involves heat—in this case the paper fibers are squashed together and flattened in order to densify the paper surface and remove porosity. In some cases, sizing and machine glazing are combined to get an even flatter more perfect surface during paper manufacturing, before subsequently being coated with the water-borne biodegradable polymeric layers. In other cases, a vellum or glassine or tracing paper might be used which are already naturally very flat—such papers are made by a process that during the manufacturing densifies the paper structure throughout its entire thickness and so further sizing or glazing is not required. The paper layer may also be made via a foam-forming process, a modified paper-making process replacing water by water-based foam.

Examples of papers suitable for making a biodegradable barrier paper laminate include Leine Nature® paper (basis weight=85 g/m$^2$) from Sappi, a machine glazed paper certified "OK Home Compost"; NiklaSelect V Natural Linen paper (99 g/m$^2$) from Brigl and Bergmeister, a paper sized on one side only; PackPro 7.0 paper (80 g/m$^2$) from Brigl and Bergmeister, a paper sized on both sides; Axello papers from BillerudKorsnäs™ (including from Axello Tough White paper, 80 g/m$^2$) which has been designed to be tougher than many other papers and so may have some advantages in the distribution chain; SCG Glassine paper (58 g/m$^2$) from SCG/Prepack. As shown in TABLE 1 below, these papers pass the paper recycling protocols at both Western Michigan University in the USA and at the PTS Institute in Germany. These papers also pass the OECD 301B biodegradation screening test by undergoing at least 60% biodegradation within 60 days.

TABLE 1

| Paper Grade | Western Michigan Paper Recycling Protocol | PTS Paper Recycling Protocol | OECD 301B Biodegradation Test |
| --- | --- | --- | --- |
| Leine Nature ® 85 g/m$^2$ Sappi | PASS | PASS | PASS |
| NiklaSelect V Natural Linen 100 g/m$^2$ Brigl and Bergmeister | PASS | PASS | PASS |
| PackPro 7.0 80 g/m$^2$ Brigl and Bergmeister | PASS | PASS | PASS |
| Axello ® Tough White 80 g/m$^2$ BillerudKorsnäs | PASS | PASS | PASS |
| Glassine 58 g/m$^2$ SCG Packaging | Not yet tested (passed internal SCG recycling protocols) | Not yet tested (passed internal SCG recycling protocols) | PASS |

Other suitable papers could include paper especially prepared for subsequent decorative metallization, such as Nikkalett Spezial TD paper (60 g/m$^2$) from Brigl and Bergmeister The degree of flatness of the paper side that is coated with the rest of the barrier structure can be measured using 3D LSM. TABLE 2 below, describes the flatness of some of the papers mentioned above. Typically, we would prefer the degree of roughness ($S_q$—as measured by 3D LSM) to be <1.5 on the side that the structure is coated onto, in order to optimize the barrier properties of all the layers added on top of it as much as possible, especially the inorganic barrier layer. Note that the Nikkalett Spezial TD paper which is specifically designed for metallization has a roughness of ~0.98 on the side that is designed to be metallized.

TABLE 2

| | Roughness $S_q$/µm | |
| --- | --- | --- |
| Paper Grade | Side 1 | Side 2 |
| Nikkalett Spezial TD 60 g/m$^2$ (Highly sized) Brigl and Bergmeister | 1.66 | 0.98 |
| PackPro 7.0 80 g/m$^2$ (Sized) Brigl and Bergmeister | 2.2 | 1.05 |
| Glassine 58 g/m$^2$ SCG Packaging | 1.43 | 1.33 |
| Machine Glazed SCG Packaging | 4.67 | 3.41 |
| Leine Nature ® Machine Glazed 85 g/m$^2$ Sappi | 4.1 | 3.05 |
| Axello ® Tough White 80 g/m$^2$ (No sizing and no glazing) BillerudKorsnäs | 5.38 | 4.48 |

To withstand the rigors of high-speed manufacturing processes (where products are placed within packages made from laminates disclosed in the present invention) as well as the rigors of shipment, the paper layer must be sufficiently strong and resilient. There are a myriad of ways to specify the paper layer. The metrics discussed below are MD tensile strength in kN/m, CD tensile strength in kN/m, MD stretch in percent, CD stretch in percent, MD burst strength in kPa, caliper in µm, MD tensile energy absorption in J/g, CD tensile energy absorption in J/g, and basis weight in grams per square meter. Whilst all the metrics may be utilized in conjunction to select a suitable paper in the present invention, some metrics alone or in conjunction with others may suffice as well.

In cases where it is necessary to use a very tough paper to maintain the physical integrity of the barrier layer, Axello® papers from BillerudKorsnäs are preferred. As an example, TABLE 3 below shows the properties of Axello® Tough White paper grade from BillerudKorsnäs or Advantage Smooth White Strong from Mondi.

TABLE 3

| Property | Method | Unit | Orientation | Axello ® Tough White | Advantage Smooth White Strong |
|---|---|---|---|---|---|
| Basis Weight | ISO536 | g/m² | — | 80 | 70 |
| Caliper | ISO536 | μm | — | n/a | 89 |
| Tensile Strength | ISO1924-3 | kN/m | MD | 7.6 | 5.9 |
|  |  |  | CD | 4.7 | 3.0 |
| Maximum Stretch | ISO1924-3 | % | MD | 4.5 | 2.5 |
|  |  |  | CD | 8.0 | 8.0 |
| Tensile Energy Absorption | ISO1924-3 | J/g | MD | 240 | n/a |
|  |  |  | CD | 185 | n/a |
| Burst Strength | ISO2758 | kPa | MD | 480 | 256 |

The cellulose fibers used to make the paper may be sourced from softwoods, hardwoods and also non-tree fibers which typically have shorter fibers including bamboo, grass, hemp, kenaf, flax, corn husks, cotton stalks, coffee grounds, bagasse, rice straw, wheat straw, algae, abaca, sabia grass, esparto grass, milkwood floss fibers, pineapple leaf fibers, wood fibers, pulp fibers and others.

Biodegradable Water-Borne Polymers that are Water-Soluble

In some embodiments it is preferred that at least one of the biodegradable polymeric layers is made from a water-soluble polymer. Such a biodegradable polymeric layer could be suitable to form the lamination layer between the biodegradable and recyclable paper layer and the biodegradable primer layer—and/or could be used to form the heat seal layer of the biodegradable and recyclable barrier paper laminate.

Copolymers or derivatives thereof suitable for use as a water-soluble polymeric layer are selected from polyvinyl alcohol (PVOH), polyvinyl alcohol copolymers such as butenediol-vinyl alcohol copolymers (BVOH), which are produced by copolymerization of butenediol with vinyl acetate followed by the hydrolysis of vinyl acetate, suitable butenediol monomers being selected from 3,4-diol-1-butene, 3,4-diacyloxy-1-butenes, 3-acyloxy-4-ol-1-butenes, 4-acyloxy-3-ol-1-butenes and the like; polyalkylene oxides, such as polyethylene oxides or polyethylene glycols (PEG); poly(methacrylic acid), polyacrylic acids, polyacrylates, acrylate copolymers, maleic/acrylic acids copolymers; polyacrylamide; poly(2-acrylamido-2-methyl-1-propanesulfonic acid (polyAMPS); polyamides, poly-N-vinyl acetamide (PNVA); polycarboxylic acids and salts; cellulose derivatives such as cellulose ethers, methylcellulose, hydroxyethyl cellulose, carboxymethylcellulose; hydroxypropyl methylcellulose; natural gums such as xanthan and carrageenan gum; sodium alginates; maltodextrin, low molecular weight dextrin; sugars; polysaccharides; certain thermoplastic starch grades (e.g. specific grades from PLANTIC® from Plantic/Kuraray) polyamino acids or peptides; proteins such as casein and/or caseinate (e.g. such as those commercialized by Lactips).

The most preferred water-soluble biodegradable polymers are polyvinyl alcohol, polyethylene oxide, methylcellulose and sodium alginate. For applications where a "plastic free" product is desired, the majority component of the water-soluble polymer layer may be a naturally derived polymer, such as sodium alginate. Preferably, the level of biodegradable polymer in the water-soluble polymeric layer is at least 60%.

The water-soluble biodegradable polymer has an average molecular weight (measured by gel permeation chromatography) of about 1,000 Da to about 1,000,000 Da, or any integer value from about 1,000 Da to about 1,000,000 Da, or any range formed by any of the preceding values such as about 10,000 Da to about 300,000 Da, about 20,000 Da to about 150,000 Da, etc. More specifically polyvinyl alcohol would have a molecular weight in the range of 30,000-150,000 Da. Polyethylene oxide would have a molecular weight in the range of 50,000 Da to 400,000 Da. Methylcelluloses would have a molecular weight in the range 10,000 Da to 100,000 Da. The methylcellulose may also be methoxyl substituted from 18% to 32% and hydroxy-propoxyl substituted from 4% to 12%. Sodium Alginate may have an average molecular weight from about 10,000 to about 240,000 Daltons.

If homopolymer polyvinyl alcohol is used, the degree of hydrolysis could be 70-100%, or any integer value for percentage between 70% and 100%, or preferably 84% and 92% or still more preferably 86% and 90% or any range formed by any of these values, such as 80-100%, 85-100%, 90-100%, 95-100%, 98-100%, 99-100%, 85-99%, 90-99%, 95-99%, 98-99%, 80-98%, 85-98%, 90-98%, 95-98%, 80-95%, 85-95%, 90-95%, etc.

Certain grades of polyvinyl alcohol may claim to have greater resistance against moisture, whilst still being soluble. Examples include the Exceval range of polyvinyl alcohol from Kuraray, including the grades Exceval HR-3010 and Exceval AQ-4104.

Water-soluble polymers can be processed via thermal extrusion and via solution casting. Solution casting requires the water-soluble polymer to first be formed into a polymer solution. A polymer that is in solution can be said to be water-borne. In some embodiments, it is preferred that the biodegradable polymeric layer used as the lamination layer between the biodegradable and recyclable paper layer and the biodegradable primer layer is water-borne because often a thinner and flatter, more uniform biodegradable polymeric layer can be formed than if the biodegradable polymeric layer was extrusion coated onto the surface of the biodegradable and recyclable paper layer. In some embodiments, it is preferred that the biodegradable polymeric layer used as the lamination layer between the biodegradable and recyclable paper layer and the biodegradable primer layer is soluble in addition to being water-borne, since this will increase the speed at which these two layers can separate in a typical paper repulping unit and hence will increase the likelihood of the entire structure being recyclable in the typical paper recycling stream. Therefore in some embodiments, it is preferred that the biodegradable polymeric layer used as the lamination layer between the biodegradable and recyclable paper layer and the biodegradable primer layer is both soluble and laid down from a water-borne composition because such a biodegradable polymer layer would be both very flat (to help maximize barrier properties of the entire structure) and also its soluble nature would minimize the time for the paper to break up in a typical paper repulping stream.

Biodegradable Water-Borne Polymers that are Water In-Soluble

In some embodiments it is preferred that at least one of the biodegradable polymeric layers is made from a water in-soluble polymer. These materials are commonly referred to as "bioplastics" as well as biodegradable polymers. Such a biodegradable polymeric layer could be suitable to form the lamination layer between the biodegradable and recyclable paper layer and the biodegradable primer layer—and/or could be used to form the heat seal layer of the biodegradable and recyclable barrier paper laminate.

In one instance, biodegradable aliphatic polyesters and copolyesters can be produced by large-scale bacterial fermentation. Collectively termed polyhydroxyalkanoates, also known as "PHAs", these polymers can be synthesized from plant or bacteria fed with a particular substrate, such as glucose, in a fermentation plant. In many instances, the structural or mechanical properties of PHAs can be customized to fit the specifications of the desired end product. PHAs and their copolymers can degrade both aerobically and anaerobically. This makes them particularly well suited for composting or rapidly and completely degrading in the environment. Such bioplastics are often sold in a form where the plastic is suspended in aqueous emulsions and can be dried into films on various substrates, although they can also be sold in pellet form for extrusion into films and coatings. An emulsion can in some cases be said to be water-borne which would give it the advantage of being able to form a thinner, flatter and more uniform coating than if it was coated via thermal extrusion.

The PHA can be obtained as copolymer dispersion coatings. Danimer Scientific, Inc. produces poly(beta-hydroxyalkanoate), poly(3-hydroxybutyrate-co-3-hydroxyhexanoate) NODAX™) and Kaneka produces poly(3-hydroxybutyrate-co-3-hydroxyhexanoate). Non-limiting examples of PHA copolymers include those described in U.S. Pat. No. 5,498,692. Other PHA copolymers can by synthesized by methods known to one skilled in the art, such as, from microorganisms, the ring-opening polymerization of beta-lactones, the dehydration-polycondensation of hydroxyalkanoic acid, and the dealcoholization-polycondensation of the alkyl ether of hydroxyalkanoic acid, as described in Volova, "Polyhydroxy Alkanoates Plastic Materials of the 21" Century: Production, Properties, and Application, Nova Science Publishers, Inc., (2004), incorporated herein by reference.

Other possible biodegradable water in-soluble polymers could include biodegradable thermoplastic material selected from the group consisting of aliphatic aromatic polyesters (e. g., ECOFLEX® from BASF), specific grades of thermoplastic starches (e.g., MATER-BI from Novamont or PLANTIC® from Plantic/Kuraray), polybutylene succinate (PBS), polybutylene succinate adipate (PBSA) and copolymers thereof (e.g., BIONOLLE® from ShoWa High polymer Co. or PBSA from Mitsubishi Chemicals) and mixtures thereof. Although these polymers are not commonly sold in the water-borne form today, it is possible that such forms may be developed in the future.

In some embodiments, it is preferred that the biodegradable polymeric layer used as the lamination layer between the biodegradable and recyclable paper layer and the biodegradable primer layer is water-borne because a thinner and flatter, more uniform biodegradable polymeric layer can be formed than if the biodegradable polymeric layer was extrusion coated onto the surface of the biodegradable and recyclable paper layer. In some embodiments, it is preferred that the biodegradable polymeric layer used as the lamination layer between the biodegradable and recyclable paper layer and the biodegradable primer layer is soluble, since this increases the speed at which these two layers can separate in a typical paper recycling repulping unit and hence will increase the likelihood of the entire structure being recyclable in the typical paper recycling stream.

In some embodiments, a water in-soluble polymer is preferred for the heat seal layer because it will be less affected by high moisture levels.

Optional Ingredients within the Biodegradable Polymeric Layers

The biodegradable polymeric layers of the biodegradable barrier paper laminate that are water-soluble may contain disintegrants, plasticizers, surfactants, lubricants/release agents, fillers, extenders, antiblocking agents, detackifying agents, antifoams, or other functional ingredients.

It may be required for certain applications that the biodegradable polymeric layers that are water-soluble contain disintegrants to increase their dissolution rate in water. Suitable disintegrants are, but are not limited to, corn/potato starch, methyl celluloses, mineral clay powders, croscarmellose (cross-linked cellulose), crospovidone (cross-linked polyvinyl N-pyrrolidone, or PVP), sodium starch glycolate (cross-linked starch). Preferably, the water-soluble polymeric layers comprise between 0.1% and 15%, more preferably from about 1% to about 15% by weight of disintegrants.

In some embodiments, the biodegradable polymeric layers that are water-soluble may contain water-soluble plasticizers. Preferably, the water-soluble plasticizer is selected from polyols, sugar alcohols, and mixtures thereof. Suitable polyols include polyols selected from the group consisting of glycerol, diglycerol, ethylene glycol, diethylene glycol, triethylene glycol, tetraethylene glycol, polyethylene glycols up to 400 Da molecular weight, neopentyl glycol, 1,2-propylene glycol, 1,3-propanediol, dipropylene glycol, polypropylene glycol, 2-methyl-1,3-propanediol, methylene glycol, trimethylolpropane, hexylene glycol, neopentyl glycol, and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. In some cases, the plasticizer could be selected from the following list: ethanolamine, alkyl citrate, isosorbide, pentaerythritol, glucosamine, N-methylglucamine or sodium cumene sulfonate. Less mobile plasticizers such as sorbitol or polyethylene oxide can facilitate the formation of water-soluble polymeric layers with greater barrier properties than water-soluble polymeric layers including a more mobile plasticizer such as glycerol. In some circumstances when there is a desire to use as many naturally derived materials as possible, the following plasticizers could also be used: vegetable oil, polysorbitol, dimethicone, mineral oil, paraffin, $C_1$-$C_3$ alcohols, dimethyl sulfoxide, N, N-dimethylacetamide, sucrose, corn syrup, fructose, dioctyl sodium-sulfosuccinate, triethyl citrate, tributyl citrate, 1,2-propylene glycol, mono, di- or triacetates of glycerin, natural gums, citrates, and mixtures thereof. More preferably, water-soluble plasticizers are selected from glycerol, 1,2-propanediol, 20 dipropylene glycol, 2-methyl-1,3-propanediol, trimethylolpropane, triethylene glycol, polyethylene glycol, sorbitol, or a mixture thereof, most preferably selected from glycerol, sorbitol, trimethylolpropane, dipropylene glycol, and mixtures thereof. Preferably, the water-soluble polymeric layers comprise between 5% and 50%, more preferably between 10% and 40%, even more preferably from about 12% to about 30% by weight of plasticizers.

In some embodiments, the biodegradable polymeric layers comprise a surfactant. Suitable surfactants may belong to the non-ionic, cationic, anionic or zwitterionic classes. Suitable surfactants are, but are not limited to, poloxamers (polyoxyethylene polyoxypropylene glycols), alcohol ethoxylates, alkylphenol ethoxylates, tertiary acetylenic glycols and alkanolamides (nonionic), polyoxyethylene amines, quaternary ammonium salts and quaternized polyoxyethylene amines (cationic), and amine oxides, N-alkylbetaines and sulfobetaines (zwitterionic). Other suitable surfactants are dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of 5 fatty acids, and combinations thereof. Preferably, the water-soluble polymeric layers comprise between 0.1% and 2.5%, more preferably from about 1% to about 2% by weight of surfactants.

In some embodiments, the biodegradable polymeric layers according to the invention comprise lubricants/release agents. Suitable lubricants/release agents are, but are not limited to, fatty acids and their salts, fatty alcohols, fatty esters, fatty amines, fatty amine acetates and fatty amides. Preferred lubricants/release agents are fatty acids, fatty acid salts, fatty amine acetates, and mixtures thereof. Preferably, the water-soluble polymeric layers comprise between 0.02% to 1.5%, more preferably from about 0.1% to about 1% by weight of lubricants/release agents.

In some embodiments, the biodegradable polymeric layers according to the invention comprises fillers, extenders, anti-blocking agents, de-tackifying agents. Suitable fillers, extenders, anti-blocking agents, de-tackifying agents are, but are not limited to, starches, modified starches, crosslinked polyvinylpyrrolidone, crosslinked cellulose, microcrystalline cellulose, silica, metallic oxides, calcium carbonate, talc and mica. Preferably, the biodegradable polymeric layers comprise between 0.1% to 25%, more preferably from about 1% to about 15% by weight of fillers, extenders, anti-blocking agents, de-tackifying agents. In absence of starch, the biodegradable polymeric layers comprise preferably between 1% to 5% by weight of fillers, extenders, anti-blocking agents.

In some embodiments, the water-borne biodegradable polymeric layers that are water-soluble according to the invention comprise antifoams. Suitable antifoams are, but are not limited to, polydimethylsiloxanes and hydrocarbon blends. Preferably, the water-soluble polymeric layers comprise between 0.001% and 0.5%, more preferably from about 0.01% to about 0.1% by weight of antifoams.

Biodegradable barrier paper laminates where at least one of the biodegradable polymeric layers is made from a water-soluble polymer according to the invention may contain residual moisture in the water-soluble layer depending on the hygroscopy and the isotherm of the laminate components at given temperature and humidity conditions measured by Karl Fischer titration. For instance, water-soluble polyvinyl-alcohol layers in the laminate may contain about 4-8% residual moisture at 23° C. and 50% r.H.

Biodegradable Primer Layers

The role of the biodegradable primer layer is to flatten the surface of the paper-based structure that will be coated with the primer, as much as possible, before the inorganic barrier layer is deposited onto it. In general, the lower the roughness value of the substrate immediately below the inorganic barrier layer, the greater the resulting barrier properties.

The primer needs to be suitable for the inorganic barrier layer to adhere to as well as possible, in order to form a strong interface to enable a stable barrier layer and to avoid delamination of the inorganic barrier layer from the underlying structure. In some cases, such a primer layer may also be used on top of the inorganic barrier layer, in order to prevent mechanical damage or oxidation and in this case may then be called a protective layer. A primer may also be used to provide additional heat resistance for the thermal hysteresis often experienced during a vapor deposition. A biodegradable primer layer may also sometimes be called a biodegradable lacquer or a biodegradable varnish, in addition to a protective layer. Whichever word is used to describe this layer, the purpose is the same.

We have found that eliminating the first biodegradable primer layer has a detrimental effect on the barrier properties of the entire structure. In some embodiments it is better to use both a first and second biodegradable primer layer in the structure. In some other embodiments we have found it possible to eliminate the second biodegradable primer layer, which helps maximize recyclability and reduce costs. However, in general, we have found it best to keep the first biodegradable primer layer in order to maximize the water vapor barrier properties (and other barrier properties) of the entire structure. However, in some embodiments there may still be some advantages to keep the second biodegradable primer layer, in order to reduce the defect density of the inorganic barrier coating laid down on top of the first biodegradable primer layer.

Although primers are widely used throughout the paper and plastic packaging industry, to enhance coatability and printability, we specifically needed a biodegradable primer for this specific application. If the primer cannot be biodegradable, it is preferred that it can harmlessly disperse once the rest of the structure has biodegraded and disintegrated, without harming living organisms. Therefore, the suitable potential options are more limited than for other applications.

In some embodiments, the primer can be an inorganic-organic hybrid-polymer such as bio-ORMOCER® or ORMOCER® developed by The Fraunhofer Institute for Silicate Research in Wurzburg, Germany. These materials are a hybrid between a glass and a polymer, and the exact chemistry of these materials can be tailored to specific applications. ORMOCER® or bio-ORMOCER® materials are synthesized via the sol-gel process and have strong covalent bonds between the inorganic and the organic moieties. The ratio of the inorganic to organic moieties can be altered to optimize properties for a specific application. Controlled hydrolysis and condensation reactions of organoalkoxysilanes and metal alkoxides produce the inorganic network of the hybrid polymer ORMOCER®. The organic network forms via subsequent polymerization of reactive organic groups, which are introduced via the organo-alkoxysilanes. Typically, this involves epoxide polymerization or radical polymerization of acrylates or meth-acrylates for the non-biodegradable version. The organic network formation and hence the curing of the material can be induced by heat or UV light.

Bio-ORMOCER is somewhat preferred over ORMOCER for this specific application, because it is modified to be biodegradable. Typically, to make bio-ORMOCER®, ORMOCER® is modified by either the biodegradable polymer chitosan or polycaprolactone, in order to make the biodegradable version, forming biodegradable functional groups for covalent coupling to the inorganic ORMOCER® network. In order to guarantee incorporation of the biodegradable components into the hybrid polymer network, some of these components are subjected to chemical modification. For example, the polycaprolactone derivative can be functionalized with tri-ethoxy-silane groups, in order to subsequently allow attachment of these biodegradable components to the inorganic network via hydrolysis and condensation reactions. For the polycaprolactone version, attachment of biodegradable precursors to the organic network of the hybrid material was achieved by functionalization with epoxy groups. The reactive epoxy groups subsequently participated in the polymerization reactions for formation of the organic network. In contrast, chitosan required no modification because it can link with the organic network via some of its own amino groups. The chitosan version tends to biodegrade at a faster rate. The polycaprolactone version was specifically designed with a moisture-triggered antimicrobial effect.

Non-limiting examples of ORMOCER and bio-ORMOCER include those described in US. Pat. No. 2011/0250441 A1 and U.S. Pat. No. 6,709,757B2, in addition to German patents DE-OS 3828098 and DE4303570.

ORMOCER® and bio-ORMOCER® is applied as a liquid and once heated will cure via the sol-gel process at a temperature of at least 100° C. to form a solid layer that is very flat. Prior to application to the substrate, the liquid must be kept cool in order to prevent premature curing. Both bio-ORMOCER® and ORMOCER® are typically applied so that they are just a few microns thick. Typically, they are applied either on top of or underneath an inorganic barrier layer. In some embodiments, it may be preferable to further treat the ORMOCER® or bio-ORMOCER® in order to further cross-link it, although the biodegradation rate of the fully cross-linked material would need to be balanced with any improvements in substrate performance.

In this invention, we have focused on applying a one component liquid bio-ORMOCER®. The bio-ORMOCER® was typically applied using a wet process using either a type of roll-to-roll coating process e.g. a gravure roll or an anilox roll—or it was applied via a slot coater. It was then dried using a Drytec heater from Kronert held at 100° C., moving through a dryer at 5 m/minute in order to ensure that the residence time of the coating within the dryer was approximately 1 minute. This produced a hard and glossy coating that was cross-linked after leaving the dryer. Any further curing will have occurred on the roll once it was wound up.

In some embodiments, an inorganic-organic hybrid material other than ORMOCER or bio-ORMOCER® from The Fraunhofer Institute may be used. If that is the case, then the composition to prepare the organic-inorganic hybrid layer could comprise an organic silane and a metal alkoxide, as mentioned previously. If necessary, it may further comprise an additive/filler, a solvent, and a polymerization catalyst.

The organic silane may be at least one selected from the group consisting of the compounds represented by Chemical Formula 1 below. When one kind of compound is used, the organic silane compound should be capable of crosslinking. (R')mSi X(4_i) (1) where X, which may be identical or different, is hydrogen, halogen, C1-12 alkoxy, acyloxy, alkylcarbonyl, alkoxycarbonyl, or N(R2)2 (where R2 is H or C1-12alkyl); R', which may be identical or different, is C 1-12alkyl, alkenyl, alkynyl, aryl, arylalkyl, alkylaryl, arylalkenyl, alkenylaryl, arylalkynyl, alkynylaryl, halogen, substituted amino, amide, aldehyde, keto, alkylcarbonyl, carboxy, mercapto, cyano, hydroxy, C1-12 alkoxy, C1-12 alkoxycarbonyl, sulfonate, phosphate, acryloxy, methacryloxy, epoxy, or vinyl; 6 oxygen or —NR2 (where R2 is H or C1-12alkyl) may be inserted between R.sup.1 and Si to give X(4 m) or (R). NR2Si X(4-m); and m is an integer of 1-3. 5 The organic silane may be selected from the group consisting of methyltrimethoxysilane, methyltriethoxysilane, phenyltrimethoxysilane, phenyltriethoxysilane, dimethyldimethoxysilane, dimethyldiethoxysilane, diphenyldimethoxysilane, diphenyldiethoxysilane, pheionyldimethoxysilane, phenyldiethoxysilane, methyldimethoxysilane, methyldiethoxysilane, phenylmethyldimethoxysilane, phenylmethyldiethoxysilane, trimethylmethoxysilane, trimethylethoxysilane, triphenylmethoxysilane, triphenylethoxysilane, phenyldimethyl15 methoxysilane, phenyldimethylethoxysilane, diphenylmethylmethoxysilane, diphenylmethylethoxysilane, dimethylethoxysilane, dimethylethoxysilane, diphenylmethoxysilane, diphenylethoxysilane, 3-aminopropyltriethoxysilane, 3-glycidoxypropyltrimethoxysilane, p-ami2onophenylsilane, allyltrimethoxysilane, N-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltri25 methoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane, and a mixture thereof.

The metal alkoxide may be at least one selected from the group consisting of compounds represented by Chemical Formula 2 below. 35 M-(R3), (2) where M is a metal selected from the group consisting of aluminum, zirconium, and titanium; R3, which may be identical or different, is halogen, C 1-12 4o alkyl, alkoxy, acyloxy, or hydroxy; and Z is an integer of 3 or 4.

In some cases, a filler may be added to the composition. The filler may be at least one material selected from the group consisting of metal, glass powder, diamond powder, silicon oxide (SiO, where x is an integer of 2-4) and clay. Examples of the filler are metal, glass powder, diamond powder, silicon oxide, clay (bentonite, smectite, kaolin, etc.), calcium phosphate, magnesium phosphate, barium sulfate, aluminum fluoride, calcium silicate, magnesium silicate, barium silicate, barium carbonate, barium hydroxide, aluminum silicate, and a mixture thereof. The solvent may be any one commonly used for partial hydrolysis, and preferably distillation water. The catalyst is also not particularly limited, and is preferably used aluminum butoxide, and zirconium propoxide etc.

In the composition, an amount of the organic silane is preferably comprised at 20-99.99 wt %, more preferably at 50-99 wt %, and most preferably at 70-99 wt %. The amount of the metal alkoxide may be comprised at 0.01-80 wt %, more preferably at less than 70 wt %, and most preferably at less than 20 wt %.

Alternative embodiments for use as a biodegradable primer could include, but are not limited to, a biodegradable PVOH lacquer from the Huber Group in Germany or a biodegradable shellac lacquer. Both these alternative options would also be expected to biodegrade.

Typically, any primer layer would be laid down in such a way as to give a final cured thickness in the range 0.1-30 μm, preferably 0.2-15 μm, and more preferably 0.5-7 μm. It is important to keep this layer as thin as possible, to keep a good balance between protecting the barrier properties of the inorganic barrier layer and preventing issues in the paper recycling stream. If the primer layer is too thick or too difficult to break up, it may clog up the filters in the paper repulping unit or cause optical defects in the resulting recycled paper. In addition, primers can be expensive and so minimizing usage will help minimize cost.

In some circumstances, it may be deemed safe to use a non-biodegradable primer if the primer can safely disperse. In such circumstances, it may be deemed safe to use primers based on certain chemistries including epoxies, acrylics, methacrylates and acrylics with epoxy components.

Inorganic Barrier Layer

The addition of the inorganic barrier layer is critical to significantly decreasing the moisture transmission rate of the entire structure. The quality of that layer and how its integrity is maintained is critical to keeping the good barrier properties of the overall structure. Its interactions with the layers below and above it are very important to achieving the best possible barrier properties for the overall structure.

In certain embodiments, suitable inorganic coatings can be formed by vapor deposition of metals including but not limited to aluminum, magnesium, titanium, tin, indium, silicon, carbon, gold, silver, chromium, zinc, copper, cerium, hafnium, tantalum and diamond-like carbon.

In certain embodiments, suitable inorganic coatings can be formed by vapor deposition of metal oxides, metal nitrides and related compounds. As used herein, metal oxides include aluminum oxides (e.g. $Al_2O_3$), aluminum carbide, aluminum nitride, magnesium oxide, titanium oxides (such as titanium dioxide, titanium(3) oxide or titanium monoxide), zinc oxide, tin oxide, yttrium oxide, or zirconium oxides (e.g. zirconium monoxide), calcium oxide, boron oxide or metalloid oxides such as silicon oxides, silicon oxycarbides, and silicon nitrides. Silicon oxide or nitride-based coatings could also be one selected from the group consisting of $SiO_X$ (where x is an integer of 1-4) or $SiO_XN_Y$ (where each of x and y is an integer of 1-3).

The barrier layer is preferably a single component vapor deposition layer comprising at least one selected from the group above, or a dual component vapor deposition layer comprising at least one combination of two components selected from the group consisting of $SiO_x/Al_2O_3$, $SiO/ZnO$, $SiO/CaO$, $SiO/B_2O_3$ and $CaO/Ca(OH)_2$.

As can be appreciated, metals and metal oxides can be vapor-deposited using a variety of processes. For example, a metal or metal oxide coating can be vapor-deposited using a chemical vapor deposition process or a physical vapor deposition process in various embodiments. Generally, most chemical vapor deposition processes can be suitable due to the stability of the metal, metal oxides and metal oxide precursors.

In certain embodiments, a plasma-assisted chemical vapor deposition process can be used to form the vapor-deposited inorganic coating. Plasma-assisted chemical vapor deposition is a modified chemical vapor deposition process in which thermal activation energy is provided by an energetic plasma instead of direct heat. Plasma-assisted chemical vapor deposition processes useful for the films described herein include the steps of vaporizing a metal or metal oxide precursor, introducing plasma to thermally modify the precursor and form intermediate compounds, and cooling the intermediate compounds to form a coating on at least one surface of the structure to be coated. Plasma-assisted chemical vapor deposition processes can be particularly advantageous because such processes can provide the thermal energy necessary for the vapor deposition process without melting, or otherwise damaging, the structure to be coated.

To form metal oxide coatings, various precursor compounds can be vaporized. For example, tetramethylsilane ("TMS") and trimethylaluminum ("TMA") can respectively be vaporized to form silicon dioxide ("$SiO_2$") and aluminum oxide ("$Al_2O_3$") coatings. Hexamethyldisilazane ("HMDS"), hexamethyldisiloxane ("HMDSO"), and tetraethylorthosilicate ("TEOS") can similarly be vaporized be used to form silicon oxide ("$SiO_x$") coatings.

In certain embodiments, an atomic layer chemical vapor deposition process can alternatively be used. Atomic layer deposition is a chemical vapor deposition process based on sequential, self-saturating surface reactions. In such processes, the metal oxide precursors are pulsed into a chemical vapor deposition chamber and allowed to build up layer by layer.

In certain embodiments, a physical vapor deposition process can alternatively be utilized. Physical vapor deposition processes differ from chemical vapor deposition processes by instead using physical processes such as heating, or sputtering, to produce vapor from a solid precursor. The vaporized compound adsorbs onto the substrate to be coated, to directly form a thin layer. In certain embodiments, suitable physical vapor deposition processes to form an inorganic layer can include sputtering, such as magnetron sputtering, thermal evaporation, and electron beam ("e-beam") evaporation.

As can be appreciated, physical vapor deposition processes do not require the use of a precursor compound and instead directly vaporize the material of the final coating. For example, an aluminum coating can be formed on the surface of the structure to be coated by sputtering, or e-beam evaporation, of solid aluminum pellets or granules.

In certain embodiments, the inorganic barrier coating may alternatively be performed by sputtering, ion plating, or via another sol-gel method.

The selection of the specific inorganic coating will depend on the final application. In general, metal oxides are more brittle than metals, whereas metals can be somewhat more elastic than metal oxides. In some embodiments we have found it possible to obtain a lower moisture vapor transmission rate if we use aluminum to form the inorganic barrier layer, than if we use a silicon oxide. Metal oxide coatings tend to more easily form a plurality of microfractures extending within the inorganic coating than when using metals, which can be detrimental to optimizing the moisture vapor transmission barrier performance and oxygen transmission performance. On the other hand, some metal oxides form a very transparent inorganic barrier layer, whereas some metals create a very opaque inorganic barrier layer. This may be important if it is desired in order to maximize paper recyclability and to minimize any optical defects in the recycled paper—or in order to construct a translucent barrier paper laminate so that the product inside the package can be seen. So, in some embodiments, it may be preferred to use a metal oxide barrier coating even if the barrier properties are not as good as achieved via a metal barrier coating.

According to certain embodiments, a vapor-deposited inorganic coating can be joined to the biodegradable primer layer directly or indirectly. For example, in certain embodiments, an inorganic vapor-deposited coating can be applied directly to an unprocessed primer layer using a chemical vapor deposition process as previously described. As used herein, an unprocessed primer layer refers to a layer which has not undergone any treatment steps, such as ablation, after being formed on top of the biodegradable polymeric layer. As can be appreciated, certain vapor-deposition processes can obviate the need to use treatment steps. For example, a plasma-assisted chemical vapor deposition process can inherently clean the primer layer and can minimize any need to prepare the primer layer prior to application of the inorganic coating.

Alternatively, in certain embodiments, a vapor-deposited inorganic coating can be applied to the biodegradable primer layer after the primer layer has been prepared by, for example, cleaning. As can be appreciated, cleaning of the water-soluble layer can promote improved adhesion of the vapor-deposited inorganic coating and can minimize any defects in the inorganic coating. Generally, a primer layer can be cleaned in any suitable manner. For example, a water-soluble layer can be cleaned with a solvent treatment or a physical abrasion treatment in certain embodiments. In certain embodiments, the primer layer can be cleaned with an ablation process. In such embodiments, one or more surfaces of the primer layer can be at least partially ablated to remove any undesirable material prior to application of the vapor-deposited inorganic coating. Additionally, certain ablation processes, such as plasma ablation processes, can also functionalize the surface and provide functional groups for the vapor-deposited inorganic coating to adhere to. Generally, any suitable ablation process can be used including, for example, a plasma treatment, a solvent treatment, a flame treatment, a photon ablation treatment, an electron beam irradiation treatment, an ion bombardment treatment, an ultraviolet treatment, a vacuum annealing treatment, or a physical abrasion treatment. For example, a helium-oxygen plasma or an argon-oxygen plasma at a flow rate of 30.0 L/min at 100 W to about 150 W of power can be used to ablate the surface of a water-soluble layer prior to vapor deposition of an inorganic coating in certain embodiments. Other gases can also be used for plasma ablation including nitrogen and ammonia. As can be appreciated, the surface of a primer layer can be partially ablated, substantially fully ablated, or fully ablated in various embodiments.

In certain embodiments, corona treatment could be used to change the surface energy of the first or second biodegradable primer layer and/or clean it. This may make it easier for the inorganic barrier layer to adhere to—or for the second biodegradable polymeric layer to adhere to.

In certain embodiments, two or more physically separated vapor-deposited inorganic coatings can be applied to the structure. In some embodiments, the inorganic barrier coating layers could be laid down on top of each other. In other embodiments, a biodegradable primer layer would be used between each of the inorganic barrier coating layers in order to protect them. Each additional vapor-deposited inorganic coating can be applied similarly to the previously described vapor-deposited inorganic coatings—or alternatively they could be applied in a different way.

One graphical representation is shown on page 39 of the fourth edition of the Metallizing Technical Reference published by the Association of Industrial Metallizers Coaters and Laminators and demonstrates the typical apparatus for applying an inorganic barrier coating layer to a roll of a substrate.

It is preferred that the inorganic barrier coating layer has a thickness of 2 nm-1,000 nm, preferably 10 nm-200 nm, and more preferably 20 nm-100 nm. Alternatively, the thickness ratio of the inorganic barrier layer to the biodegradable polymeric layers is from about 20 to about 20,000.

Biodegradable Adhesive Layers

In some embodiments, a biodegradable adhesive layer is preferred to adhere an already formed biodegradable film to the rest of the structure of the biodegradable and recyclable barrier paper laminate. Such an adhesive could be either a biodegradable solution-based or solvent-based adhesive composition. Nonlimiting examples of the biodegradable adhesive layer can include biodegradable polyvinyl acetates, starches, maltodextrins, natural waxes, artificial waxes and polyester-polyurethane blends. In some embodiments, the biodegradable adhesive layer could be a commercially available grade from BASF such as Epotal 3675 or Epotal 3702 or Epotal P100ECO, which are both biodegradable and compostable. In other embodiments, the adhesive could be BioTAK® by Berkshire Labels; or Bostik 43298 Thermogrip hotmelt adhesive. In some embodiments the adhesive could be a Morchem compostable bio-adhesive such as their grade PS255+CS95 (@25% solids).

In some embodiments, a soluble adhesive may have benefits to enhance recyclability in the typical paper repulping system, since it may accelerate the barrier paper structure to break up—it would bring similar advantages to the biodegradation process.

In some embodiments, it may be preferred to lay down an adhesive from a solution in order to minimize the thickness of the adhesive layer.

In some embodiments, it may be preferred to lay down an adhesive as a continuous layer in order to obtain maximum bond strength between the layers. Whereas in other embodiments, it may be preferred to lay down the adhesive as a discontinuous layer in order to maximize the speed at which the whole structure can break up during either paper recycling or biodegradation.

In some circumstances, it may be deemed safe to use a non-biodegradable adhesive if the adhesive is very thin, can safely disperse and if it is based on specific chemistries that will not cause ecotoxicity issues. Potential options include polyurethane based adhesives or ionomer-based adhesives.

Biodegradable Polymers that are not Water-Borne

In order to use the biodegradable and recyclable barrier paper laminate in many packaging applications such as single or limited use sachets, or in other formers of packages, it is necessary for at least one exterior layer to be amenable to heat sealing. In some embodiments, the water-borne biodegradable polymeric layers (either water-soluble or water in-soluble) already described can be used as the heat seal layer, in addition to being used as the lamination layer between the biodegradable and recyclable paper layer and the biodegradable primer layer. Such layers were described previously. However, in some other embodiments, it may be preferred to use a non-water-borne biodegradable polymeric layer to form the heat seal layer for the structure.

Many biodegradable polymeric compositions are not readily available today in a composition that is water-borne (although they could be in future) but have strong benefits when used as a heat seal layer such as resistance to high moisture conditions, enabling them to form a stable heat seal layer in many different environments—whilst still being biodegradable. Compositions that are not water-borne must be applied by different methods than those used to apply water-borne biodegradable polymeric layers.

Examples of polymers are that are suitable for heal sealing but are not commonly available in a water-borne form (although they could be in future) include biodegradable thermoplastic materials selected from the group consisting of aliphatic aromatic polyesters (e. g., ECOFLEX® from BASF), certain thermoplastic starches (e.g., MATER-BI from Novamont's or PLANTIC® from Plantic/Kuraray), polybutylene succinate and copolymers thereof (e.g., BION- OLLE® from ShoWa High polymer Co. or PBSA from Mitsubishi Chemicals), polycaptralactone, polybutylene adipate-co-terephthalate, polylactic acid, and mixtures/blends thereof.

Other biodegradable polymers that are sometimes available in water-borne form but sometimes are only available in thermoplastic form include the previously described PHA and PHA copolymers such as poly(beta-hydroxyalkanoate), poly(3-hydroxybutyrate-co-3-hydroxyhexanoate) NODAX™ from Danimer, and poly(3-hydroxybutyrate-co-3-hydroxyhexanoate) from Kaneka. Non-limiting examples of PHA copolymers include those described in U.S. Pat. No. 5,498,692. Other PHA copolymers can by synthesized by methods known to one skilled in the art, such as, from microorganisms, the ring-opening polymerization of beta-lactones, the dehydration-polycondensation of hydroxyalkanoic acid, and the de-alcoholization-polycondensation of the alkyl ether of hydroxyalkanoic acid, as described in Volova, "Polyhydroxy Alkanoates Plastic Materials of the 21" Century: Production, Properties, and Application, Nova Science Publishers, Inc., (2004), incorporated herein by reference.

In some circumstances where biodegradation is only likely to occur in an industrial composting scenario, there may be some preferred embodiments where the heat seal layer is made from a biodegradable polymer based on polylactic acid (PLA), or other polymers that are only biodegradable in industrial composting situations. However, in some cases when polymers which only compost in industrial composting facilities (e.g. PLA) are blended with polymers which undergo biodegradation much more easily (e.g. PHA), so that the domains of PLA within the blend are made very small then it is in fact sometimes possible for the PLA blends to undergo biodegradation in home composting situations rather than just in industrial composting facilities.

Choice of Biodegradable Polymer Used for Lamination Layer and/or Heat Seal Layer When the biodegradable polymeric coating used for the heat seal layer is not water-borne, it can be applied via either thermal extrusion coating, via heat lamination—or via an adhesive lamination process. If adhesive lamination is used, a biodegradable adhesive layer would need to be applied directly to either the second biodegradable primer layer or directly onto the inorganic barrier layer. A pre-made film would then be applied to the biodegradable adhesive layer. A biodegradable polymeric composition can be made into a pre-made film by a variety of methods including solution casing, thermal cast film extrusion and thermal blown film extrusion. If thermal extrusion coating is used instead, a biodegradable polymeric composition is melted within an extruder; the molten biodegradable polymeric composition is thermally extruded onto the surface of the second biodegradable primer layer or directly onto the inorganic barrier coating; followed by cooling the second biodegradable polymeric composition to form the second biodegradable polymeric layer.

In some embodiments, it is preferred that the biodegradable polymeric layer used as the lamination layer between the biodegradable and recyclable paper layer and the biodegradable primer layer is water-borne rather than not being water-borne. The reason for this is because a thinner and flatter, more uniform biodegradable polymeric layer can typically be formed than if the biodegradable polymeric layer was extrusion coated onto the surface of the biodegradable and recyclable paper layer. In some embodiments, it is preferred that the biodegradable polymeric layer used as the lamination layer between the biodegradable and recyclable paper layer and the biodegradable primer layer is soluble, since this increases the speed at which these two layers can separate in a typical paper repulping unit and hence will increase the likelihood of the entire structure being recyclable in the typical paper recycling stream. In some embodiments, it is preferred that the biodegradable polymeric layer used as the lamination layer between the biodegradable and recyclable paper layer and the biodegradable primer layer is both soluble and laid down from a water-borne composition because such a biodegradable polymer layer would be both very flat (to help maximize barrier properties of the entire structure) and also its soluble nature would minimize the time for the paper to break up in a typical paper repulping stream.

In some embodiments, the lamination layer between the biodegradable and recyclable paper layer and the biodegradable primer layer may need to be laid down from a composition that is not water-borne. This embodiment would normally be less preferred because it would not take advantage of the thinner and flatter, more uniform layers that can typically be formed when coating from a water-borne composition. However, there may be certain situations where it is still necessary to select this option.

If thermal extrusion coating is used to apply a composition that is not water-borne, then the biodegradable polymeric composition is melted within an extruder; the molten biodegradable polymeric composition is thermally extruded onto the surface of the biodegradable and recyclable paper layer followed by cooling to form the first biodegradable polymeric layer.

An alternative option is to apply the layer via adhesive lamination, although this would be even less preferred because such an arrangement would increase the thickness of the entire structure and total number of layers in the structure. If such an arrangement was used, a biodegradable adhesive layer would need to be applied directly to the biodegradable and recyclable paper layer. A pre-made film would then be applied to the biodegradable adhesive layer. A biodegradable polymeric composition can be made into a pre-made film by a variety of methods including solution casing, thermal cast film extrusion and thermal blown film extrusion. The biodegradable primer layer would then be coated on top of that.

In some cases, heat lamination could be used to adhere the biodegradable and recyclable paper layer to the biodegradable polymeric layer.

Regardless of the application method—in some embodiments, it can be advantageous to employ lower melting temperature grades of the biodegradable polymeric layer to optimize sealing with commercial equipment for heat seal layer, versus the grade used for the lamination between the biodegradable and recyclable paper layer and the biodegradable primer layer.

Methods of Making a Biodegradable and Recyclable Barrier Paper Laminate

Figure 8:
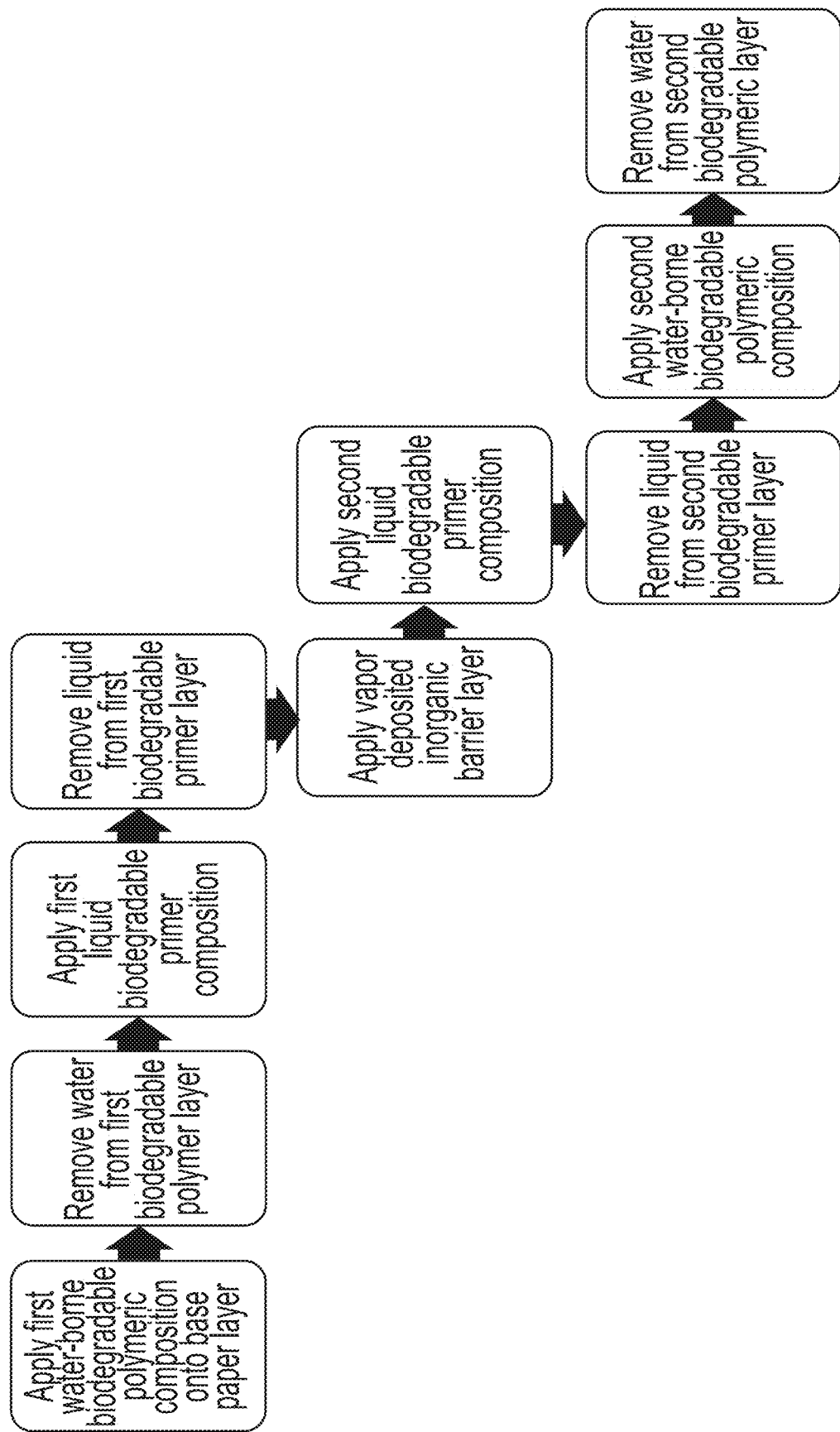
FIG. 8 shows a schematic representation of the first embodiment of the method of making to create the first biodegradable and recyclable barrier paper laminate 150.

There are numerous non-limiting embodiments of the method of making the biodegradable and recyclable barrier paper laminate described herein. As shown in the example of FIG. 8, a biodegradable and recyclable barrier paper laminate 150 with an inorganic barrier layer may be produced in multiple steps of coating biodegradable polymeric layers, biodegradable primer layers and an inorganic barrier layer on top of the biodegradable and recyclable barrier paper layer under specific conditions. The different embodiments involve different combinations of processes to complete the biodegradable barrier paper laminate structure and can include coating and drying of water-borne polymeric compositions (some of which are solutions of water soluble polymers and some of which are emulsions of water insoluble polymers), heating steps for the case where a water in-soluble biodegradable polymeric emulsion is used rather than a water-soluble biodegradable polymeric solution, vapor deposition of an inorganic barrier layer, thermal extrusion coating of a biodegradable polymeric composition and adhesion coating of a biodegradable adhesive in order to adhesively laminate a pre-made biodegradable polymeric layer to the rest of the structure. Not all embodiments will involve all the steps shown in FIG. 8-FIG. 8 just shows one example of a specific process that could be used to obtain a specific structure.

In one embodiment, a method of making to create the first biodegradable and recyclable barrier paper laminate 150 comprising the following steps:
- a) applying a first aqueous system of a water-borne biodegradable polymeric composition onto the inner surface of a biodegradable and recyclable paper layer 10, said paper layer is preferably machine glazed and/or sized or is a vellum or glassine paper to avoid hydro-expansion;
- b) removing the water from the first aqueous system of a water-borne biodegradable polymeric composition to obtain a first biodegradable polymeric layer 20;
- c) applying a first liquid system of a biodegradable primer composition onto the inner surface of the first biodegradable polymeric layer 20;
- d) removing any liquid from the first system of a biodegradable primer composition to obtain a first biodegradable primer layer 30;
- e) applying a vapor deposited continuous layer 40 of an inorganic barrier onto the inner surface of the first biodegradable primer layer 30;
- f) applying a second liquid system of a biodegradable primer composition onto the inner surface of the vapor deposited inorganic barrier layer 40;
- g) removing the liquid from the second aqueous system of a biodegradable primer composition to obtain a second biodegradable primer layer 50;
- h) applying a second aqueous system of a water-borne biodegradable polymeric composition onto the inner surface of the second biodegradable primer layer 50;
- i) removing the water from the second aqueous system of the water-borne biodegradable polymeric composition to obtain a second biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a second embodiment, the method of making to create the biodegradable and recyclable barrier paper laminate 150 comprising the following steps:
- a) applying a first aqueous system of a water-borne biodegradable polymeric composition onto the inner surface of the biodegradable and recyclable paper layer 10, said paper layer is preferably machine glazed and/or sized or is a vellum or glassine paper to avoid hydro-expansion;
- b) removing the water from the first aqueous system of a water-borne biodegradable polymeric composition to obtain a first biodegradable polymeric layer 20;
- c) applying a first liquid system of a biodegradable primer composition onto the inner surface of the first biodegradable polymeric layer 20;
- d) removing the liquid from the first system of a biodegradable primer composition to obtain a first biodegradable primer layer 30;
- e) applying a vapor deposited continuous inorganic barrier layer 40 onto the inner surface of the first biodegradable primer layer;
- f) applying a second liquid system of a biodegradable primer composition onto the inner surface of the vapor deposited inorganic barrier layer 40;
- g) removing the liquid from the second system of a biodegradable primer composition to obtain a second biodegradable primer layer 50;
- h) melting a second biodegradable polymeric composition within an extruder; thermally extruding the molten second biodegradable polymeric composition onto the surface of the second biodegradable primer layer 50;
- i) cooling the second biodegradable polymeric composition to form the second biodegradable polymeric layer 60.

For cases where the water-borne biodegradable polymeric composition or primer composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a third embodiment, the method of making to create the biodegradable and recyclable barrier paper laminate 150 comprising the following steps:
- a) applying a first aqueous system of a water-borne biodegradable polymeric composition onto the inner surface of the biodegradable and recyclable paper layer 10, said paper layer is preferably machine glazed and/or sized or is a vellum or glassine paper to avoid hydro-expansion;
- b) removing the water from the first aqueous system of the water-borne biodegradable polymeric composition to obtain a first biodegradable polymeric layer 20;
- c) applying a first aqueous system of a liquid biodegradable primer composition onto the inner surface of the first biodegradable polymeric layer 20;
- d) removing the liquid from the first system of a biodegradable primer composition to obtain a first biodegradable primer layer 30;
- e) applying a vapor deposited continuous inorganic barrier layer onto the inner surface of the first biodegradable primer layer 30;
- f) applying a second liquid system of a biodegradable primer composition onto the inner surface of the inorganic barrier layer 40;
- g) removing the water from the second system of a biodegradable primer composition to obtain a second biodegradable primer layer 50;

h) separately obtaining a film made from a biodegradable polymeric composition that can be made by a variety of methods including solution casting, thermal cast film extrusion and thermal blown film extrusion;

i) applying said film made from a biodegradable polymeric composition onto the surface of the biodegradable primer layer and heat laminating them together to form the second biodegradable polymeric layer 60.

For cases where the water-borne biodegradable polymeric composition or primer composition is not water-soluble, an additional step is normally required to heat the biodegradable polymeric composition in order to melt it and to allow it to form a continuous biodegradable polymeric layer—this heating step is not normally needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a fourth embodiment, the method of making to create the biodegradable and recyclable barrier paper laminate 650 comprising the following steps:
  a) applying a first aqueous system of a water-borne biodegradable polymeric composition onto the inner surface of the biodegradable and recyclable paper layer 10, said paper layer is preferably machine glazed and/or sized or is a vellum or glassine paper to avoid hydro-expansion;
  b) removing the water from the first aqueous system of the water-borne biodegradable polymeric composition to obtain a first biodegradable polymeric layer 20;
  c) applying a first aqueous system of a liquid biodegradable primer composition onto the inner surface of the first biodegradable polymeric layer 20;
  d) removing the liquid from the first system of a biodegradable primer composition to obtain a first biodegradable primer layer 30;
  e) applying a vapor deposited continuous inorganic barrier layer onto the inner surface of the first biodegradable primer layer 30;
  f) applying a second liquid system of a biodegradable primer composition onto the inner surface of the inorganic barrier layer 40;
  g) removing the water from the second system of a biodegradable primer composition to obtain a second biodegradable primer layer 50;
  h) applying a biodegradable adhesive 60 to the inner surface of the second biodegradable primer layer 50;
  i) separately obtaining a film made from a biodegradable polymeric composition that can be made by a variety of methods including solution casting, thermal cast film extrusion and thermal blown film extrusion;
  j) applying said film made from a biodegradable polymeric composition onto the surface of the biodegradable adhesive to form the second biodegradable polymeric layer 60.

For cases where the water-borne biodegradable polymeric composition or primer composition is not water-soluble, an additional step is normally required to heat the biodegradable polymeric composition in order to melt it and to allow it to form a continuous biodegradable polymeric layer—this heating step is not normally needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a fifth embodiment, the method of making to method of making to create the biodegradable and recyclable barrier paper laminate 250 comprising the following steps:
  a) applying a first aqueous system of a water-borne biodegradable polymeric composition onto the inner surface of a biodegradable and recyclable paper layer 10, said paper layer is preferably machine glazed and/or sized or is a vellum or glassine paper to avoid hydro-expansion;
  b) removing the water from the first aqueous system of a water-borne biodegradable polymeric composition to obtain a first biodegradable polymeric layer 20;
  c) applying a first liquid system of a biodegradable primer composition onto the inner surface of the first biodegradable polymeric layer 10;
  d) removing any liquid from the first system of a water-borne biodegradable primer composition to obtain a first biodegradable primer layer 30;
  e) applying a vapor deposited continuous layer of an inorganic barrier 40 onto the inner surface of the first biodegradable primer layer 30;
  f) applying a second aqueous system of a water-borne biodegradable polymeric composition onto the inner surface of the inorganic barrier layer;
  g) removing the water from the second aqueous system of the water-borne biodegradable polymeric composition to obtain a second biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a sixth embodiment, the method of making to method of making to create the biodegradable and recyclable barrier paper laminate 250 comprising the following steps:
  a) applying a first aqueous system of a water-borne biodegradable polymeric composition onto the inner surface of a biodegradable and recyclable paper layer 10, said paper layer is preferably machine glazed and/or sized or is a vellum or glassine paper to avoid hydro-expansion;
  b) removing the water from the first aqueous system of a water-borne biodegradable polymeric composition to obtain a first biodegradable polymeric layer 20;
  c) applying a first liquid system of a biodegradable primer composition onto the inner surface of the first biodegradable polymeric layer 20;
  d) removing any liquid from the first system of a water-borne biodegradable primer composition to obtain a first biodegradable primer layer 30;
  e) applying a vapor deposited continuous layer of an inorganic barrier 40 onto the inner surface of the first biodegradable primer layer 30;
  f) melting a second biodegradable polymeric composition within an extruder;
  g) thermally extruding the molten second biodegradable polymeric composition onto the surface of the inorganic barrier layer 40;

h) cooling the second biodegradable polymeric composition to form the second biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a seventh embodiment, the method of making to method of making to create the biodegradable barrier paper laminate 250 comprising the following steps:
a) applying a first aqueous system of a water-borne biodegradable polymeric composition onto the inner surface of a biodegradable and recyclable paper layer 10, said paper layer is preferably machine glazed and/or sized or is a vellum or glassine paper to avoid hydro-expansion;
b) removing the water from the first aqueous system of a water-borne biodegradable polymeric composition to obtain a first biodegradable polymeric layer 20;
c) applying a first liquid system of a biodegradable primer composition onto the inner surface of the first biodegradable polymeric layer 20;
d) removing any liquid from the first system of a water-borne biodegradable primer composition to obtain a first biodegradable primer layer 30;
e) applying a vapor deposited continuous layer of an inorganic barrier 40 onto the inner surface of the first biodegradable primer layer;
f) separately obtaining a film made from a biodegradable polymeric composition that can be made by a variety of methods including solution casing, thermal cast film extrusion and thermal blown film extrusion;
g) applying said film made from a biodegradable polymeric composition onto the surface of the inorganic barrier layer 40 and heat laminating them together to form the second biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In an eighth embodiment, the method of making to method of making to create the biodegradable barrier paper laminate 750 comprising the following steps:
a) applying a first aqueous system of a water-borne biodegradable polymeric composition onto the inner surface of a biodegradable and recyclable paper layer 10, said paper layer is preferably machine glazed and/or sized or is a vellum or glassine paper to avoid hydro-expansion;
b) removing the water from the first aqueous system of a water-borne biodegradable polymeric composition to obtain a first biodegradable polymeric layer 20;
c) applying a first liquid system of a biodegradable primer composition onto the inner surface of the first biodegradable polymeric layer 20;
d) removing any liquid from the first system of a water-borne biodegradable primer composition to obtain a first biodegradable primer layer 30;
e) applying a vapor deposited continuous layer of an inorganic barrier 40 onto the inner surface of the first biodegradable primer layer 30;
f) applying a biodegradable adhesive 60 to the inner surface of the inorganic barrier layer 40;
g) separately obtaining a film 60 made from a biodegradable polymeric composition that can be made by a variety of methods including solution casing, thermal cast film extrusion and thermal blown film extrusion;
h) applying said film made from a biodegradable polymeric composition onto the surface of the biodegradable adhesive to form the second biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a ninth embodiment, the method of making to method of making to create the biodegradable and recyclable barrier paper laminate 450 comprising the following steps:
a) applying a first liquid system of a biodegradable primer composition onto the inner surface of a biodegradable and recyclable paper layer, said paper layer is preferably machine glazed and/or sized or is a vellum or glassine paper to avoid hydro-expansion; removing any liquid from the first system of a water-borne biodegradable primer composition to obtain a first biodegradable primer layer;
b) applying a vapor deposited continuous layer of an inorganic barrier 40 onto the inner surface of the first biodegradable primer layer 30;
c) applying a second liquid system of a biodegradable primer composition onto the inner surface of the vapor deposited inorganic barrier layer 40;
d) removing the liquid from the second aqueous system of a biodegradable primer composition to obtain a second biodegradable primer layer 50;
e) applying an aqueous system of a water-borne biodegradable polymeric composition onto the inner surface of the biodegradable primer layer 50;
f) removing the water from the aqueous system of the water-borne biodegradable polymeric composition to obtain a biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a tenth embodiment, the method of making to method of making to create the biodegradable and recyclable barrier paper laminate 450 comprising the following steps:
a) applying a first liquid system of a biodegradable primer composition onto the inner surface of a biodegradable and recyclable paper layer 10, said paper layer is preferably machine glazed and/or sized or is a vellum or glassine paper to avoid hydro-expansion;
b) removing any liquid from the first system of a water-borne biodegradable primer composition to obtain a first biodegradable primer layer 30;
c) applying a vapor deposited continuous layer of an inorganic barrier 40 onto the inner surface of the first biodegradable primer layer 30;
d) applying a second liquid system of a biodegradable primer composition onto the inner surface of the vapor deposited inorganic barrier layer 40;
e) removing the liquid from the second aqueous system of a biodegradable primer composition to obtain a second biodegradable primer layer 50;
f) melting a second biodegradable polymeric composition within an extruder; thermally extruding the molten second biodegradable polymeric composition onto the surface of the second biodegradable primer layer 50;
g) cooling the second biodegradable polymeric composition to form the second biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In an eleventh embodiment, the method of making to method of making to create the biodegradable and recyclable barrier paper laminate 450 comprising the following steps:
a) applying a first liquid system of a biodegradable primer composition onto the inner surface of a biodegradable and recyclable paper layer 10, said paper layer is preferably machine glazed and/or sized or is a vellum or glassine paper to avoid hydro-expansion;
b) removing any liquid from the first system of a water-borne biodegradable primer composition to obtain a first biodegradable primer layer 30;
c) applying a vapor deposited continuous layer of an inorganic barrier 40 onto the inner surface of the first biodegradable primer layer 30;
d) applying a second liquid system of a biodegradable primer composition onto the inner surface of the vapor deposited inorganic barrier layer 40; removing the liquid from the second aqueous system of a biodegradable primer composition to obtain a second biodegradable primer layer 50;
e) separately obtaining a film made from a biodegradable polymeric composition that can be made by a variety of methods including solution casing, thermal cast film extrusion and thermal blown film extrusion;
f) applying said film made from a biodegradable polymeric composition onto the surface of the biodegradable primer layer and heat laminating together to form the second biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a twelfth embodiment, the method of making to method of making to create the biodegradable and recyclable barrier paper laminate 850 comprising the following steps:
g) applying a first liquid system of a biodegradable primer composition onto the inner surface of a biodegradable and recyclable paper layer 10, said paper layer is preferably machine glazed and/or sized or is a vellum or glassine paper to avoid hydro-expansion;
h) removing any liquid from the first system of a water-borne biodegradable primer composition to obtain a first biodegradable primer layer 30;
i) applying a vapor deposited continuous layer of an inorganic barrier 40 onto the inner surface of the first biodegradable primer layer 30;
j) applying a second liquid system of a biodegradable primer composition onto the inner surface of the vapor deposited inorganic barrier layer 40; removing the liquid from the second aqueous system of a biodegradable primer composition to obtain a second biodegradable primer layer 50;
k) applying a biodegradable adhesive layer 60 to the inner surface of the second biodegradable primer layer 50;
l) separately obtaining a film made from a biodegradable polymeric composition that can be made by a variety of methods including solution casing, thermal cast film extrusion and thermal blown film extrusion;
m) applying said film made from a biodegradable polymeric composition onto the surface of the biodegradable adhesive to form the second biodegradable polymeric layer 60.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a thirteenth embodiment, the method of making to create the biodegradable and recyclable barrier paper laminate 350 comprising the following steps:
a) applying an aqueous system of a water-borne biodegradable polymeric composition onto the inner surface of a biodegradable and recyclable paper layer 10, said paper layer is preferably machine glazed and/or sized or is a vellum or glassine paper to avoid hydro-expansion;
b) removing the water from the aqueous system of a water-borne biodegradable polymeric composition to obtain a biodegradable polymeric layer 20;
c) applying a first liquid system of a biodegradable primer composition onto the inner surface of the first biodegradable polymeric layer 20;

d) removing any liquid from the first system of a water-borne biodegradable primer composition to obtain a first biodegradable primer layer 30;

e) applying a vapor deposited continuous layer of an inorganic barrier 40 onto the inner surface of the first biodegradable primer layer 30;

f) applying a second liquid system of a biodegradable primer composition onto the inner surface of the vapor deposited inorganic barrier layer 40;

g) removing the liquid from the second aqueous system of a biodegradable primer composition to obtain a second biodegradable primer layer 50.

For cases where the water-borne biodegradable polymeric or primer composition is not water-soluble, an additional step is often required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a fourteenth embodiment, the method of making to method of making to create the biodegradable and recyclable barrier paper laminate 550 comprising the following steps:

a) applying a liquid system of a first biodegradable primer composition onto the inner surface of a biodegradable and recyclable paper layer 10, said paper layer is preferably machine glazed and/or sized or is a vellum or glassine paper to avoid hydro-expansion;

b) removing the liquid from the system of a first biodegradable primer composition to obtain a first biodegradable primer layer 30;

c) applying a vapor deposited continuous layer of an inorganic barrier 40 onto the inner surface of the first biodegradable primer layer 30;

d) applying a second liquid system of a biodegradable primer composition onto the inner surface of the vapor deposited inorganic barrier layer 40;

e) removing the liquid from the second aqueous system of a biodegradable primer composition to obtain a second biodegradable primer layer 50.

In some cases, it may be necessary to apply a corona treatment to the layer that the biodegradable polymeric or primer layer is added onto, in order to increase the surface energy of that layer which in turn will enhance adhesion between the two layers.

In a fifteenth embodiment, the method of making to create the biodegradable and recyclable barrier paper laminate 150 comprising the following steps:

a) applying a first aqueous system of a water-borne biodegradable polymeric composition onto the surface of a removeable flat carrier 80, such as a PET film or a steel belt;

b) removing the water from the first aqueous system of a water-borne biodegradable polymeric composition to obtain a first biodegradable polymeric layer 20;

c) applying a first liquid system of a biodegradable primer composition onto the inner surface of the first biodegradable polymeric layer 20;

d) removing the water from the first liquid system of a biodegradable primer composition to obtain a first biodegradable primer layer 30;

e) applying a vapor deposited continuous layer of inorganic barrier layer 40 onto the inner surface of the first biodegradable primer layer 30;

f) applying a second liquid system of a biodegradable primer composition onto the inner surface of the inorganic barrier layer 40;

g) removing the liquid from the second system of a water-borne biodegradable primer composition to obtain a second biodegradable primer layer 50;

h) applying a second aqueous system of a water-borne biodegradable polymeric composition onto the surface of the biodegradable and recyclable paper layer 10, said paper layer is preferably machine glazed and/or sized or is a vellum or glassine paper to avoid hydro-expansion;

i) combining the outer surface of the second biodegradable primer layer 50 against the second aqueous system of a water-borne biodegradable polymeric composition coated onto the biodegradable and recyclable paper 10;

j) removing the water from the second aqueous solution of a water-borne biodegradable polymeric composition to obtain a second biodegradable polymeric layer 60;

k) removing the flat carrier 80 from the resulting biodegradable barrier paper laminate.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a sixteenth embodiment, the method of making to create the second biodegradable and recyclable barrier paper laminate 250 comprising the following steps:

a) applying a first aqueous system of a water-borne biodegradable polymeric composition onto the surface of a removeable flat carrier 80, such as a PET film or a steel belt;

b) removing the water from the first aqueous system of a water-borne biodegradable polymeric composition to obtain a first biodegradable polymeric layer 20;

c) applying a vapor deposited continuous layer of inorganic barrier layer 40 onto the inner surface of the first biodegradable primer layer 30;

d) applying a liquid system of a biodegradable primer composition onto the inner surface of the inorganic barrier layer 40;

e) removing the liquid from the second system of a water-borne biodegradable primer composition to obtain a second biodegradable primer layer 50;

f) applying a second aqueous system of a water-borne biodegradable polymeric composition onto the surface of the biodegradable and recyclable paper layer 10, said paper layer is preferably machine glazed and/or sized or is a vellum or glassine paper to avoid hydro-expansion;
g) combining the outer surface of the second biodegradable primer layer 50 against the second aqueous system of a water-borne biodegradable polymeric composition coated onto the biodegradable and recyclable paper 10;
h) removing the water from the second aqueous solution of a water-borne biodegradable polymeric composition to obtain a second biodegradable polymeric layer 60;
i) removing the flat carrier 80 from the resulting biodegradable barrier paper laminate.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a seventeenth embodiment, the method of making to create the biodegradable and recyclable barrier paper laminate 350 comprising the following steps:
a) applying a first liquid system of a biodegradable primer composition onto the surface of a removeable flat carrier 80, such as a PET film or a steel belt;
b) removing the water from the first liquid system of a biodegradable primer composition to obtain a first biodegradable primer layer 30;
c) applying a vapor deposited continuous layer of inorganic barrier layer 40 onto the inner surface of the first biodegradable primer layer 30;
d) applying a second liquid system of a biodegradable primer composition onto the inner surface of the inorganic barrier layer 40;
e) removing the liquid from the second system of a water-borne biodegradable primer composition to obtain a second biodegradable primer layer 50;
f) applying a second aqueous system of a water-borne biodegradable polymeric composition onto the surface of the biodegradable and recyclable paper layer 10, said paper layer is preferably machine glazed and/or sized or is a vellum or glassine paper to avoid hydro-expansion;
g) combining the outer surface of the second biodegradable primer layer 50 against the second aqueous system of a water-borne biodegradable polymeric composition coated onto the biodegradable and recyclable paper 10;
h) removing the water from the second aqueous solution of a water-borne biodegradable polymeric composition to obtain a second biodegradable polymeric layer 60;
i) removing the flat carrier 80 from the resulting biodegradable barrier paper laminate.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In an eighteenth embodiment, the method of making to create the biodegradable and recyclable barrier paper laminate 450 comprising the following steps:
a) applying a first aqueous system of a water-borne biodegradable polymeric composition onto the surface of a removeable flat carrier 80, such as a PET film or a steel belt;
b) removing the water from the first aqueous system of a water-borne biodegradable polymeric composition to obtain a first biodegradable polymeric layer 20;
c) applying a first liquid system of a biodegradable primer composition onto the inner surface of the first biodegradable polymeric layer 20;
d) removing the water from the first liquid system of a biodegradable primer composition to obtain a first biodegradable primer layer 30;
e) applying a vapor deposited continuous layer of inorganic barrier layer 40 onto the inner surface of the first biodegradable primer layer 30;
f) applying a second liquid system of a biodegradable primer composition onto the surface of the biodegradable and recyclable paper layer 10, said paper layer is preferably machine glazed and/or sized or is a vellum or glassine paper to avoid hydro-expansion;
g) combining the outer surface of the inorganic barrier layer 40 against the second system of a water-borne biodegradable primer (still wet) coated onto the biodegradable and recyclable paper 10;
h) removing the liquid from the second system of a water-borne biodegradable primer composition to obtain a second biodegradable primer layer 50;
i) removing the flat carrier 80 from the resulting biodegradable barrier paper laminate.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a nineteenth embodiment, the method of making to create the biodegradable and recyclable barrier paper laminate 550 comprising the following steps:
- a) applying a first liquid system of a biodegradable primer composition onto the surface of a removeable flat carrier 80, such as a PET film or a steel belt;
- b) removing the water from the first liquid system of a biodegradable primer composition to obtain a first biodegradable primer layer 30;
- c) applying a vapor deposited continuous layer of inorganic barrier layer 40 onto the inner surface of the first biodegradable primer layer 30;
- d) applying a second liquid system of a biodegradable primer composition onto the surface of the biodegradable and recyclable paper layer 10, said paper layer is preferably machine glazed and/or sized or is a vellum or glassine paper to avoid hydro-expansion;
- e) combining the outer surface of the inorganic barrier layer 40 against the second system of a water-borne biodegradable primer (still wet) coated onto the biodegradable and recyclable paper 10;
- f) removing the liquid from the second system of a water-borne biodegradable primer composition to obtain a second biodegradable primer layer 50;
- g) removing the flat carrier 80 from the resulting biodegradable barrier paper laminate.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

In a twentieth embodiment, the method of making to create the biodegradable and recyclable barrier paper laminate 950 comprising the following steps:
- a) applying a first aqueous system of a water-borne biodegradable polymeric composition onto the surface of a removeable flat carrier 80, such as a PET film or a steel belt;
- b) removing the water from the first aqueous system of a water-borne biodegradable polymeric composition to obtain a first biodegradable polymeric layer 20;
- c) applying a first liquid system of a biodegradable primer composition onto the inner surface of the first biodegradable polymeric layer 20;
- d) removing the water from the first liquid system of a biodegradable primer composition to obtain a first biodegradable primer layer 30;
- e) applying a vapor deposited continuous layer of inorganic barrier layer 40 onto the inner surface of the first biodegradable primer layer 30;
- f) applying a second aqueous system of a water-borne biodegradable polymeric composition onto the surface of the biodegradable and recyclable paper layer 10, said paper layer is preferably machine glazed and/or sized or is a vellum or glassine paper to avoid hydro-expansion;
- g) combining the outer surface of the inorganic barrier layer 40 against the second aqueous system of a water-borne biodegradable polymeric composition coated onto the biodegradable and recyclable paper 10;
- h) removing the water from the second aqueous solution of a water-borne biodegradable polymeric composition to obtain a second biodegradable polymeric layer 60;
- i) removing the flat carrier 80 from the resulting biodegradable barrier paper laminate.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

A twenty first embodiment, the method of making to create the biodegradable and recyclable barrier paper laminate 150 comprising the following steps:
- a) separately obtaining a film 60 made from a biodegradable polymeric composition that can be made by a variety of methods including solution casing, thermal cast film extrusion and thermal blown film extrusion—this should be as stiff as possible to support the coating layers to be added;
- b) applying a first liquid system of a biodegradable primer composition onto the inner surface of the first biodegradable polymeric layer;
- c) removing the water from the first liquid system of a biodegradable primer composition to obtain a first biodegradable primer layer 30;
- d) applying a vapor deposited continuous layer of inorganic barrier layer 40 onto the inner surface of the first biodegradable primer layer 30;
- e) applying a second liquid system of a biodegradable primer composition onto the inner surface of the inorganic barrier layer 40;
- f) removing the liquid from the second system of a water-borne biodegradable primer composition to obtain a second biodegradable primer layer 50;
- g) applying a second aqueous system of a water-borne biodegradable polymeric composition onto the surface of the biodegradable and recyclable paper layer, said paper layer is preferably machine glazed and/or sized or is a vellum or glassine paper to avoid hydro-expansion;

h) combining the outer surface of the second biodegradable primer layer 50 against the second aqueous system of a water-borne biodegradable polymeric composition (still wet) coated onto the biodegradable and recyclable paper;

i) removing the water from the second aqueous solution of a water-borne biodegradable polymeric composition to obtain a second biodegradable polymeric layer 20.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

A twenty second embodiment, the method of making to create the biodegradable and recyclable barrier paper laminate 250 comprising the following steps:

a) separately obtaining a film 60 made from a biodegradable polymeric composition that can be made by a variety of methods including solution casing, thermal cast film extrusion and thermal blown film extrusion—this should be as stiff as possible to support the coating layers to be added;

b) applying a vapor deposited continuous layer of inorganic barrier layer 40 onto the inner surface of the polymeric film layer 60;

c) applying a liquid system of a biodegradable primer composition onto the inner surface of the inorganic barrier layer 40;

d) removing the liquid from the second system of a water-borne biodegradable primer composition to obtain a second biodegradable primer layer 50;

e) applying a second aqueous system of a water-borne biodegradable polymeric composition onto the surface of the biodegradable and recyclable paper layer 10, said paper layer is preferably machine glazed and/or sized or is a vellum or glassine paper to avoid hydro-expansion;

f) combining the outer surface of the biodegradable primer layer 30 against the second aqueous system of a water-borne biodegradable polymeric composition (still wet) coated onto the biodegradable and recyclable paper;

g) removing the water from the second aqueous solution of a water-borne biodegradable polymeric composition to obtain a second biodegradable polymeric layer 20.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

A twenty third embodiment, the method of making to create the biodegradable and recyclable barrier paper laminate 450 comprising the following steps:

a) separately obtaining a film 60 made from a biodegradable polymeric composition that can be made by a variety of methods including solution casing, thermal cast film extrusion and thermal blown film extrusion—this should be as stiff as possible to support the coating layers to be added;

b) applying a first liquid system of a biodegradable primer composition onto the inner surface of the first biodegradable polymeric layer 60;

c) removing the water from the first liquid system of a biodegradable primer composition to obtain a first biodegradable primer layer 50;

d) applying a vapor deposited continuous layer of inorganic barrier layer 40 onto the inner surface of the first biodegradable primer layer 50;

e) applying a second liquid system of a biodegradable primer composition onto the surface of the biodegradable and recyclable paper layer 10, said paper layer is preferably machine glazed and/or sized or is a vellum or glassine paper to avoid hydro-expansion;

f) combining the outer surface of the inorganic barrier layer 40 against the second liquid system of a biodegradable primer composition (still wet) coated onto the biodegradable and recyclable paper;

g) removing the liquid from the second system of a water-borne biodegradable primer composition to obtain a second biodegradable primer layer 20.

In some cases, it may be preferable to apply the second liquid system of a biodegradable primer composition directly onto the inorganic barrier layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

A twenty fourth embodiment, the method of making to create the ninth biodegradable and recyclable barrier paper laminate 950 comprising the following steps:

a) separately obtaining a film 60 made from a biodegradable polymeric composition that can be made by a variety of methods including solution casing, thermal cast film extrusion and thermal blown film extrusion—this should be as stiff as possible to support the coating layers to be added;

b) applying a first liquid system of a biodegradable primer composition onto the inner surface of the first biodegradable polymeric layer;

c) removing the water from the first liquid system of a biodegradable primer composition to obtain a first biodegradable primer layer 50;

d) applying a vapor deposited continuous layer of inorganic barrier layer 40 onto the inner surface of the first biodegradable primer layer;

e) applying a second aqueous system of a water-borne biodegradable polymeric composition onto the surface of the biodegradable and recyclable paper layer 10, said paper layer is preferably machine glazed and/or sized or is a vellum or glassine paper to avoid hydro-expansion;

f) combining the outer surface of the inorganic barrier layer 40 against the second aqueous system of a water-borne biodegradable polymeric composition (still wet) coated onto the biodegradable and recyclable paper 10;

g) removing the water from the second aqueous solution of a water-borne biodegradable polymeric composition to obtain a second biodegradable polymeric layer 20.

In some cases, it may be preferable to apply the second aqueous solution of a water-borne biodegradable polymeric composition directly onto the second biodegradable primer layer and then apply the biodegradable and recyclable paper directly onto it whilst it is still wet. And in other cases, it may be preferable to let the second aqueous solution of a water-borne biodegradable polymeric composition dry first, on whichever substrate it was placed, and then heat laminate it to the rest of the structure. For cases where the water-borne biodegradable polymeric composition is not water-soluble, an additional step is normally required to heat the biodegradable polymeric composition in order to melt it and to allow it to form a continuous biodegradable polymeric layer—this heating step is normally not needed in the case that the biodegradable polymeric composition is water-soluble. In some cases, it may be necessary to apply a corona treatment to the layer that the biodegradable polymeric or primer layer is added onto, in order to increase the surface energy of that layer which in turn will enhance adhesion between the two layers.

Forming Biodegradable Polymeric Layers from Water-Borne Solutions (for Water Soluble Polymers)

To make the water-borne biodegradable polymeric layers 20 or 70 from a water-borne polymeric composition that is water-soluble, an aqueous polymeric water-borne solution is typically formed by taking the water-soluble polymer as a solid form and first dissolving it into water using moderate stirring, typically 20% water-soluble polymers for 80% water by weight. The aqueous polymeric solution is then further combined with other additives such as plasticizers under moderate stirring at high temperature to form an aqueous polymeric system. The aqueous polymeric system is then coated onto the substrate to be coated. Once coated, the water is removed via a convective or diffusive drying process.

Without being limited to theory, it is believed that the most important material properties of the aqueous polymeric system where the polymer is water-soluble are: a) the solubility in water of the polymer(s) at given temperature between 20-95° C.; b) the resulting viscosity of the aqueous polymeric system at that temperature, higher viscosity being better for maximum distinction/separation between the layers; c) the wetting of the aqueous polymeric system either onto a range of substrates, higher wetting being better.

Forming Biodegradable Polymeric Layers from Water-Borne Emulsions (for Water In-Soluble Polymers)

To make the water-borne biodegradable polymeric layers 20 or 70 from a water-borne polymeric composition where the polymer is water in-soluble, a pre-made dispersion/emulsion of the biodegradable polymer is obtained from the manufacturer, or a dispersion/emulsion must be formed if a pre-made dispersion/emulsion is not available. The aqueous polymeric system is then coated onto the substrate to be coated and the water is removed via convective or diffusive drying process. Afterwards, enough heat is applied to form a continuous polymeric layer.

Without being limited to theory, it is believed that the most important material properties of the aqueous polymeric system are: a) the ability of the biodegradable polymer to be made into an emulsion in water; b) the resulting viscosity of the aqueous polymeric system at that temperature, higher viscosity being better for maximum distinction/separation between the layers; c) the wetting of the aqueous polymeric system either onto a substrate to be coated, higher wetting being better.

Forming Biodegradable Primer Layers from Liquids

Some inorganic-organic hybrid primers such as bio-ORMOCER will be laid down from a single liquid and some versions may be supplied in two liquids held in two different vessels that are mixed just before application. The inorganic-organic hybrid primers must normally be kept cool ahead of being used, in order to prevent premature curing of the primer. Other primers such as PVOH lacquer and Shellac are only supplied as a single liquid. After application to a surface, the primer will then be heated to drive off any water and/or solvents. For some primers such as the inorganic-organic hybrid polymers, this heating step will also initiate the curing process to solidify the primer layer. In some cases, a UV step, or electron beam radiation could be used instead of a heating step (or in addition to) in order to start the curing process, depending on the exact chemistry chosen.

Application Methods for Water-Borne Biodegradable Polymeric Solutions, Water-Borne Biodegradable Polymeric Dispersions/Emulsions and Liquid Biodegradable Primers Several processes are suitable for applying the water-borne polymeric layers and liquid primer layers, including wire rod coating, comma bar/Meyer bar coating, anilox roll coating, reverse roll coating, slot die extrusion coating, roll-to-roll coating, rotogravure, and spray coating. Flexo-printing/anilox, smooth rollers (for thin layers), and slot die coating (mainly for thicker layers).

Layers can be applied in one application, or via multiple applications. Multiple layers may be used within one structure and can either be adjoined or separated by other layers.

Within one structure, the various polymeric or primer layers may be substantially the same chemical composition or a different one, depending on the properties required by the entire structure.

Adhesion between sublayers is solely provided by the molecular interactions between the biodegradable polymers.

For biodegradable primers specifically, rotogravure coating is somewhat preferred in order to achieve very thin layers as thin as 1-5 um. Typically, low viscosity primers are preferred in order to help produce a very flat surface.

Drying Water-Borne Biodegradable Polymeric Solutions, Water-Borne Biodegradable Polymeric Dispersions/Emulsions and Liquid Biodegradable Primers The drying step for a water-borne biodegradable polymeric layer or biodegradable primer layer that is either water-soluble or water in-insoluble is typically performed by conveyor dryers, such as those commercialized by Krönert under the brand name Drytec, by Coatema under the brand name ModulDry and/or by FMP Technologies under the brand name SenDry or PureDry.

In some embodiments, the drying substrate is guided through the hot air tunnel by a running belt (belt dryers), by multiple idlers (rolling dryers) or by multiple hot air nozzles (floatation dryers). Without being limited to theory, it is believed that the most important parameters of the drying process are: The residence time of the drying substrate into the hot air tunnel, typically about 50 s for 60μ thick aqueous polymeric system where the polymer is water-soluble containing 25% solids; the temperature of the hot air, typically in the range 95° C. to 120° C.; the velocity of the hot air flowing above the substrate, typically about 25 m/s. The heating system can be electrical, thermal oil, steam or gas-fire based.

Additional Heating Steps when Using Water-Borne In-Soluble Polymers

For water-borne polymeric systems where the polymer is water in-soluble, an additional heating step may be required after drying in order to form a continuous polymeric layer, fusing together the particles help in the dispersion/emulsion via melting. In one example of a water-insoluble polymer PHA—after a PHA dispersion is coated onto the substrate, the layer is dried to remove water at a temperature of about 105° C. and the substrate is then heated to a higher temperature of 170° C. to form a continuous PHA layer that is no longer porous. When first dried the coating is white, porous and powdery, then fuses into a clear film within about 30 seconds at this higher temperature of 170° C. Both steps can be completed in one step at the higher temperature of 170° C. provided that the coating is not too thick.

Additional Information Regarding Application of Water-Borne or Liquid Coatings

In some embodiments, it may be preferred that the polymeric system is not aqueous alone but that the aqueous polymeric system also contains alcohol in a proportion 0 to 100%, or another solvent. In that case, special dryer venting systems may be required to safely eliminate the alcohol or solvent.

Application of Thermally Extruded Biodegradable Polymeric Layers

In some embodiments, the biodegradable polymeric composition must be applied to the rest of the structure via a lamination process. In one embodiment, lamination involves laying down a molten curtain of sealant polymer (this polymer will become the heat seal layer of the structure or could function as another layer if needed) onto a specific layer of the partially formed biodegradable and recyclable barrier paper laminate, moving at high speeds (typically about 100 to about 1000 feet per minute, preferably about 300 to about 800 feet per minute) as they come into contact with a cold (chill) roll. The molten curtain is formed by extruding the sealant polymer through a slot die.

Application of Thermally Extruded Biodegradable Polymeric Films

In some embodiments, the lamination is achieved by heat laminating an already produced polymeric film to the rest of the substrate.

Adhesive Lamination of Biodegradable Polymers Layers

In some embodiments, lamination is achieved via a solution based adhesive composition being coated onto the substrate and then applying the already produced film to the surface of the adhesive. Nonlimiting examples have already been listed.

Application of Inorganic Barrier Layers

Figure 9:
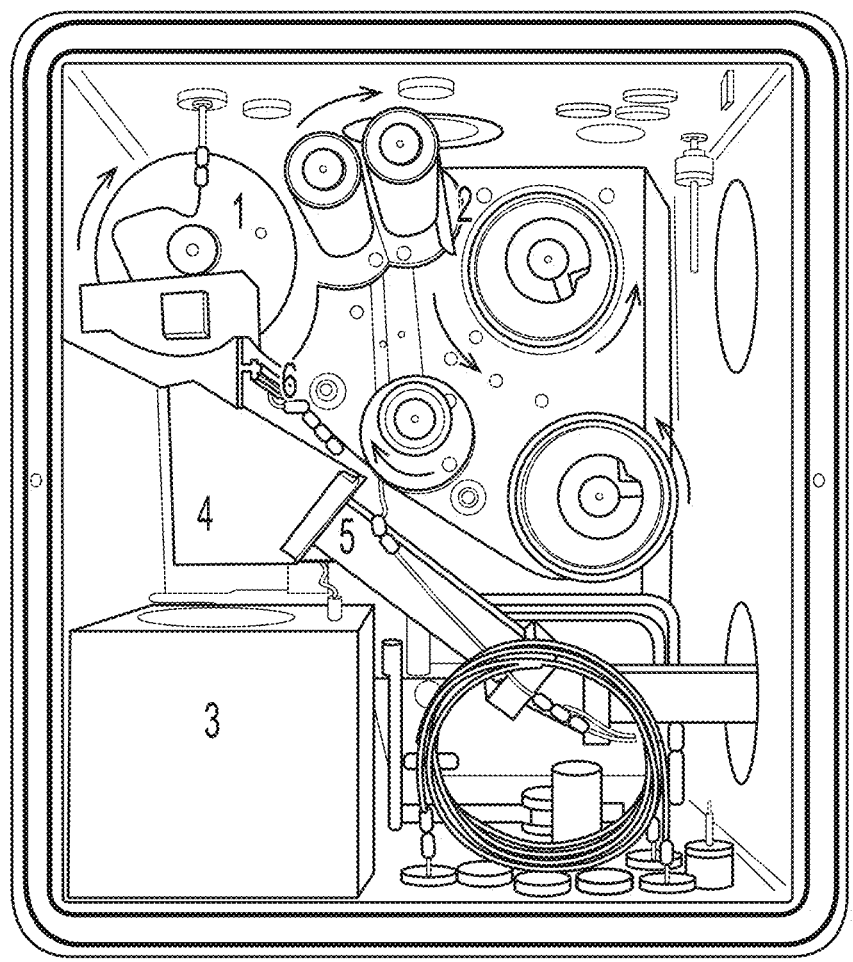
FIG. 9 shows the layout of inside of a vacuum chamber used for laying down the vapor deposited inorganic barrier layer according to the present invention.

As mentioned previously, there are multiple ways to apply inorganic barrier layers. For the samples produced, we used a vacuum web system manufactured by Leybold, at The Fraunhofer Institute for Process Engineering and Packaging IVV in Freising, Germany in order to conduct physical vapor deposition onto the structure, using electron beam evaporation. FIG. 9 shows the layout of the inside of the vacuum chamber. A substrate roll would be placed into the system and the vacuum would be pumped down—a process that took several hours due to the porosity of the paper layer within the substrate. Typically, the system was pumped down to a vacuum of 1.5×10-5 mbar (~0.01 Torr). The maximum roll width that can be placed into the system is 280 mm. The system would also cool the substrate roll ahead of deposition, so that any residual water was frozen in place—this was achieved via cooling rollers with liquid nitrogen to a temperature range of −5° C. to −10° C. This system would unroll the substrate moving at a web speed in the range of 0.9-1.2 m/minute, using a web tension of ~50N. Electron beam evaporation of a metal or metal oxide source was used to create a vapor which then deposited onto the substrate as it was unrolled. When aluminum was used as the target, the aluminum target used had a purity of 99.999%. In order to vaporize the aluminum target, an electric current of 450-500 mA was applied to form an electron beam that was focused onto the target. The coating rate of aluminum was in the range of 45-75 Å/second and so the web was moved at a suitable rate to obtain the desired thickness. Note that these specific machine settings could change if a different inorganic barrier layer chemistry was used. Once the inorganic coating was applied, the substrate was rolled up again. If needed, the surface could be cleaned with a microwave plasma treatment ahead of coating. Since we were applying layer thicknesses in the range of 60-120 nm, approximately 25 m of roll stock could be metallized in one day if the roll did not need to be changed, which would have required re-opening the chamber and several more hours for pumping down the vacuum.

Corona Treatments

In some embodiments, it is necessary to increase the surface energy of a particular material layer surface, in order to enhance the adhesion of another material layer to it. This is commonly performed by conducting a corona treatment on the surface, although there may be other ways to achieve this (such as plasma treatment). Corona treatment involves generating an electrical discharge from electrodes at the surface of a film or substrate, which then causes an increase in the surface energy of that film or substrate. At the industrial scale, there are many suppliers of roll-to-roll corona treatment equipment such as Enercon (https://www.enerconind.com/web-treating/corona-treatment.aspx).

For experiments on a smaller scale, it is possible to buy a hand-held corona treater.

Inks, Branding and Decoration

The biodegradable and recyclable barrier paper laminate according to the present invention will be opaque in most cases but could be translucent in a few cases with the right selection of materials. The biodegradable and recyclable barrier paper laminate according to the present invention may comprise a printed area. Printing may be achieved using standard printing techniques, such as flexographic, gravure, or inkjet printing.

The biodegradable and recyclable barrier paper laminate according to the present invention may be arranged as a package in a myriad of configurations. For example, the package may comprise a plurality of panels which enclose a plurality of articles. Each of these panels comprises an inner surface and an outer surface. The outer surface and/or inner surface of one or more panels may comprise ink or dyes which create branding on the package, package information, and/or background color, etc. The branding and/or other package information associated with the product within the package is provided on the outer surface of at least one panel. Branding can include logos, trade names, trademarks, icons, and the like associated with the product within the package. Branding is utilized to inform a consumer of the product within the package. Package information can include the size of the product, the number of products within the package, an exemplary image of the products contained within the package, recyclability logos, and the like associated with the products within the package.

In all aspects of the invention, the ink that is deposited can be either solvent-based or water-based and the pigments within the ink may be either organic or inorganic, or a combination of both. In some embodiments, the ink is highly abrasion resistant. For example, the high abrasion resistant ink can include coatings cured by ultraviolet radiation (UV) or electron beams (EB). In some embodiments, any organic pigments within the ink are derived from a petroleum source. In some embodiments, any organic pigments within the ink are derived from a renewable resource, such as soy, a plant. In some embodiments, any organic pigments within the ink will also be biodegradable if the pigment is organic and designed to biodegrade. In other embodiments, any inorganic pigments within the ink will be made from an inorganic metal oxide that is safely dispersible and not harmful to the environment at the levels used, even if itself is not biodegradable.

Non-limiting examples of inks that are not biodegradable but do not inhibit biodegradation and can safely disperse during biodegradation include ECO-SUREI™ from Gans Ink and Supply Co. and the solvent based VUTEk® and BioVu™ inks from EFI, which are derived completely from renewable resources (e.g., corn). Others include SunVisto AquaGreen, Aquathene from Sun Chemicals; and also INXhrc™ and GENESIS™ GS from Sakata Inx.

A biodegradable ink is not limited particularly and may for example be a regenerated vegetable oil ink, soybean oil ink and the like. The soybean oil ink is obtained by replacing all or a part of a petroleum-based solvent and a drying oil in a conventional ink with a soybean oil, and is advantageous since it allows the ink to be readily separated from the paper and to be degraded in a soil. The soybean oil ink may be available commercially for example from TOYO INK MFG. CO., LTD. or TOPPAN PRINTING CO., LTD. Another potential biodegradable ink is and Blue Iris from Sun Chemicals.

The ink is present in a thickness of about 0.5 µm to about 20 µm, preferably about 1 µm to about 10 µm, more preferably about 2.5 µm to about 3.5 µm.

The biodegradable barrier paper laminate of the present disclosure may comprise inks and/or dyes to provide a background color to the packages of the present disclosure. To further clarify the background color, it is worth noting that the paper layer comprises a base color. A base color of the paper layer is the color of the package without inks or dyes. For example, bleached paper is white in color, unbleached is brown in color, grass-derived paper is green in color and paper which includes recycled content is grey in color. A background color is any color that is not a base color, e.g. blue, red, green, yellow, purple, orange, black, or combinations thereof. However, background color can also include white, brown, or grey, if the color is achieved via inks and/or dyes.

In order to reduce the use of inks/dyes for the benefit of the recycling process, the natural color of the paper layer may be utilized. For example, inks/dyes may be used to define the background color of the consumer-facing panel only, whereas the natural color of the paper layer would be used as background color for the other panels of the flexible package.

Surface Coating for Ink Protection

In some embodiments, the printed surface of the biodegradable barrier paper laminate is surface coated to protect the ink layer from its physical and chemical environment, to increase the durability of the paper layer and to provide a glossy or matte finish. This optional surface coating may be called a lacquer or a varnish or a splash-resistant layer. In some embodiments, the surface coating is made from a nitrocellulose lacquer, an acrylic lacquer, a water-based lacquer, or a reactive two-components polyurethane lacquer. Biodegradable options are preferred. In some preferred embodiments, the surface coating is made from natural waxes passing the OECD301B biodegradation screening test, such as bees wax, rapeseed wax, castor wax, candelilla wax, soy wax, palm oil wax or another natural wax, provided that the temperature of exposure is not exceeding the wax melting point. In some cases, some paraffin oil-based waxes may also pass OECD301B. Because the thickness of the surface coating affects the recyclability and the biodegradation of the package made from the recyclable barrier paper laminate of the present invention, thinner surface coatings are preferred. The thickness of the surface coating is preferably between 0.1 µm to 25 µm, more preferably below 10 µm, even more preferably below 5 µm.

Method of Making a Biodegradable and Recyclable Paper Based Package

The biodegradable and recyclable barrier paper laminate described herein can be formed into articles, including but not limited to those in which typical film or sealable paper would be used as a packaging material. Such articles include, but are not limited to pouches, sachets, bags, flow-wraps, pillow bags and other containers. Pouches, sachets, bags, flow-wraps, pillow and other such containers that incorporate the biodegradable and recyclable barrier paper laminate described herein can be made in any suitable manner known in the art.

The biodegradable and recyclable barrier paper laminates made according to the present invention can be converted into the packages and articles using a form-fill-seal process (FFS). A traditional FFS process typically involves three successive steps where the package or article is formed from the paper laminate, filled, and then sealed or closed, as described in U.S. Pat. No. 6,293,402, which is incorporated herein for reference. In heat sealing methods, a temperature range exists above which the seal would be burnt, and below which the seal would not be sufficiently strong. Seals are provided by any sealing means known to one skilled in the art. Sealing can comprise the application of a continuously heated element to the paper laminate, and then removing the element after sealing. The heating element can be a hot bar that includes jaws or heated wheels that rotate. Different seal types include fin seals and overlap seals.

Single-Lane Process

A well-known sealing single lane process using a vertical form and fill machine is described in U.S. Pat. No. 4,521,437, incorporated herein by reference. In this process, a flat web of material is unwound from a roll and formed into a continuous tube by sealing the longitudinal edges on the film together to form a lap seal (i.e. fin seal). The resulting tube is pulled vertically downwards to a filling station, and collapsed across a transverse cross-section of the tube, the position of such cross-section being at a sealing device below the filling station. A transverse heat seal is made by the sealing device at the collapsed portion of the tube, thus making an air-tight seal across the tube.

After making the transverse seal, a pre-set volume of material to be packaged, e.g. flowable material, enters the tube at the filling station, and fills the tube upwardly from the aforementioned transverse seal. The tube is then dropped a predetermined distance under the influence of the weight of the material in the tube, and of the film advance mechanism on the machine. The jaws of the sealing device are closed, collapsing the tube at a second transverse section, which is above the air/material interface in the tube. The sealing device seals and severs the tube transversely at said second transverse section. The material-filled portion of the tube is now in the form of a pillow shaped sachet. Thus, the sealing device has sealed the top of the filled sachet, sealed the bottom of the next-to-be-formed sachet, and separated the filled sachet from the next-to-be-formed sachet, all in one operation.

Multi-Lane Process

The packages of the invention can also be processed using a multi-lane sachet packaging machine, such as the VEGA PACK300S by QuadroPack. A high-speed, multi-lane sachet processing machine is also described in U.S. Pat. No. 6,966,166, incorporated herein for reference. The machine used in this process includes two rolls for dispensing sheets of webbed film of equal dimensions, a plurality of sealing devices appropriate for such a substrate and means, such as the pump station described below for inserting contents (e.g. liquid, viscous materials, powders and other substances) into the film packages. A plurality of packages can be produced by utilizing one or more moveable reciprocating carriages that travel with the flow of film through the machine, the carriages supporting each of the sealing and cross-cutting stations. The sealing devices are applied to all but one of the edges, forming a pouch with a cavity and an opening. The desired contents of the package are inserted into the cavity through the opening. The opening is then sealed and separated from the substrate. A pair of substrate rolls is provided at the substrate roll station. Alternatively, a cutter can be placed at a middle of a single nip roller to divide the substrate width into two equal parts. Sheets of paper laminates are advanced through the apparatus by the pull-wheel station and used to form the front and back panels of the package. The paper laminate from each roll is guided so that the two sheets of paper laminate are in close proximity to, and in a parallel relationship with, one another when they are advanced through the machine. The sealing and cutting devices include: longitudinal sealing bars to seal the package's vertical sides, a unidirectional roller to hold the paper laminate in position and prevent it from sliding backward, a vertical cutter to cut a tear-off slit into the package in the vertical direction, and cross-sealing bars to seal the packages in horizontal direction. The pump station comprises of a plurality of fill dispensers in communication with a storage structure containing the consumer product into the package. These dispensers are capable of drawing a pre-determined quantity of consumer product from a reservoir and depositing it into the cavities of the paper laminate packages formed by the machine. In the preferred embodiment, the pump station and dispensers may be driven by one or more motion-controlled servomotors in communication with the cam system. The quantity of consumer product may be changed by exchanging the dispensers (with different dispensers having more or less capacity), changing the stroke of the pump cycle, changing the timing of the pump cycle, and the like. Therefore, different quantities of consumer products can be dispensed, depending upon the size and capacity of the packages to be formed by the machine.

The sealing mechanism can be thermal heat sealing, water sealing, moisture sealing, ultrasonic sealing, infrared sealing or any other type of sealing deemed suitable.

Articles of Manufacture

Plastic films have historically been used as the primary package (the package on store shelves) material for many different types of articles, but the recyclable barrier paper laminate of the present disclosure may be used instead. The present inventive material meets the need for natural based packaging materials which are flexible and resilient. The recyclable barrier paper laminate of the present invention meets the need for natural based packaging materials which can withstand the rigors of several types of packaging process. Furthermore, it meets the need for natural based packaging materials which exhibits barrier properties and can be readily recycled by consumers. Even furthermore, the recyclable barrier paper laminate of the present disclosure meets the need for natural based, barrier packaging materials which are viewed by consumers as non-plastic and technically validated to be non-plastic.

Figure 10A:
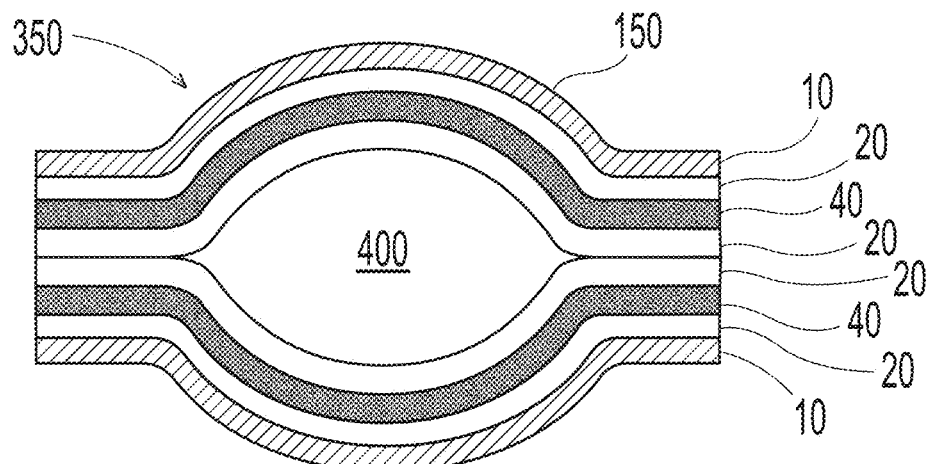
FIGS. 10A-C show schematic representations of applications of biodegradable and recyclable barrier paper laminates.
Figure 10B:
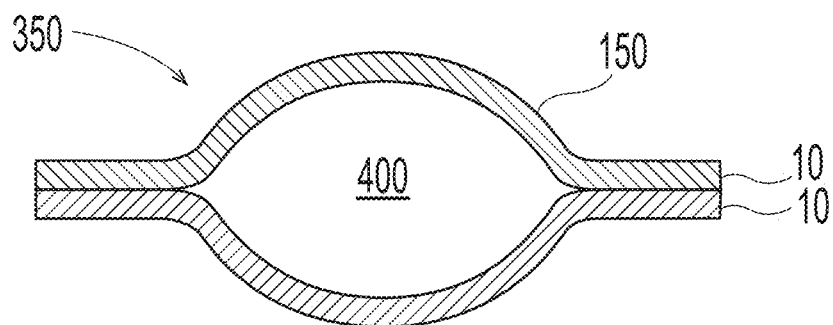
Figure 10C:
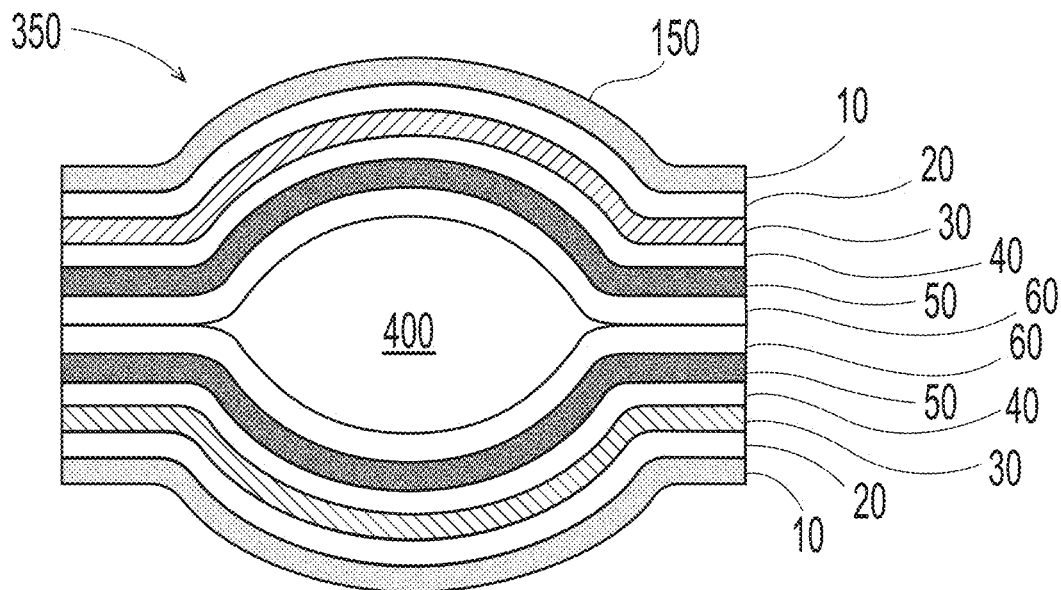

As shown in FIGS. 10A-C, the present invention also includes articles comprising a product composition 400 and a biodegradable and recyclable barrier paper laminate 150 (as described previously) which may be formed into a container 350, such as a pouch, a sachet, a capsule, a bag, etc. to hold the product composition. For simplicity, the articles of interest herein will be described in terms of biodegradable and recyclable barrier paper pouches, although it should be understood that discussion herein also applies to other types of containers.

The pouches 350 formed by the foregoing methods, can be of any form and shape which is suitable to hold the composition 400 contained therein, until it is desired to release the composition 400 from the biodegradable and recyclable barrier paper laminate pouch 350, such as by ripping it open. The pouches 350 may comprise one compartment, or two or more compartments (that is, the pouches can be multi-compartment pouches). In one embodiment, the biodegradable and recyclable barrier paper laminate pouch 350 may have two or more compartments.

In one embodiment, the biodegradable and recyclable barrier paper laminate may be sealed to a different biodegradable and recyclable barrier paper laminate that has been prepared in a different way. For example, a translucent biodegradable and recyclable barrier paper laminate may be sealed to an opaque biodegradable and recyclable barrier paper laminate. This enables the consumer to see the product inside the package, without modifying the recyclability of the package, and without degrading the barrier properties of the overall package.

In one embodiment, the biodegradable and recyclable barrier paper laminate may be sealed to a water-soluble barrier film that does not have paper attached. This enables a window into the package to be formed so that the consumer can see the product, without modifying the recyclability of the package.

The pouches or other containers 350 may contain a unit dose of one or more compositions 400 from a range of products that could include (but not limited to) contain a consumer product. As used herein, "consumer product" refers to materials that are used for hair care, beauty care, oral care, health care, personal cleansing, and household cleansing, for example. Non-limiting examples of consumer products include shampoo, conditioner, mousse, face soap, hand soap, body soap, liquid soap, bar soap, moisturizer, skin lotion, shave lotion, toothpaste, mouthwash, hair gel, hand sanitizer, laundry detergent compositions dishwashing detergent, automatic dishwashing machine detergent compositions, hard surface cleaners, stain removers, fabric enhancers and/or fabric softeners, cosmetics, and over-the-counter medication, electronics, pharmaceuticals, confectionary, pet healthcare products, cannabis derived products, hemp derived products, CBD based products, other products derived from drugs other than cannabis, vitamins, non-pharmaceutical natural/herbal "wellness" products, razors, absorbent articles, wipes, hair gels, food and beverage, animal food products, menstrual cups, exfoliating pads, electrical and electronic consumer devices, brushes, applicators, ear plugs, eye masks, eye patches, face masks, agricultural products, plant food, plant seeds, insecticides, ant killers, alcoholic beverages, animal food products and new product forms.

The biodegradable & recyclable barrier paper laminate of the present disclosure may be used as the primary package material for absorbent articles. The term "absorbent article" as used herein refers to devices which absorb and contain exudates, and, more specifically, refers to devices which are placed against or in proximity to the body of the wearer to absorb and contain the various exudates discharged from the body. Absorbent articles of the present disclosure include, but are not limited to, diapers, adult incontinence briefs, training pants, diaper holders, menstrual pads, feminine hygiene pads, incontinence pads, liners, absorbent inserts, pantiliners, tampons, period pants, sponges, tissues, paper towels, wipes, flannels and the like.

The composition 400 inside the pouches 350 can be in any suitable form including, but not limited to: powders, solid foams, fibers, solids, granules, liquids, gels, pastes, creams, capsules, pills, dragees, solid foams, fibers, absorbent articles, nonwovens, etc. The pouches are particularly suitable for dry products, in addition to some pastes, gels, liquids products that contain less than 30% water, more preferably less than 20% water. The packages and articles of the present invention are resistant to the consumer product. As used herein, "resistant" refers to the ability of the packages and articles to maintain their mechanical properties and artwork on their surfaces, as designed, without degradation of the package and article via diffusion of the consumer product through the package material.

Additional product forms (articles) that could be package inside such a package—and/or instead that could be manufactured from the biodegradable & recyclable paper barrier laminate itself include, disposable aprons, laundry bags & covers, disposable hospital bedding, skin patches, face masks, disposable gloves, disposable hospital gowns, medical equipment, skin wraps, agricultural mulch films, shopping bags, refill pouch, reloadable component into a durable system, sandwich bags, trash bags, emergency blankets and clothing, building/construction wrap & moisture resistant liners, primary packaging for shipping, such as envelopes and mailers, car wrappers (for transportation of cars), non-absorbent textiles and clothing, articles that can be used to encase clothing items, for example dresses, shirts, suits, and shoes.

For packaging applications, the different compartments of multi-compartment pouches 350 may be used to separate incompatible ingredients. For example, it may be desirable to separate dry shampoo and dry conditioner, or laundry powder and laundry additives into separate compartments.

Due to improvements in water vapor and oxygen barrier, the dyes and perfumes typically used in some products should have greater stability inside pouches made from biodegradable paper barrier laminates compared to pouches made from paper laminates without barrier. Also, it is likely that the barrier against migration of grease, surfactants and other chemistries contained within the packaging will be improved compared to packages made from paper laminate without barrier.

At the end of life of the package, the package may be recycled by the consumer in conventional paper recycling systems. The structure will break up in the re-pulping system, enabling the paper's cellulose fibers to be recovered. Any soluble polymer will dissolve and be filtered away and will eventually biodegrade, or it can be recovered from the wastewater of the recycling plant to be re-used again. Any insoluble polymers will be captured on the filtering equipment of the paper recycling plant. Any barrier materials are inert, harmless and occur naturally and will safely disperse in the wastewater. However, if littered, the packages will biodegrade within 6-12 months.

In order to facilitate, as well as to encourage the recyclability of the package, the package made from the structure of the present disclosure may comprise less than 50 percent by weight of inks, dyes, barrier layers, polymeric layers, glues and/or synthetic fibers. The weight percentage of inks, inks, dyes, barrier layers, polymeric layers, glues and/or synthetic fibers, in the package can be less than 50 percent by weight, more preferably less than 30 percent by weight, or most preferably less than 10 percent by weight, specifically reciting all values within these ranges and any ranges created thereby. For example, the weight percentage of inks, dyes, barrier layers, polymeric layers, glues and/or synthetic fibers, in the package material can be between 0.1 percent by weight to 50 percent by weight, more preferably between 0.1 percent by weight to 30 percent by weight, or most preferably between 0.1 percent by weight to 10 percent by weight, specifically reciting all values within these ranges and any ranges created thereby. In one specific example, the amount of inks, dyes, barrier layers, polymeric layers, glues and/or synthetic fibers, is 5 percent by weight or less or between 0.1 percent by weight to 5 percent by weight, specifically reciting all values within these ranges and any ranges created thereby.

It is preferred that the resulting overall package made from the biodegradable and recyclable barrier paper laminate described in the present disclosure comprises at least 50 percent by weight of natural cellulose fibers, at least 70 percent by weight natural cellulose fibers, or at least 80 percent by weight natural cellulose fibers, specifically reciting all values within these ranges and any ranges created thereby.

The effectiveness of the recycling process on the package material of the present disclosure may be determined via recyclable percentage. Package material of the present disclosure can exhibit recyclable percentages of 50 percent or greater, more preferably 70 percent or greater, or most preferably 80 percent or greater, specifically reciting all values within these ranges and any ranges created thereby. The packaging material of the present disclosure can have a recyclable percentage of between 50 percent to about 99 percent, more preferably from about 85 percent to about 99 percent, or most preferably from about 90 percent to about 99 percent. The recyclable percentage of the package material of the present disclosure is determined via test PTS-RH:021/97 (Draft October 2019) under category II as performed by Papiertechnische Stiftung located at Pirnaer Strasse 37, 01809 Heidenau, Germany.

Along with recyclable percentage, the total reject percentage can be determined via PTS-RH: 021/97 (draft October 2019) under category II. The total reject percentage of the package material of the present disclosure can be less than about 50 percent, more preferably less than about 30 percent, or most preferably less than about 10 percent, specifically including all values within these ranges and any ranges created thereby. For example, the total rejection percentage of the package material of the present disclosure can be from 0.5 percent to 50 percent, more preferably from 0.5 percent to 30 percent, or most preferably from 0.5 percent to 10 percent, specifically reciting all values within these ranges and any ranges created thereby.

It is worth noting that the test method PTS-RH:021/97 (Draft October 2019) comprises a handsheet inspection. Trained screeners inspect one or more hand sheets of recycled package material for visual imperfections and tackiness. If the number of visual imperfections is too great or if the handsheet is too tacky, then the package material is rejected. If the number of visual imperfections is acceptable and the handsheet is not too tacky, in accordance with the PTS-RH:021/97 (Draft October 2019) method, then the package material is approved for additional processing. The package material of the present disclosure can yield an acceptable level of visual imperfections during this step of the method when specific combinations are used. For some combinations, additional testing is carried out if the package has passed the repulping test but failed the visual test, in order to understand the implications for use of the package in specific countries globally which may have different quality requirements for incoming recyclable material.

Some of the package material combinations of the present disclosure can yield the recyclable percentages mentioned heretofore and as well as pass the hand sheet inspection. So, in those cases the package material of the present disclosure can achieve an overall score or final outcome of "pass" when subjected to the full PTS-RH:021/97 (Draft October 2019) recycling test method.

It is also worth noting that there is an alternative method for determining the recyclable percentage of the package material of the present disclosure. Should the PTS-RH:021/97 (Draft October 2019) method not be available, a test carried out by the University of Western Michigan may be utilized. The test method performed by the University of Western Michigan is the Repulpability Test. The results of the Repulpability Test provide a percentage yield of the sample material. The package material of the present disclosure can achieve a percentage yield in accordance with the Repulpability Test which is greater than about 50 percent, more preferably greater than about 70 percent, or most preferably greater than about 80 percent, specifically reciting all values within these ranges and any ranges created thereby. The packaging material of the present disclosure can have a percentage pulp yield of between 50 percent to about 99 percent, more preferably from about 85 percent to about 99 percent, or most preferably from about 90 percent to about 99 percent.

It should also be noted that in general, the PTS-RH:021/97 (Draft October 2019) method tends to be more indicative of performance in a European paper recycling system. Also, recyclable percentage goals are expected to differ across different European countries in order to consider a barrier paper laminate recyclable. Typically, the goals range from at least a 50% recyclable percentage expected in some countries e.g. (France) to at least an 80% recyclable percentage expected in some countries e.g. Germany. Whereas the tested method carried out by the University of Western Michigan tends to be more indicative of performance in a North American paper recycling system and typically a percentage yield of 80% would be expected to consider a barrier paper laminate recyclable in North America. In Asia, no specific recyclability targets or regulations have yet been identified and so we have made an assumption that Asian countries would expect at least a recyclable percentage target goal of at least 50% (as determined by the PTS-RH:021/97 (Draft October 2019) method) and/or at least a percentage yield of at least 50% (as determined by the University of Western Michigan test method) in order to be considered recyclable in Asia.

Test Methods

When testing and/or measuring a material, if the relevant test method does not specify a particular temperature, then the test and/or measure is performed on specimens at 23° C. (±3° C.), with such specimens preconditioned at that temperature. When testing and/or measuring a material, if the relevant test method does not specify a particular humidity, then the test and/or measure is performed on specimens at 35% (±5%), with such specimens preconditioned at that humidity. Testing and/or measuring should be conducted by trained, skilled, and experienced personnel, according to good laboratory practices, via properly calibrated equipment and/or instruments.

1) Biodegradation Screening Test OECD 301B and OECD 306

Ideally, the major components (paper, lamination layers, primers, barrier, sealant) should be tested separately and then the final package, should all be tested for biodegradation according to the test method OECD 301B. The final package includes all major and minor (inks, varnishes) components and is open at one end to mimic its disposal after being opened by a consumer. The final package should be also tested according to OECD 306 in marine water. Pass/fail success criteria are shown in TABLE 4 below:

TABLE 4

| OECD Biodegradation Test Methods and Pass Criteria | |
|---|---|
| Test Method | Pass Criteria |
| OECD 301B<br>Test major components in each layer<br>Test fully formed sachet* | 60% thCO$_2$ evolution or thO$_2$ consumption in 60 days |
| OECD 306<br>Test fully formed sachet* | 60% thCO$_2$ evolution or thO$_2$ consumption in 60 days |

The sample should biodegrade at least 60% within 60 days, preferably at least 60% within 30 days.

Aerobic biodegradation is measured by the production of carbon dioxide (C02) from the test material in the standard test method as defined by Method 301B and 306 test guidelines of the Organization for Economic Cooperation and Development (OECD) the test is run per the indicated OECD test protocols except that it is conducted for 60 days. The preferred polymers should achieve at least 60% of biodegradation as measured by C02 production in 60 days in the standard Method 301B and 306. These OECD test method guidelines are well known in the art and cited herein as a reference {OECD (1992) *Test No. 306: Biodegradability in Seawater*, OECD Guidelines for the Testing of Chemicals, Section 3, OECD Publishing, Paris, https://doi.org/10.1787/9789264070486-en. and OECD (1992), *Test No. 301: Ready Biodegradability*, OECD Guidelines for the Testing of Chemicals, Section 3, OECD Publishing, Paris, https://doi.org/10.1787/9789264070349-en.}.

2) Dissolution Test Method

This test method measures the total time for the complete dissolution of a particular film specimen when the test is performed according to Slide Dissolution Test, which is Test Method 205 (MSTM 205), as set forth in paragraphs 116-131 of US published patent application US20150093526A1, entitled "Water-soluble film having improved dissolution and stress properties, and packets made therefrom". The entire publication is hereby incorporated as reference. The dissolution test method used herein is the same as that set forth in US20150093526A1, except that the temperature of the distilled water is 23° C. and the test duration limit is 24 hours. The results are Individual and Average Disintegration Time (the time to where the film beaks apart) and Individual and Average Dissolution Time (the time to where no solid residues are visible). Unless explicitly specified, Dissolution Test Method uses distilled water maintained at 30° C. The Dissolution Test Method does not apply to materials other than films having an overall thickness equal or less than 3 mm A film according to the present invention is considered to be water-soluble if the average dissolution time measured according to this dissolution test method is less than 24 hours.

3) Water Vapor Transmission Rate (WVTR)

This test method is mostly performed according to ASTM F1249-13 under the following test conditions: either the temperature of the test gas is 38° C. (±0.56° C.) and it's relative humidity is 50% (±3%)—or if tropical conditions are required, the temperature of the test gas is set to 38° C. (±0.56° C.) and it's relative humidity to 90% (±3%). The carrier gas is 100% N$_2$ (dry). The equipment used to run the test is a Permatran-W Water Vapor Permeability Instrument following the written procedure QMS 702-004. For materials outside of the Scope (§ 1.1) of ASTM F-1249-13, the water vapor transmission rate test method does not apply.

If the barrier properties of a specific substrate were too poor, especially if coatings on paper substrates were very thin and did not enable a good seal to the equipment, then it was not possible to measure the WVTR via ASTM F1249-13. In those cases, a different test method was used i.e. ASTM E96 Cup Test Method. However, results from the two different test methods can still be compared. For ASTM E96, the temperature was 38° C. and the humidity was 90% relative humidity if tropical conditions were desired, or sometimes the humidity was 50% relative humidity if tropical conditions were not needed.

For either test method, the water vapor transmission rate is reported in g/m$^2$/day. If normalized by the barrier thickness, the water vapor transmission rate is reported in g·µm/m$^2$/day.

All WVTR tests were performed at Mocon Labs in Minneapolis, unless otherwise specified.

4) Oxygen Transmission Rate (OTR)

This test method is mostly performed according to ASTM F1927 under the following test conditions: The temperature of the test gas is 23° C. (±0.56° C.) and it's relative humidity is 80% (±3%) and the test gas concentration is 100% O$_2$, unless otherwise specified. The carrier gas is 98% N$_2$ and 2% H$_2$ and the carrier gas humidity is 0%. Test gas pressure is 760 mmHg. The equipment used to carry out this test is the Oxtran 2/21 Oxygen Permeability Instrument following the test procedure QMS 702-002.

If the barrier properties of a specific substrate were too poor, especially if coatings on paper substrates were very thin and did not enable a good seal to the equipment, then it was not possible to measure the WVTR via ASTM F1927. In those cases, a different test method was used i.e. F3136. However, the results from the two different test methods can still be roughly compared. For F3136, the temperature of the test gas is 23° C. (±0.56° C.) and it's relative humidity is 39% and the test gas concentration is 20.9% O$_2$ (room air). The equipment used to carry out this test is the Mocon OpTech-O$_2$ Model P Instrument following the test procedure QMS 702-002.

For either test method, the oxygen transmission rate is reported in cc/m$^2$/day. If normalized by the barrier thickness, the water vapor transmission rate is reported in cc·µm/m$^2$/day.

All OTR tests were performed at Mocon Labs in Minneapolis, USA, unless otherwise specified.

5) Grease Resistance Test (Kit Test)

Grease test resistance was measured using the TAPPI T 559 cm-12 Grease Resistance test for paper and paperboard. The grease tests were carried out at SGS Integrated Paper Services in Appleton, Wis., USA, unless otherwise specified.

Samples were tested and conditioned in the TAPPI standard conditions shown in TABLE 5 below. Samples were not preconditioned.

TABLE 5

| Tappi Standard Conditions Room Conditions | | |
|---|---|---|
| | Relative Humidity (%) | Temperature (° F.) |
| Conditioning Envirnoment | 51.2 | 74.1 |
| Maximum during testing | 51.6 | 74.1 |
| Minimum during testing | 51.2 | 73.9 |

TAPPI T 559 cm-12 Grease resistance test for paper and paperboard samples and specimens that passed Kit 12, are reported as greater than or equal to 12.

6) Individual Layers Thickness

The thickness of the individual layers is measured by cutting a 20 μm thick cross-section of a film sample via sliding microtome (e.g. Leica SM2010 R), placing it under an optical microscope in light transmission mode (e.g. Leica Diaplan), and applying an imaging analysis software. It is also measured using scanning electron microscopy which was also sometimes supplemented with energy-dispersive X-ray spectroscopy to give further contrast to the different layers.

7) Caliper

The caliper, or thickness, of a single-layer test sample is measured under a static load by a micrometer, in accordance with compendial method ISO 534, with modifications noted herein. All measurements are performed in a laboratory maintained at 23° C.±2° C. and 50%±2% relative humidity and test samples are conditioned in this environment for at least 2 hours prior to testing.

Caliper is measured with a micrometer equipped with a pressure foot capable of exerting a steady pressure of 70 kPa±0.05 kPa onto the test sample. The micrometer is a dead-weight type instrument with readings accurate to 0.1 micron. A suitable instrument is the TMI Digital Micrometer Model 49-56, available from Testing Machines Inc., New Castle, Del., or equivalent. The pressure foot is a flat ground circular movable face with a diameter that is smaller than the test specimen and capable of exerting the required pressure. A suitable pressure foot has a diameter of 16.0 mm. The test sample is supported by a horizontal flat reference platform that is larger than and parallel to the surface of the pressure foot. The system is calibrated and operated per the manufacturer's instructions.

Measurements are made on single-layer test samples taken from rolls or sheets of the raw material, or test samples obtained from a finished package. When excising the test sample from a finished package, use care to not impart any contamination or distortion to the sample during the process. The excised sample should be free from residual adhesive and taken from an area of the package that is free from any seams or folds. The test sample is ideally 200 mm² and must be larger than the pressure foot.

To measure caliper, first zero the micrometer against the horizontal flat reference platform. Place the test sample on the platform with the test location centered below the pressure foot. Gently lower the pressure foot with a descent rate of 3.0 mm per second until the full pressure is exerted onto the test sample. Wait 5 seconds and then record the caliper of the test sample to the nearest 0.1 micron. In like fashion, repeat for a total of ten replicate test samples. Calculate the arithmetic mean for all caliper measurements and report the value as Caliper to the nearest 0.1 micron.

8) Basis Weight

The basis weight of a test sample is the mass (in grams) per unit area (in square meters) of a single layer of material and is measured in accordance with compendial method ISO 536. The mass of the test sample is cut to a known area, and the mass of the sample is determined using an analytical balance accurate to 0.0001 grams. All measurements are performed in a laboratory maintained at 23° C.±2° C. and 50%±2% relative humidity and test samples are conditioned in this environment for at least 2 hours prior to testing.

Measurements are made on test samples taken from rolls or sheets of the raw material, or test samples obtained from a finished package. When excising the test sample from a finished package, use care to not impart any contamination or distortion to the sample during the process. The excised sample should be free from residual adhesive and taken from an area of the package that is free from any seams or folds. The test sample must be as large as possible so that any inherent material variability is accounted for.

Measure the dimensions of the single layer test sample using a calibrated steel metal ruler traceable to NIST, or equivalent. Calculate the Area of the test sample and record to the nearest 0.0001 square meter. Use an analytical balance to obtain the Mass of the test sample and record to the nearest 0.0001 gram. Calculate Basis Weight by dividing Mass (in grams) by Area (in square meters) and record to the nearest 0.01 grams per square meter (gsm). In like fashion, repeat for a total of ten replicate test samples. Calculate the arithmetic mean for Basis Weight and report to the nearest 0.01 grams/square meter.

9) Roughness Measurements ($S_q$) of Substrate/Individual Layers

Root Mean Square Roughness (Sq) is measured using a 3D Laser Scanning Confocal Microscope such as a Keyence VK-X200 series microscope available from KEYENCE CORPORATION OF AMERICA) which includes a VK-X200K controller and a VK-X210 30 Measuring Unit. The instrument manufacturer's software, VK Viewer version 2.4.1.0, is used for data collection and the manufacturer's software, Multifile Analyzer version 1.1.14.62 and VK Analyzer version 3.4.0.1, are used for data analysis. If needed, the manufacturer's image stitching software, VK Image Stitching version 2.1.0.0, can be used. The manufacturer's analysis software 15377P 22 is compliant with ISO 25178. The light source used is a semiconductor laser with a wavelength of 408 nm and having a power of about 0.95 mW. The sample to be analyzed is obtained by cutting a piece of the article out of the article that includes the region to be analyzed in a size that can fit the microscope for proper analysis. To 5 measure Sq of an etched portion of an article, a sample should be obtained that includes an etched region and the analysis should take place only over the portion of the sample that is etched. If the sample is not flat, but is flexible, the sample may be held down on the microscope stage with tape or other means. If, due to the shape, flexibility or other characteristic of the sample, measurements will be more accurate when the sample is not flattened, corrections may be sued, as explained 10 hereinbelow. The measurement data from the sample is obtained using a 20× objective lens suitable for noncontact profilometry, such as a 20× Nikon CF IC Epi Plan DI Interferometry Objective with a numerical aperture of 0.40. The data is acquired using the acquisition software's "Expert Mode", with the following parameters set as described he: 1) Height Scan Range is set to encompass the 15 height range of the sample (this can vary from sample to sample depending on the surface topography of each); 2) Z-direction Step Size is set to 0.50 micrometers; 3) Real Peak Detection mode is set to "On"; and 4) Laser Intensity and Detector Gain are optimized for each sample using the autogain feature of the instrument control software. Prior to analysis, the data is subjected to the following corrections using the manufacturer's 20 Multifile Analyzer software: 1) 3×3 median smoothing in which the center pixel of a 3×3 pixel array is replaced by the median value of that array; 2) noise removal using weak height cut (following built in algorithm in the analysis software), and 3) shape correction using waveform removal (0.5 mm cutoff). The Reference Plane is specified using the Set Area method and selecting the same area as is used for the shape removal. Regions including foreign materials, 25 artifacts of the sample harvesting process or any other obvious abnormalities should be excluded from analysis and alternative samples should be used any sample can't be accurately measured. The resulting value is the Root Mean Square Roughness, Sq, for the measured portion of the sample. All percentages are weight percentages based on the weight of the composition, unless 30 otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient 15377P 23 conditions" means conditions under about one atmosphere pressure and at about 50% relative humidity.

10) Heat Seal Strength

Test method ASTM F88-06 was used to measure the heat seal strength of heat seals formed from the various barrier paper laminates, unless otherwise specified.

EXAMPLES

The following two compositions for making a soluble layer are used in nearly all the examples listed in this section, so the methods to make these two compositions are listed here so they do not need to be repeated:

Preparation of Aqueous Lamination Layer Composition (Named FROZEN 3A)

650 g of demineralized water is heated up in a Thermomix TM5 to 50° C. 400 g of solid PVOH powder (Selvol 205 ex Sekisui Chemicals) is added under stirring at level 2.5-3.0 and the temperature is set to 85° C. When the temperature of 85° C. is reached, (in about 5 minutes), the stirring level is reduced to 1.0-1.5 to avoid extreme foaming After 30 minutes of constant stirring at 85° C., the polymer is dissolved. In parallel, 100 g glycerol is mixed with 100 g demineralized water at 85° C. Then, both polymer and plasticizer solutions are mixed together at 85° C. under stirring level 1.0-1.5 for about 5 minutes. The solution is stored over night at room temperature to eliminate any residual foam.

Preparation of Aqueous Sealing Layer Composition (Named FROZEN 3B) 1070 g of demineralized water is heated up in a Thermomix TM5 to 50° C. 400 g of solid PVOH powder (Selvol 205 ex Sekisui Chemicals) is added under stirring at level 2.5-3.0 and temperature is set to 85° C. When the temperature of 85° C. is reached, (in about 5 min), the stirring level is reduced to 1.0-1.5 to avoid extreme foaming After 30 minutes of constant stirring at 85° C., the polymer is dissolved. In parallel, 50 g sorbitol and 50 g glycerol are mixed with 100 g of demineralized water at 85° C. Then, both polymer and plasticizer solutions are mixed together at 85° C. under stirring level 1.0-1.5 for about 5 minutes. The solution is stored over night at room temperature to eliminate any residual foam.

Example 1: Biodegradable and Recyclable Barrier Paper Laminate Based on Paper Coated with Polyvinyl Alcohol Heat Seal Layer, but with No Primer or Barrier Added PVOH coated paper exhibits an MVTR of ~1271 $g/m^2 \cdot day$ at 38° C./90% RH at tropical conditions i.e. 38° C./90% RH. Most dry consumer products require much better barrier than that and often require a moisture barrier transmission rate as low as <5 $g \cdot m^2 \cdot day$ at 38° C./90% RH or even lower. So typically, we cannot use just PVOH coated paper alone to make a functioning package—we must add a barrier to it. In addition, whatever barrier is added to the structure needs to be biodegradable (or safely dispersible once the rest of the structure biodegrades and disintegrates) and recyclable in normal paper recycling systems. Below we describe how such an example was made in order to compare it to the later examples that do have barrier layers added:

Making of Example 1 at the Fraunhofer Institute IVV, Freiburg, Germany:

In one non-limiting embodiment (HPX-RAW), a biodegradable and recyclable 62 μm thick paper grade traded as PackPro 7.0 from Brigl and Bergmeister (B & B) was taken. The paper has two sides—one side which is sized by Brigl and Bergmeister using a mineral coating to prepare it for subsequent coatings, whereas the other side is not sized. The sized side of this paper was then coated with the PVOH-based aqueous heat seal layer composition FROZEN 3B held at 85° C. (recipe shown earlier), using an anilox roll. A wet layer ~55 um thick was laid down. The water from this solution was dried using a convective drier/heater (Drytec brand from Krönert) at 90° C., creating a heat seal layer that was ~18 um thick when dried. The composition of the resulting dry heat seal layer was 80% Selvol 205 ex Sekisui Chemicals, 10% glycerol and 10% sorbitol. The structure layers are outlined as follows in TABLE 6:

TABLE 6

Structure of HPX-RAW:

| | ID#: HPX-RAW Layer # | |
|---|---|---|
| | 1 | 2 |
| Material | PackPro 7.0 Paper (Sized) | PVOH (FROZEN 3B recipe) |
| Purpose | Main Substrate Base Layer - Biodegradable and Recyclable in paper stream | Heat Seal Layer - Soluble and Biodegradable. Separates from paper layer and dissolves quickly during repulping or biodegradation. |
| Basis Weight | 80 gsm | |

TABLE 6-continued

Structure of HPX-RAW:

| | ID#: HPX-RAW Layer # | |
|---|---|---|
| | 1 | 2 |
| Thickness (Dry) | 62 μm | 18 μm |
| Supplier | B&B | HPX |
| Application Method | N/A | Solution Coating via Anilox Roll |
| Number of Coating Layer Applications Used to Form Layer | 1 layer | 1 layer |

Example 2: Biodegradable and Recyclable Barrier Paper Laminate Based on Paper, Polyvinyl Alcohol Lamination Layer, Aluminum Barrier and Polyvinyl Alcohol Heat Seal Layer We first constructed structures that did not contain any of the primer layers designed to maximize the quality and stability of the aluminum layer, in order to understand whether a primer really was needed to give the required range of barrier properties. A structure made from paper, PVOH and aluminum was made as described below. If we did not have to use primers, we could have a simpler structure to reduce manufacturing steps and also minimize the usage of expensive materials—both which would likely reduce the cost of the overall structure.

Making of Example 2 at the Fraunhofer Institute IVV, Freiburg, Germany:

In one non-limiting embodiment (HPX-A100-3B), a biodegradable and recyclable 62 μm thick paper grade traded as PackPro 7.0 from Brigl and Bergmeister (B&B) was taken. The paper has two sides—one side which is sized by Brigland Bergmeister using a mineral coating to prepare it for subsequent coatings, whereas the other side is not sized. The sized side of this paper was then coated with the PVOH-based aqueous lamination layer composition FROZEN 3A (see recipe shared earlier) held at 85° C., using an anilox roll. The water from the solution was partially absorbed into the paper but was also dried using a convective drier/heater (Drytec brand from Krönert) at 90° C., creating a PVOH layer that was ~9 μm thick when dried. The composition of the resulting dry lamination layer was 80% Selvol 205 PVOH from Sekisui Chemicals and 20% glycerol from Cremer. The prepared roll was then placed into the vacuum system of an electron beam evaporation unit (manufactured by Leybold) and was pumped down to create a vacuum—a process that took several hours due to the porosity of the paper layer within the substrate. Typically, the system was pumped down to a vacuum of $1.5 \times 10^{-5}$ mbar (which is ~0.01 Torr). Once inside the system, the film rollers cooled the substrate with liquid nitrogen to a temperature range of −5° C. to −10° C. ahead of deposition, so that any residual water was frozen in place. The system then unrolled the substrate, moving at a web speed in the range of 0.9-1.2m/minute, using a web tension of ~50N.

Electron beam evaporation of the aluminum source was used to create a vapor which then deposited aluminum onto the substrate as it was unrolled. The aluminum target used had a purity of 99.999%. In order to vaporize the aluminum target, an electric current of 450-500 mA was applied to an electron source to form an electron beam that was focused onto the aluminum target. The coating rate of aluminum onto the substrate was in the range of 45-75 Å/second and so the web was moved at a suitable rate to obtain the desired thickness. Once the inorganic coating was applied, the substrate was rolled up again. In total, 100 nm of aluminum was applied to the top surface of the substrate in order to prepare this particular sample. Before the vacuum chamber could be opened, the aluminum source needed to be cooled down to prevent oxidation, so it was necessary to wait approximately 30 minutes. After that time, air was allowed to enter the chamber and the roll of substrate could be removed. As a next step, the structure was coated with the aqueous heat seal layer composition FROZEN 3B held at 85° C., using an anilox roll. A wet layer ~55 um thick was laid down. The water from this solution was dried using a convective drier/heater (Drytec brand from Krönert) at 90° C., creating a heat seal layer that was ~18 um thick when dried. The composition of the resulting dry heat seal layer was 80% Selvol 205 ex Sekisui Chemicals, 10% glycerol and 10% sorbitol.

The details of each layer, along with their purpose within the structure created are outlined in TABLE 7 below:

TABLE 7

Structure of HPX-A100-3B

| | | ID#: HPX-A100-3B Layer # | | | |
|---|---|---|---|---|---|
| | | 1 | 2 | 3 | 4 |
| Material | | PackPro 7.0 Paper (Sized) | PVOH (FROZEN 3A recipe) | Aluminum | PVOH (FROZEN 3B recipe) |

TABLE 7-continued

Structure of HPX-A100-3B

ID#:
HPX-A100-3B
Layer #

| | 1 | 2 | 3 | 4 |
|---|---|---|---|---|
| Purpose | Main Substrate Base Layer - Biodegradable and Recyclable in paper stream | Lamination Layer - Soluble and Biodegradable. Helps paper layer separate quickly from barrier layers during repulping or biodegradation. | Inorganic Barrier Layer - Barrier to moisture, oxygen, perfume, grease etc. | Heat Seal Layer - Soluble and Biodegradable. Separates from rest of structure and dissolves quickly during repulping or biodegradation. |
| Basis Weight | 80 gsm | | | |
| Thickness (Dry) | 62 µm | 9 µm | 100 nm | 18 µm |
| Supplier | B&B | HPX | Fraunhofer | HPX |
| Application Method | NA | Solution Coating via Anilox Roll | Vapor Deposition | Solution Coating via Anilox Roll |
| Number of Coating Layer Applications Used to Form Layer | 1 layer | 1 layer | 1 layer | 1 layer |

The structure created was then subjected to a range of physical tests, in order to assess its suitability for the application. The tests included moisture vapor transmission rate testing, oxygen transmission rate testing, grease resistance testing, heat seal strength testing, recyclability testing and biodegradation testing. Results from these samples are summarized in TABLE 8 below:

TABLE 8

Structure HPX-A100-3B:

| Sample Number | WVTR g/m2 · day at 38 C./90% RH | OTR cc/m2/day At 23 C./80% RH | Grease Resistance Kit Test | Heat Seal Strength max. force [N/25.4 mm] | PTS Recyclability: Recyclable % Result | OECD301B Biodegradation Test Results |
|---|---|---|---|---|---|---|
| HPX-A100-3B | 264 g/m2/day | 13.8 | >12 | 14 ± 1 and Strong adhesion of heat seal layer to rest of structure | PASS (99.6%) | PASS (87.1% by 30 days at end of test and passed 60% within 16 days.) |

As one can see from TABLE 8, the moisture transmission rate at 38° C./90% RH is about 264 g/m2·day, which is only 20% the transmission rate measured for a paper that is covered with PVOH only—but still it is quite high and is higher than is required for packaging most products. As mentioned previously, some dry laundry products require a moisture barrier of <5 g/m2·day at 38° C./90% RH or even lower. However, the oxygen transmission rate and grease resistance are good and the repulping fiber recovery score is very good at 99.6%. The results confirmed the need to explore whether primers that were either biodegradable or that would be harmless once the rest of the structure had biodegraded, could decrease the moisture transmission rate further, whilst still allowing the structure to pass the repulping test of a typical paper recycling plant.

Making of Example 2 at the Procter and Gamble Company, USA and at Mueller Corporation, USA:

To further explore these structures that do not contain primers, we also conducted similar tests at another external laboratory in the USA (Mueller Corporation), in order to be able test a much larger range of aluminum thicknesses. The PackPro 7.0 was first coated with PVOH at The Procter and Gamble Company in West Chester, Ohio, USA and then they samples were sent to Mueller Corporation for aluminum deposition. Samples were then returned to The Procter and Gamble Company and a top layer of PVOH was coated onto the aluminum, before the moisture vapor barrier was tested. The structures produced and results obtained are shown below in TABLE 9—this table shows that samples were prepared in a very similar way to those described above, except that a greater range of aluminum thicknesses were used.

TABLE 9

Details of Mueller Samples:

ID#:
Mueller-A100-3B, Mueller-A200-3B, Mueller-A500-3B and Mueller-A1000-3B

| | Layer # | | | |
|---|---|---|---|---|
| | 1 | 2 | 3 | 4 |
| Material | PackPro 7.0 Paper (Sized) | PVOH (FROZEN 3A recipe) | Aluminum | PVOH (FROZEN 3A recipe) |
| Purpose | Main Substrate Base Layer - Biodegradable and Recyclable in paper stream | Lamination Layer - Soluble and Biodegradable. Helps paper layer separate quickly from barrier layers during repulping or biodegradation. | Inorganic Barrier Layer - Barrier to moisture, oxygen, perfume, grease etc. | Lamination Layer - Soluble and Biodegradable. Helps paper layer separate quickly from barrier layers during repulping or biodegradation. |
| Basis Weight | 80 gsm | | | |
| Thickness (Dry) | 62 μm (All sample ID's) | 9 μm (All sample ID's) | Mueller-A100-3B = 100 nm Mueller-A200-3B = 200 nm Mueller-A500-3B = 500 nm Mueller-A1000-3B = 1000 nm | 20 μm (All sample ID's) |
| Supplier | B&B | P&G USA | Mueller Corporation | P&G USA |
| Application Method | NA | Solution Coating via Anilox Roll | Vapor Deposition | Solution Coating via Anilox Roll |
| Number of Coating Layer Applications Used to Form Layer | 1 layer | 1 layer | 1 layer | 1 layer |

The structure created was then subjected to a range of physical tests, in order to assess its suitability for the application. The tests included moisture vapor transmission rate testing, oxygen transmission rate testing, grease resistance testing, heat seal strength testing, recyclability testing and biodegradation testing. Results from these samples are summarized in TABLE 10 below:

TABLE 10

Results from Mueller Samples:

| Sample Number | WVTR g/m2 · day at 38 C./90% RH | OTR cc/m2/day At 23 C./80% RH | Grease Resistance Kit Test | Heat Seal Strength max. force [N/25.4 mm] | PTS Recyclability Recyclable % Result | OECD301B Biodegradation Test Results |
|---|---|---|---|---|---|---|
| Mueller-A100-3B | 151 g/m2 · day | Not yet tested | Not yet tested | 12.3 ± 2.0 | PASS (82%) | PASS (100% in 30 days at end of test and passed 60% within 7 days.) |
| Mueller-A200-3B | 228 g/m2 · day | Not yet tested | Not yet tested | Not yet tested | Not yet tested | Not yet tested |
| Mueller-A500-3B | 20 g/m2 · day | Not yet tested | Not yet tested | Not yet tested | Not yet tested | Not yet tested |
| Mueller-A1000-3B | 146 g/m2 · day | Not yet tested | Not yet tested | Not yet tested | Not yet tested | Not yet tested |

As one can see from TABLE 10, the moisture transmission rates of these new structures at 38° C./90% RH were still quite high, even when we increased the aluminum layer from 100 nm to 1000 nm. In general, the moisture transmission rate values were much higher than is required for packaging most products. There was one sample—Mueller-A500-3B which showed an average MVTR of ~20 g/m2·day, which is better than the other metallized samples made at Mueller. However, this was still not good enough for our main product target which required an MVTR of <5 g/m2·day at 38° C./90% RH. Also, most industrially scaled metallizers do not apply aluminum in layers as thick as 500 nm as this would be prohibitively expensive—most industrial metallizers apply aluminum layers in the range 5 nm-100 nm for cost efficiency and speed. The results further confirmed the need to explore primers that was either biodegradable or that would be harmless once the rest of the structure had biodegraded, whilst still allowing the structure to pass the repulping test of a typical paper recycling plant.

Example 3: Biodegradable and Recyclable Barrier Paper Laminate Based on Paper, Polyvinyl Alcohol Lamination Layer, Bio-ORMOCER® Primer, Aluminum Barrier and Polyvinyl Alcohol Heat Seal Layer Following the results observed in Example 1, we explored the use of a biodegradable bio-ORMOCER® primer. Structures were made as described below.

Making of Example 3 at the Fraunhofer Institute IVV, Freiburg, Germany:

In one non-limiting embodiment (HPX-O-A100-3B:KOTH1), a biodegradable and recyclable 62 µm thick paper grade traded as PackPro 7.0 from Brigl and Bergmeister (B &B) was taken. The paper has two sides—one side which is sized by Brigl and Bergmeister using a mineral coating to prepare it for subsequent coatings, whereas the other side is not sized. The sized side of this paper was then coated with the PVOH-based aqueous lamination layer composition FROZEN 3A (see recipe shared previously) held at 85° C., using an anilox roll. The water from the solution was partially absorbed into the paper but was also dried using a convective drier/heater (Drytec brand from Krönert) at 90° C., creating a PVOH layer that was ~9 µm thick when dried. The composition of the resulting dry lamination layer was 80% Selvol 205 PVOH from Sekisui Chemicals and 20% glycerol from Cremer. As a next step, a layer of liquid bio-ORMOCER® primer was added on top, also using an anilox roll. This bio-ORMOCER® layer was then cured using the same convective drier/heater (Drytec brand from Krönert) held at 100° C., whilst the substrate was moved through the drier at a speed of 5m/minute to ensure that the residence time of the coating in the dryer was approximately 1 minute. This curing process formed a very flat surface of a bio-ORMOCER® primer layer that once dry was ~3.5 µm. To make an even more perfect, stiffer support layer for metallization, we then repeated the application and curing of the bio-ORMOCER® primer layer, in order to create a layer that was ~9 µm thick in total once cured. After curing of the second bio-ORMOCER® layer, an extremely flat, stable surface was formed to receive the subsequent aluminum coating. The prepared roll was then placed into the vacuum system of an electron beam evaporation unit (manufactured by Leybold) and was pumped down to create a vacuum—a process that took several hours due to the porosity of the paper layer within the substrate. Typically, the system was pumped down to a vacuum of $1.5 \times 10^{-5}$ mbar (which is ~0.01 Torr). Once inside the system, the film rollers cooled the substrate with liquid nitrogen to a temperature range of −5° C. to −10° C. ahead of deposition, so that any residual water was frozen in place. The system then unrolled the substrate, moving at a web speed in the range of 0.9-1.2m/minute, using a web tension of ~50N. Electron beam evaporation of the aluminum source was used to create a vapor which then deposited aluminum onto the substrate as it was unrolled. The aluminum target used had a purity of 99.999%. In order to vaporize the aluminum target, an electric current of 450-500 mA was applied to an electron source to form an electron beam that was focused onto the aluminum target. The coating rate of aluminum onto the substrate was in the range of 45-75 Å/second and so the web was moved at a suitable rate to obtain the desired thickness. Once the inorganic coating was applied, the substrate was rolled up again. In total, 100 nm of aluminum was applied to the top surface of the substrate in order to prepare this particular sample. Before the vacuum chamber could be opened, the aluminum source needed to be cooled down to prevent oxidation, so it was necessary to wait approximately 30 minutes. After that time, air was allowed to enter the chamber and the roll of substrate could be removed. As a next step, a third protective layer of liquid bio-ORMOCER® primer was added directly on top of the aluminum layer, also using an anilox roll. This layer was cured using the same convective drier/heater (Drytec brand from Krönert) held at 120° C., whilst the substrate was moved through the drier at a speed of 5m/minute to ensure that the residence time of the coating within the dryer was approximately 1 minute. This curing process formed a bio-ORMOCER® primer layer that once dry was ~3.5 µm thick. Finally, the structure was coated with the aqueous heat seal layer composition FROZEN 3B held at 85° C., using an anilox roll. A wet layer ~55 um thick was laid down. The water from this solution was dried using a convective drier/heater (Drytec brand from Krönert) at 90° C., creating a heat seal layer that was ~18 um thick when dried. The composition of the resulting dry heat seal layer was 80% Selvol 205 ex Sekisui Chemicals, 10% glycerol and 10% sorbitol.

The details of each layer, along with their purpose within the structure HPX-O-A100-3B:KOTH1 are outlined in TABLE 11 below, along with two other structures, HPX-O-A120-3B and HPX-O-A60-3B. The other two structures were identical to HPX-O-A100-3B:KOTH1 except that HPX-O-A120-3B had an aluminum layer that was 120 nm thick (laid down by a double application of 60 nm thick aluminum layers) and HPX-O-A60-3B had an aluminum layer that was 60 nm thick.

TABLE 11

Structure Details:

ID#: HPX-O-A100-3B:KOTH1, HPX-O-A120-3B and HPX-O-A60-3B

| | | Layer # | | | | | |
|---|---|---|---|---|---|---|---|
| | | 1 | 2 | 3 | 4 | 5 | 6 |
| Material | | PackPro 7.0 Paper (Sized) | PVOH (FROZEN 3A recipe) | Bio-ORMOCER ® | Aluminum | Bio-ORMOCER ® | PVOH (FROZEN 3B recipe) |
| Purpose | | Main Substrate Base Layer - Biodegradable and Recyclable in paper stream | Lamination Layer - Soluble and Biodegradable. Helps paper layer separate quickly from barrier | $1^{st}$ Biodegradable Primer Layer - Support layer for aluminum | Inorganic Barrier Layer - Barrier to moisture, oxygen, perfume, grease etc. | $2^{nd}$ Biodegradable Primer Layer - Protective layer for aluminum | Heat Seal Layer - Soluble and Biodegradable. Separates from rest of structure and dissolves |

TABLE 11-continued

Structure Details:

ID#:
HPX-O-A100-3B:KOTH1, HPX-O-A120-3B and HPX-O-A60-3B

| | Layer # | | | | | |
|---|---|---|---|---|---|---|
| | 1 | 2 | 3 | 4 | 5 | 6 |
| | | layers during repulping or biodegradation. | | | | quickly during repulping or biodegradation. |
| Basis Weight | 80 gsm | | | | | |
| Thickness (Dry) | 62 μm (All sample ID's) | 9 μm (All sample ID's) | 6 μm (All sample ID's) | HPX-O-A100-3B:KOTH1 = 100 nm HPX-O-A120-3B = 120 nm HPX-O-A60-3B = 60 nm | 3.5 μm (All sample ID's) | 18 μm (All sample ID's) |
| Supplier | B&B | HPX | Fraunhofer | Fraunhofer | Fraunhofer | HPX |
| Application Method | N/A | Solution Coating via Anilox Roll | Solution Coating via Anilox Roll | Vapor Deposition | Solution Coating via Anilox Roll | Solution Coating via Anilox Roll |
| Number of Coating Layer Applications Used to Form Layer | 1 layer | 1 layer | 2 layers | HPX-O-A100-3B:KOTH1 = 1 layer HPX-O-A120-3B = 2 layers HPX-O-A60-3B = 1 layer | 1 layer | 1 layer |

The structure created was then subjected to a range of physical tests, in order to assess its suitability for the application. The tests included moisture vapor transmission rate testing, oxygen transmission rate testing, grease resistance testing, heat seal strength testing, recyclability testing and biodegradation testing. Results from these samples are summarized in TABLE 12 below:

TABLE 12

Results from Physical Testing of Structures:

| Sample Number | WVTR g/m2 · day at 38 C./90% RH | OTR cc/m2/day At 23 C./80% RH | Grease Resistance Kit Test | Heat Seal Strength max. force [N/15 mm] | PTS Recyclability: Recyclable % Result | OECD301B Biodegradation Test Results |
|---|---|---|---|---|---|---|
| HPX-O-A100-3B:KOTH1 | 1.22 | <0.005 | >12 | 12.3 ± 2.0 | PASS (82%) | PASS (100% in 30 days at end of test and passed 60% within 7 days.) |
| HPX-O-A120-3B | 15 | 12.4 | >12 | 12.3 ± 2.0 | Not yet tested | Not yet tested |
| HPX-O-A60-3B | 4.22 | 8.03 | >12 | 12.3 ± 2.0 | Not yet tested | Not yet tested |

As one can see from TABLE 12, the moisture transmission rate at 38° C./90% RH of two samples described in this section meet the WVTR goals for even our main product target which required an MVTR of <5 g/m2·day at 38° C./90% RH (dry laundry powders). Even the sample with an aluminum layer thickness of 60 nm still met this WVTR requirement, in addition to the sample with a 100 nm aluminum layer. However, the sample with 100 nm of aluminum did perform better for oxygen transmission rate, so may be preferred overall. The sample with 120 nm of aluminum did not perform as well as the samples with a thinner aluminum layer—this could be because it is reported that as layers get thicker they can be more prone to breaking up, in addition to being more costly to apply—so it may be best to target to use an aluminum layer that is 100 nm or lower.

We also assessed the ability of the substrate to be converted into a full package under more stressful high humidity/high temperature conditions, such as those found in many parts of the world where the natural moisture levels in the air can be very high, even inside an air conditioned building. To assess this, we placed the substrate HPX-O-A100-3B:KOTH1 inside various humidity chambers. Samples were assessed every 30 minutes for the first three hours and then every day for the next week. In particular, we found that a room set at 40° C./75% RH would cause the specific PVOH heat seal layer tested to become opaque, swell and wrinkle within the first 3 hours after having been placed inside the chamber. This made it very difficult to form a good heat seal in order to form a well-sealed package. (To note: the other PVOH layer use for lamination onto the paper layer did not experience these issues.) We therefore concluded that the HPX-O-A100-3B:KOTH1 structure would be best applied in regions where a plant has very well controlled humidity levels to prevent humidity rising too high until the package has been completely formed and sealed. For regions where that is not possible, we decided to explore other options for the polymer used for the innermost layer—i.e. the heat seal layer. Some of the following examples were a result of this investigation.

Example 4: Biodegradable and Recyclable Barrier Paper Laminate Based on Paper, Polyvinyl Alcohol Lamination Layer, Bio-ORMOCER® Primer, Aluminum Barrier and Several Alternative Soluble Heat Seal Layers In order to overcome some of the issues with the soluble PVOH heat seal layer explained in Example 3, we made some new structures with alternative soluble heat seal layers. We wanted to keep a soluble heat seal layer if that was at all possible, because soluble heat seal layers make it easier to pass paper recyclability testing protocols, because they dissolve and break up so quickly in paper repulping units. Therefore, we experimented with adding fillers to the PVOH used in Example 3, in order to reduce its moisture sensitivity. We also experimented with using different soluble polymers such as PEO, and PEO blended with methylcellulose. Whilst trying to decrease the moisture sensitivity, we also needed to ensure that the heat seal strength of the soluble heat seal layer remained strong. PVOH gave us a strong seal (Table 12), but we did not know how strong a heat-seal the other soluble polymers would make. The rest of the structure was kept the same as in Example 3 (HPX-O-A100-3B:KOTH1), whilst the heat seal polymer was changed. The structures produced are outlined below.

Additional compositions for the soluble heat seal layer (beyond FROZEN 3A and FROZEN 3B) needed to be made as follows:

Preparation of Aqueous PVOH-Based Sealing Layer Composition with Micro-Talc Filler (Named FROZEN 3C)

1070 g of demineralized water is heated up in a Thermomix TM5 to 50° C. 400 g of solid PVOH powder (Selvol 205 ex Sekisui Chemicals) is added under stirring at level 2.5-3.0 and temperature is set to 85° C. When the temperature of 85° C. is reached, (in about 5 minutes), the stirring level is reduced to 1.0-1.5 to avoid extreme foaming After 30 minutes of constant stirring at 85° C., the polymer is dissolved. In parallel, 50 g sorbitol and 50 g glycerol are mixed with 100 g demineralized water at 85° C. Then, both polymer and plasticizer solutions are mixed together at 85° C. under stirring level 1.0-1.5 for about 5 minutes. The solution is stored over night at room temperature to eliminate any residual foam. A micro-talc (Finntalc M05SL from Mondo Minerals) was added in the Thermomix in small steps to the heated (85° C.) already viscous solution before use, to a level of 40 weight %, forming a high viscous, grey dispersion in order to try and reduce the moisture sensitivity of the heat seal layer to moisture in the air.

Preparation of Aqueous PEO-Based Sealing Layer Composition (Named FROZEN 4A)

1000 g of demineralized water is heated up in a Thermomix TM5 to 60° C. 240 g of solid PEO powder (WSR N-80 ex Dow Chemicals) is carefully added step by step under stirring at level 2.5-3.0 and temperature is set to 85° C. After 1 hour of constant stirring at 60° C., the polymer is dissolved. In parallel, 120 g of a 50% glycerol/sorbitol solution are added at 60° C. Finally, both polymer and plasticizer solutions are mixed together at 60° C. under stirring at level 2.5-3.0 for about 5-10 minutes. The solution is stored then over night at room temperature.

Preparation of Aqueous PEO-Based Sealing Layer Composition with Micro-Talc Filler (Named FROZEN 4B)

1000 g of demineralized water is heated up in a Thermomix TM5 to 60° C. 240 g of solid PEO powder (WSR N-80 ex Dow Chemicals) is carefully added step by step under stirring at level 2.5-3.0 at 60° C. After 1 hour of constant stirring at 60° C., the polymer is completely dissolved. In parallel, 120 g of a solution of 50% glycerol and 50% sorbitol is added at 60° C. Polymer and plasticizer solutions are mixed together at 60° C. under stirring at level 2.5-3.0 for about 5-10 minutes. The solution is stored then over night at room temperature. A micro-talc (Finntalc M05SL) was added to the heated (60° C.) solution in small steps at moderate stirring level before use, to a level of 40 weight %, forming a high viscous grey dispersion in order to try and reduce the moisture sensitivity of the heat seal layer to moisture in the air.

Preparation of Aqueous PEO and MethylCellulose Based Sealing Layer Composition (Named FROZEN 5)

First, 1000 g of demineralized water is heated up in a Thermomix TM5 to 60° C. 240 g of solid PEO powder (WSR N-80 ex Dow Chemicals) is carefully added step by step under stirring at level 2.5-3.0 at 60° C. After 1 hour of constant stirring at 60° C., the polymer is completely dissolved. In parallel, 120 g of a solution of 50% glycerol and 50% sorbitol is added at 60° C. Polymer and plasticizer solutions are mixed together at 60° C. under stirring at level 2.5-3.0 for about 5-10 minutes. The solution is stored then over night at room temperature. A micro-talc (Finn talc M05SL) was added to the heated (60° C.) solution in small steps at moderate stirring level before use, to a level of 40 weight %, forming a high viscous grey dispersion in order to try and reduce the moisture sensitivity of the heat seal layer to moisture in the air.

Second, 1070 g of demineralized water is heated up in a Thermomix TM5 to 50° C. 200 g of methylcellulose is carefully added step by step under stirring at level 2.5-3.0 and temperature is set to 60° C. After 2 hours of constant stirring at 60° C., the polymer is dissolved. In parallel, 100 g of a 50% glycerol+50% sorbitol solution is added.

Finally, both polymer solutions are mixed in the chosen ratio 50:50 together at 60° C. under stirring at level 2.5-3.0 for about 5-10 minutes. The solution is then ready for use.

Making of Example 4 Structures at the Fraunhofer Institute IVV, Freiburg, Germany:

In the non-limiting embodiments using alternative soluble heat seal layers, a biodegradable and recyclable 62 μm thick paper grade traded as PackPro 7.0 from Brigl and Bergmeister (B &B) was taken. The paper has two sides—once side which is sized by Brigl and Bergmeister using a mineral coating to prepare it for subsequent coatings, whereas the other side was not sized. The sized side of this paper was then coated with the PVOH-based aqueous lamination layer composition FROZEN 3A (see recipe above) held at 85° C., using an anilox roll. The water from the solution was partially absorbed into the paper but was also dried using a convective drier/heater (Drytec brand from Krönert) at 90° C., creating a PVOH layer that was ~9 um thick when dried. The composition of the resulting dry lamination layer was 80% Selvol 205 PVOH from Sekisui Chemicals and 20% glycerol from Cremer. As a next step, a layer of liquid bio-ORMOCER® primer was added on top of the first layer, also using an anilox roll. This bio-ORMOCER® layer was then cured using the same convective drier/heater (Drytec brand from Krönert) held at 100° C., whilst the substrate was moved through the drier at a speed of 5m/minute to ensure that the residence time of the coating within the dryer was approximately 1 minute. This curing process formed a very flat surface of a bio-ORMOCER® primer layer that once dry was ~4.5 um. To make an even more perfect, stiffer support layer for metallization, we then repeated the application and curing of the bio-ORMOCER® primer layer, in order to create a layer that was ~9 um thick in total once cured. After curing of the second bio-ORMOCER® layer at 120° C., an extremely flat, stable surface was formed that was an excellent surface to receive the subsequent aluminum coating. The prepared roll was then placed into the vacuum system of an electron beam evaporation unit (manufactured by Leybold) and was pumped down to create a vacuum—a process that took several hours due to the porosity of the paper layer within the substrate. Typically, the system was pumped down to a vacuum of $1.5 \times 10^{-5}$ mbar (which is ~0.01 Torr). Once inside the system, the film rollers cooled the substrate with liquid nitrogen to a temperature range of −5° C. to −10° C. ahead of deposition, so that any residual water was frozen in place. The system then unrolled the substrate, moving at a web speed in the range of 0.9-1.2m/minute, using a web tension of ~50N. Electron beam evaporation of the aluminum source was used to create a vapor which then deposited aluminum onto the substrate as it was unrolled. The aluminum target used had a purity of 99.999%. In order to vaporize the aluminum target, an electric current of 450-500 mA was applied to an electron source to form an electron beam that was focused onto the aluminum target. The coating rate of aluminum onto the substrate was in the range of 45-75 Å/second and so the web was moved at a suitable rate to obtain the desired thickness.

Once the inorganic coating was applied, the substrate was rolled up again. In total, 100 nm of aluminum was applied to the top surface of the substrate in order to prepare this particular sample. Before the vacuum chamber could be opened, the aluminum source needed to be cooled down to prevent oxidation, so it was necessary to wait approximately 30 minutes. After that time, air was allowed to enter the chamber and the roll of substrate could be removed. As a next step, another protective layer of liquid bio-ORMOCER® primer was added directly on top of the aluminum layer, also using an anilox roll. This layer was cured using the same convective drier/heater (Drytec brand from Krönert) held at 120° C., whilst the substrate was moved through the drier at a speed of 5m/minute to ensure that the residence time of the coating within the dryer was approximately 1 minute. This curing process formed a bio-ORMOCER® primer layer that once dry was ~3.5 um. Finally, the structure was coated with the aqueous heat seal layer composition held at 85° C., using a lab-coater with a wired rod that controls coating thickness and an oven with convective dryer. Four different compositions (FROZEN 3C, FROZEN 4A, FROZEN 4B and FROZEN 5) were used separately as the heat seal layer—to create four different new structures HPX-O-A100-3C, HPX-O-A100-4A, HPX-A100-4B and HPX-A100-5. For each structure a wet layer ~55 um thick of one different composition was laid down to make each different structure. The water from these solutions was dried using the steady state convective drier/heater at 90° C. for 5 minutes, creating a heat seal layer that was in the range of 15-20 μm thick when dried.

The details of each layer, along with their purpose within the structure created are outlined in TABLE 13 below:

TABLE 13

Structure Details for Example 4:

ID#: HPX-O-A100-3C, HPX-O-A100-4A, HPX-A100-4B and HPX-A100-5

| | Layer # | | | | | |
|---|---|---|---|---|---|---|
| | 1 | 2 | 3 | 4 | 5 | 6 |
| Material | PackPro 7.0 Paper (Sized) | PVOH (FROZEN 3A recipe) | Bio-ORMOCER® | Aluminum | Bio-ORMOCER® | i) PVOH/TALC (FROZEN 3C) ii) PEO (FROZEN 4A) iii) PEO/TALC (FROZEN 4B) iv) PEO/METHYL-CELLULOSE (FROZEN 5) |
| Purpose | Main Substrate Base Layer - Biodegradable and Recyclable in paper stream | Lamination Layer - Soluble and Biodegradable. Helps paper layer separate quickly from barrier layers during repulping or biodegradation. | $1^{st}$ Biodegradable Primer Layer - Support layer for aluminum | Inorganic Barrier Layer - Barrier to moisture, oxygen, perfume, grease etc. | $2^{nd}$ Biodegradable Primer Layer - Protective layer for aluminum | Heat Seal Layer - Soluble and Biodegradable. Separates from rest of structure and dissolves quickly during repulping or biodegradation. |
| Basis Weight | 80 gsm | | | | | |
| Thickness (Dry) | 62 μm (All sample ID's) | 9 μm (All sample ID's) | 6 μm (All sample ID's) | 100 nm (All sample ID's) | 3.5 μm (All sample ID's) | i) 20 um = HPX-O-A100-3C ii) 15-20 um = HPX-O-A100-4A iii) 15-20 um = HPX-A100-4B iv) 15 um = HPX-A100-5 |

TABLE 13-continued

Structure Details for Example 4:

ID#:
HPX-O-A100-3C, HPX-O-A100-4A, HPX-A100-4B and HPX-A100-5

| | Layer # | | | | | |
|---|---|---|---|---|---|---|
| | 1 | 2 | 3 | 4 | 5 | 6 |
| Supplier | B&B | HPX | Fraunhofer | Fraunhofer | Fraunhofer | HPX |
| Application Method | NA | Solution Coating via Anilox Roll | Solution Coating via Anilox Roll | Vapor Deposition | Solution Coating via Anilox Roll | Solution Coating via Anilox Roll |
| Number of Coating Layer Applications Used to Form Layer | 1 layer | 1 layer | 2 layer | 1 layer | 1 layer | 1 layer |

The structures created were then assessed for the adhesion of the heat seal layer itself to the bio-ORMOCER® primer layer. This was important to maintain the integrity of the package. In high humidity conditions, we had seen that the HPX-O-A100-3B: KOTH1 sample had developed poor adhesion to the inner bio-ORMOCER® primer layer, in addition to wrinkling that was so bad that it likely also contributed further to the delamination of the heat seal layer from the bio-ORMOCER® layer.

Following on from this test, we also assessed the ability of the substrate to be converted into a full package under more stressful high humidity/high temperature conditions, such as those found in many parts of the world where the natural moisture levels in the air can be very high, even inside an air-conditioned building. To assess this, we placed the new substrates inside various humidity chambers. Samples were assessed every 30 minutes for the first three hours and then every day for the next week. In particular, we found that a room set at 40° C./75% RH would cause the PVOH heat seal layer to become opaque, swell and wrinkle within the first 3 hours after having been placed inside the chamber. This made it very difficult to form a good heat seal in order to form a well-sealed package. Results are summarized in TABLE 14 below and for comparison, the results for structures HPX-A100-3B (described in the section for Example 2) and also HPX-O-A100-3B: KOTH1 (described in the section for Example 3) are included in TABLE 14.

As one can see in TABLE 14—we observed good results in reducing the moisture sensitivity by adding micro-talc as a filler versus HPX-O-A100-3B: KOTH1. However, the addition of talc also seemed to reduce the ability of the material to be heat sealed. In addition, the addition of talc did little to improve the adhesion strength of the inner bio-ORMOCER® layer to the heat seal layer. For this reason, we decided next to experiment with adding an insoluble polymer as the heat seal layer and this is described in the next example section.

Example 5: Biodegradable and Recyclable Barrier Paper Laminate Based on Paper, Polyvinyl Alcohol Lamination Layer, Bio-ORMOCER® Primer, Aluminum Barrier and PBSA Heat Seal Layers In a further attempt to find a heat seal layer that would have less moisture resistance but still be heat sealable, whilst also being biodegradable and not impede paper recyclability, we decided to experiment with using PBSA as a heat seal layer. PBSA was chosen because it has passed the OECD301B biodegradation test, is available in industrial quantities and companies attempting to use PBSA as a liner for paper coffee cups have reported that it acts better than PE

TABLE 14

Results for Alternative Heat Seal Layers:

| Sample Number | Moisture Sensitivity Visual Assessment at 40 C./75% RH - 3 Hours Exposure | Moisture Sensitivity Visual Assessment at 40 C./75% RH - 4 Days Exposure | Heat Seal Strength max. force [N/25.4 mm] | Adhesion Strength to Inner bio-ORMOCER ® Layer |
|---|---|---|---|---|
| HPX-O-A100-3B:KOTH1 | Wrinkles | Wrinkles | 12 | 0.2N/inches Delaminates |
| HPX-A100-3B | Wrinkles | Wrinkles | 14 | 28N/inches Paper Tear |
| HPX-O-A100-3C | Good - no issues | Good - no issues | No/weak seal | 0.2N/inches Delaminates |
| HPX-O-A100-4A | Absorbing water | Small holes formed | 2 | 0.2N/inches Delaminates |
| HPX-A100-4B | Good - no issues | Good - no issues | No/weak seal | 0.2N/inches Delaminates |
| HPX-A100-5 | Absorbing water | Small holes formed | No/weak seal | 0.2N/inches Delaminates | during recycling. It is reported to swell more than PE in the paper recycling repulping tank and release the paper fibers more easily. The rest of the structure was kept the same—even the PVOH lamination layer. We knew that because PBSA is not soluble, we would need to keep the PBSA as thin as possible or we could fail paper recyclability. We therefore had to experiment with different thicknesses of PBSA in order to find the correct PBSA thickness that would pass the paper recyclability tests.

Making of Example 5 Structures at the Fraunhofer Institute IVV, Freiburg, Germany and the Procter & Gamble Company, West Chester, Ohio, USA:

In three non-limiting embodiments (HPX-O-A100-PB15:KOTH2, HPX-O-A100-PB-11:KOTH3 and HPX-O-A100-PB-7), a biodegradable and recyclable 62 μm thick paper grade traded as PackPro 7.0 from Brigl and Bergmeister (B&B) was taken. The paper has two sides—one side which is sized by Brigl and Bergmeister using a mineral coating to prepare it for subsequent coatings, whereas the other side is not sized. The sized side of this paper was then coated with the PVOH-based aqueous lamination layer composition FROZEN 3A (see recipe above) held at 85° C., using an anilox roll. The water from the solution was partially absorbed into the paper but was also dried using a convective drier/heater (Drytec brand from Krönert) at 90° C., creating a PVOH layer that was ~9 um thick when dried. The composition of the resulting dry lamination layer was 80% Selvol 205 PVOH from Sekisui Chemicals and 20% glycerol from Cremer. As a next step, a layer of liquid bio-ORMOCER® primer was added on top of the first layer, also using an anilox roll. This bio-ORMOCER® layer was then cured using the same convective drier/heater (Drytec brand from Krönert) held at 100° C., whilst the substrate was moved through the drier at a speed of 5m/minute to ensure that the residence time of the coating within the dryer was approximately 1 minute. This curing process formed a very flat surface of a bio-ORMOCER® primer layer that once dry was ~4.5 um. To make an even more perfect, stiffer support layer for metallization, we then repeated the application and curing of the bio-ORMOCER® primer layer, in order to create a layer that was ~9 um thick in total once cured. After curing of the second bio-ORMOCER® layer, an extremely flat, stable surface was formed that was an excellent surface to receive the subsequent aluminum coating. The prepared roll was then placed into the vacuum system of an electron beam evaporation unit (manufactured by Leybold) and was pumped down to create a vacuum—a process that took several hours due to the porosity of the paper layer within the substrate. Typically, the system was pumped down to a vacuum of $1.5 \times 10^{-5}$ mbar (which is ~0.01 Torr). Once inside the system, the film rollers cooled the substrate with liquid nitrogen to a temperature range of −5° C. to −10° C. ahead of deposition, so that any residual water was frozen in place. The system then unrolled the substrate, moving at a web speed in the range of 0.9-1.2m/minute, using a web tension of ~50N. Electron beam evaporation of the aluminum source was used to create a vapor which then deposited aluminum onto the substrate as it was unrolled. The aluminum target used had a purity of 99.999%. In order to vaporize the aluminum target, an electric current of 450-500 mA was applied to an electron source to form an electron beam that was focused onto the aluminum target. The coating rate of aluminum onto the substrate was in the range of 45-75 Å/second and so the web was moved at a suitable rate to obtain the desired thickness. Once the inorganic coating was applied, the substrate was rolled up again. In total, 100 nm of aluminum was applied to the top surface of the substrate in order to prepare this particular sample. Before the vacuum chamber could be opened, the aluminum source needed to be cooled down to prevent oxidation, so it was necessary to wait approximately 30 minutes. After that time, air was allowed to enter the chamber and the roll of substrate could be removed. As a next step, a third protective layer of liquid bio-ORMOCER® primer was added directly on top of the aluminum layer, also using an anilox roll. This layer was cured using the same convective drier/heater (Drytec brand from Krönert) held at 120° C., whilst the substrate was moved through the drier at a speed of 5m/minute to ensure that the residence time of the coating within the dryer was approximately 1 minute. This curing process formed a bio-ORMOCER® primer layer that once dry was ~3.5 um. Finally, the structure was heat laminated to a PBSA film of various thicknesses—first a 15 um film, then an 11 um film and then a 7 um film. The PBSA film was first manufactured on a Collins Film Line at The Procter and Gamble Company in West Chester, Ohio, USA. The three different film thicknesses were made using the thermal cast film extrusion segment of the Collins Film Line, in order to minimize the thickness variation of the film versus thermal blown film extrusion—although it is possible that some film makers may be able to achieve low thickness variation even with a blown film unit. The bio-PBSA pellets were obtained from Mitsubishi and the grade used was PD92PM since this was known to have the best biodegradation kinetics of the PBSA/PBS grades that Mitsubishi sell. To cast the films on the Collins Film Line, the multiple extruder zones that melt the PBSA pellets were set to start at 130° C., graduating to 160° C. and then the pipes feeding the cast die and the cast die itself were set at 160° C. Once formed into films, the films were cut and then heat laminated to attach to the rest of the structure using a lamination roller temperature of 140° C., using a Sky 480R6 lamination unit located at The Procter and Gamble Company in West Chester, Ohio, USA. HPX-O-A100-PB15:KOTH2 was formed using the 15 um PBSA film, HPX-O-A100-PB-11:KOTH3 was formed using an 11 um PBSA film and HPX-O-A100-PB-7 was formed using a 7 um PBSA film.

The details of each layer, along with their purpose within the structure created are outlined in TABLE 15 below, using a number of laboratory-scale and small-scale set of suppliers:

TABLE 15

Example 5 Structure Details of Laminates Constructed at a Combination of The Fraunhofer Institute IVV, Freiburg, Germany and The Procter & Gamble Company, West Chester, Ohio, USA:

ID#: HPX-O-A100-PB15:KOTH2, HPX-O-A100-PB-11:KOTH3 and HPX-O-A100-PB-7

| | Layer # 1 | 2 | 3 | 4 | 5 | 6 |
|---|---|---|---|---|---|---|
| Material | PackPro 7.0 Paper (Sized) | PVOH (FROZEN 3A recipe) | Bio-ORMOCER® | Aluminum | Bio-ORMOCER® | PBSA Film |
| Purpose | Main Substrate Base Layer - Biodegradable and Recyclable in paper stream | Lamination Layer - Soluble and Biodegradable. Helps paper layer separate quickly from barrier layers during repulping or biodegradation. | $1^{st}$ Biodegradable Primer Layer - Support layer for aluminum | Inorganic Barrier Layer - Barrier to moisture, oxygen, perfume, grease etc. | $2^{nd}$ Biodegradable Primer Layer - Protective layer for aluminum | Heat Seal Layer - Biodegradable. Swells and separates more easily than PE from rest of structure during repulping. |
| Basis Weight | 80 gsm | | | | | |
| Thickness (Dry) | 62 μm (All sample ID's) | 9 μm (All sample ID's) | 6 μm (All sample ID's) | 100 nm (All sample ID's) | 3.5 μm (All sample ID's) | HPX-O-A100-PB15:KOTH2 = 15 μm HPX-O-A100-PB-11:KOTH3 = 11 μm HPX-O-A100-PB-7 = 7 μm |
| Supplier | B&B | HPX | Fraunhofer | Fraunhofer | Fraunhofer | P&G Collins Film Line |
| Application Method | NA | Solution Coating via Anilox Roll | Solution Coating via Anilox Roll | Vapor Deposition | Solution Coating via Anilox Roll | Heat Lamination |
| Number of Coating Layer Applications Used to Form Layer | 1 layer | 1 layer | 2 layers | 1 layer | 1 layer | 1 layer |

In some embodiments, we performed a corona treatment of the bio-ORMOCER® layer before heat laminating or adhesively laminating the PBSA to it. In some cases, we found that corona treatment of the bio-ORMOCER® outer layer prior to heat lamination of the PBS (15 μm), the PBS (11 μm) or the PBS (7 pm) to the structure improved the lamination strength between the bio-ORMOCER® and the respective PBSA layers. Instead of easily delaminating the PBSA from the bio-ORMOCER®, fiber tear or tear into the other layers of the structure occur when first performing a corona treatment prior to either heat lamination.

Making of Example 5 Structures at Jura-Plast GmbH/Jura-Tech GmbH (Bavaria, Germany) and ROWO Coatings GmbH (Baden-Wurttemberg, Germany):

After the initial set of materials outlined in Table 15 was constructed using a number of laboratory-scale and small-scale line set of suppliers, we moved to using a different set of industrial-scale suppliers to construct a large roll of material for line trials. For that larger roll, the details of each layer, along with their purpose within the structure created are outlined in TABLE 16 below. We worked with Jura-Plast GmbH/Jura-Tech GmbH (Bavaria, Germany)—a film converter, in order to make a one meter wide roll of completed laminate. This converter had the ability to solution coat onto paper and other substrates, blow extruded films, and also adhesively laminate different layers together. Layer 2 (the PVOH FROZEN 3A layer) and Layer 3 (the bio-ORMOCER® layer) were coated onto the paper layer at Jura-Plast GmbH/Jura-Tech GmbH. They then sent the roll of substrate to a third party metallizer ROWO Coatings GmbH (Baden-Wurttemberg, Germany) to apply the aluminum vapor-deposited layer and then to perform a Corona treatment. The roll of substrate was then sent back to Jura-Plast GmbH/Jura-Tech GmbH for the application of Layer 5 (the bio-adhesive layer) and Layer 6 (the PBSA film). In this structure, the second bio-ORMOCER® layer was omitted as we found that it was not needed to maintain the good barrier—only the first bio-ORMOCER® layer was necessary.

TABLE 16

Example 5 Structure Details for Laminates Constructed at a Combination of Jura-Plast GmbH/Jura-Tech GmbH and ROWO Coatings GmbH ID#: HPX-KOTH-IS-1
Layer #

| | 1 | 2 | 3 | 4 | 5 | 6 |
|---|---|---|---|---|---|---|
| Material | PackPro 7.0 Paper (Sized) | PVOH (FROZEN 3A recipe) | Bio-ORMOCER® | Aluminum with Subsequent Corona Treatment | Bio-Adhesive Layer | PBSA Film |
| Purpose | Main Substrate Base Layer - Biodegradable and Recyclable in paper stream | Lamination Layer - Soluble and Biodegradable. Helps paper layer separate quickly from barrier layers during repulping or biodegradation. | 1$^{st}$ Biodegradable Primer Layer - Support layer for aluminum | Inorganic Barrier Layer - Barrier to moisture, oxygen, perfume, grease etc. | Biodegradable Adhesive layer on top of Corona Treated Layer 4 (Aluminium) - Enables Layer 6 (the Biodegradable Heat Seal Layer) to adhere well to Layer 4 (the Corona Treated Aluminium Layer) to prevent delamination | Biodegradable Heat Seal Layer - Biodegradable. Swells and separates more easily than PE from rest of structure during repulping. |
| Basis Weight | 80 gsm | 33.6 gsm for both PVOH and Bio-ORMOCER® together (could not be differentiated) | 33.6 gsm for both PVOH and Bio-ORMOCER® together (could not be differentiated) | 80 nm | N/A | |
| Thickness (Dry) | 62 μm | 28 μm for both PVOH and Bio-ORMOCER® together (could not differentiate between them) | 28 μm for both PVOH and Bio-ORMOCER® together (could not differentiate between them) | 100 nm | N/A | 18.8 μm |
| Supplier | B&B | Jura-Plast GmbH/Jura-Tech GmbH | Jura-Plast GmbH/Jura-Tech GmbH | ROWO Coatings GmbH | Jura-Plast GmbH/Jura-Tech GmbH | Jura-Plast GmbH/Jura-Tech GmbH |
| Application Method | NA | Solution Coating via Gravure Roll | Solution Coating via Gravure Roll | Vapor Deposition + Corona Surface Treatment | Coating via Gravure Roll | Adhesive Lamination via Gravure Roll |
| Number of Coating Layer Applications Used to Form Layer | 1 layer | 1 layer | 2 layers | 1 layer (Note that the subsequent Corona treatment of the aluminium layer does not deposit anything, it just changes the surface energy.) | 1 layer | 1 layer |

Details of the processes used at Jura-Plast GmbH/Jura-Tech GmbH to construct this laminate material are listed below:

1. Coating of PVOH-solutions

Frozen 3, 25% solids, prepared by HPX, diluted to about 15% to adjust viscosity and coating grammage, coated on the glossy side of Packpro 7.0, coating width: 1.000 mm 1.1 Industrial partner: Jura-tech GmbH
      1.1.1 Machine
      Printing machine—gravure roll coating unit+dryer
      1.2.1 settings: speed: 30m/min (limited by foaming of the PVOH-solution), dryer temperature: 80° C.
      1.3.1 results:
      2 coatings of PVOH, volume: 6700 linear meters grammage: 3-3.5 g/m2 each (dry)
      total thickness: 0.5-1 μm on top of paper surface (detected by SEM)

2. Coating of PVOH-lacquer

15% solids, prepared by Hubergroup, diluted to about 10% to adjust viscosity, coated on the double coated side of Packpro 7.0, coating width: 1.000 mm 2.1 Industrial partner: Jura-tech GmbH
      2.1.1 Machine
      Printing machine—gravure roll coating unit+dryer
      2.2.1 settings: speed: 50m/min, dryer temperature: 90° C.
      2.3.1 results:
      2 coatings of PVOH-lacquer, volume: 900 linear meters grammage: 2-2.5 g/m2 each (dry)

3. Coating of Ormocer-lacquer
44% solids, diluted to about 25% to adjust viscosity and coating grammage, coating width: 1.000 mm
  3.1 Industrial partner: Jura-tech GmbH
    3.1.1 Machine
    Printing machine—gravure roll coating unit+dryer
    3.2.1 settings: speed 20-50m/min, dryer temperature: 105° C.+2×IR-heaters (max. dryer settings)
    3.3.1 results:
    2 coatings of Ormocer, volume: 6370 linear meters in 3 rolls (coated with different speed)
    grammage: 1.2-1.5 g/m2 each (dry)
    total thickness: 2.2-2.5 μm on top of the PVOH layers (detected by SEM)
4. Lamination of PBSA biofilm on the aluminized & lacquered paper
Lamination of 19 μm PBSA-film produced by jura-plast using Morchem bio-adhesive (PS 255 eco+CS 95, 25% solids) coated onto the PBSA-film, dried and laminated against the aluminized and lacquered paper versions from ROWO Laminating width: 1.000 mm
  4.1 Industrial partner: Jura-tech GmbH
    4.1.1 Machine
    Laminating machine—gravure roll coating unit+dryer
    4.2.1 settings: line speed. 60m/min, dryer: 80° C.+IR-heater (20%), corona film pre-treatment: 1500W
    4.3.1 results: bio-film laminated barrier paper, volume: 650 linear meters (good WVTR)
    Adhesive grammage: 2.5-3 g/m2 (dry)

Summary of Combined Results

The structures created and shown in Table 15 and in Table 16 were then subjected to a range of physical tests, in order to assess its suitability for the application. The tests included moisture vapor transmission rate testing, oxygen transmission rate testing, grease resistance testing, heat seal strength testing, recyclability testing and biodegradation testing. Results from these samples are summarized in TABLE 17 below—and HPX-O-A100-3B:KOTH1 is also shown as reference:

TABLE 17

Results from Physical Testing of Structures Shown in Tables 15 and 16:

| Sample Number | WVTR g/m2 · day at 38 C./90% RH | OTR cc/m2/day At 23 C./80% RH | Grease Resistance Kit Test | Heat Seal Strength max. force [N/25.4 mm] | PTS Recyclability Result Recyclable % | OECD301B Biodegradation Test Results |
|---|---|---|---|---|---|---|
| HPX-O-A100-3B:KOTH1 | 1.22 | <0.005 | >12 | 7.4 | PASS (82%) | PASS (100% in 30 days at end of test and passed 60% within 7 days.) |
| HPX-O-A100-PB15:KOTH2 | 4 | 7.14 | >12 | 13.7 | NOT YET TESTED | Not yet tested but we expect to pass since separate components pass |
| HPX-O-A100-PB-11:KOTH3 | 4 | Not yet tested | >12 | 2.4 | PASS (78.9%) | Not yet tested but we expect to pass since separate components pass |
| HPX-O-A100-PB-7 | Not yet tested | Not yet tested | Not yet tested | 1.5 | Not yet tested | Not yet tested but since separate components pass |
| HPX-KOTH-IS-1 | 12.3 | 4.9 | >12 | 10 | PASS (57.3%) | FAILED (44.4% within 57 days at end of test) |

In addition, the moisture sensitivity of all these options was also tested in order to assess if the wrinkling problem had been solved and results are summarized in TABLE 18 below:

TABLE 18

Results for Moisture Sensitivity, Heat Seal Strength and Adhesion Strength:

| Sample Number | Moisture Sensitivity Visual Assessment at 40 C./75% RH - 3 Hours Exposure | Moisture Sensitivity Visual Assessment at 40 C./75% RH - 4 Days Exposure | Heat Seal Strength max. force [N/25.4 mm] | Adhesion Strength to Inner bio-ORMOCER ® Layer |
|---|---|---|---|---|
| HPX-O-A100-3B:KOTH1 | Wrinkles | Wrinkles | 7.4 | 0.2N/inches Delaminates |
| HPX-O-A100-PB15:KOTH2 | No wrinkles | No wrinkles | 3.6 | Paper tear |
| HPX-O-A100-PB-11:KOTH3 | No wrinkles | No wrinkles | 2.4 | Paper tear |

TABLE 18-continued

Results for Moisture Sensitivity, Heat Seal Strength and Adhesion Strength:

| Sample Number | Moisture Sensitivity Visual Assessment at 40 C./75% RH - 3 Hours Exposure | Moisture Sensitivity Visual Assessment at 40 C./75% RH - 4 Days Exposure | Heat Seal Strength max. force [N/25.4 mm] | Adhesion Strength to Inner bio-ORMOCER ® Layer |
|---|---|---|---|---|
| HPX-O-A100-PB-7 | No wrinkles | No wrinkles | 1.5 | Paper tear |
| HPX-KOTH-IS-1 | No wrinkles | No wrinkles | 10 | Paper tear |

As one can see from TABLE 18, as expected, none of the PBSA heat seal layers experienced any moisture sensitivity issues. You can also see that the heat seal strengths for 15 um and 11 um PBSA are sufficiently strong enough i.e. they meet the required limit of at least 3N. We did find that with normal heat sealing the 7 um PBSA layer gave a lower heat seal strength of 2.5N, which is lower than the target if the heat seal method and heat seal bars used so far is used—it may be possible to increase this value in future by tweaking the heat seal method to meet the target. Also, replacing the heat seal layer with a PBSA layer had little effect on the moisture transmission rate at 38 C/90% RH and they remain below <5 g/m2·day.

PBS from the bio-Ormocer, fiber tear or tear into the other layers of the structure occur.

In addition to the tests already described some of the HPX-O-A100-PB11:KOTH3 substrate was formed into sachets. A second product—a dry solid form Beauty Care product was placed inside the sachet and the final side of the sachet was sealed. The product was known to contain a high percentage of moisturizing oils and so it was important to have a good grease barrier. The sachet containing the product was placed on a rapid stability test, which included placing a weight on top of the sachet and placing the sachet in higher temperature and humidity environment, (38° C./75% RH) for an extended period of time. After aging the package was observed to see how well the product was contained within the package. Results showed that no grease marks transferred to the outside of the package and so it was assumed that this substrate is a good barrier for this product.

Example 6: Biodegradable and Recyclable Barrier Paper Laminate Based on Paper, Polyvinyl Alcohol Lamination Layer, Alternative Biodegradable Primers, an Aluminum Barrier and a Polyvinyl Alcohol Heat Seal Layer We also explored primers other than bio-ORMOCER®, to provide other supply options. In particular, we tested a PVOH-based primer from Huber to see if it could perform the same role as the bio-ORMOCER®. We tested the primer alone and mixed with the bio-ORMOCER®. We also tested eliminating the top primer and instead placed the PVOH heat seal layer directly on top of the aluminum layer. Five different new structures were made in total. In two cases, the primer was tested for the possibility that the primer could also act as the heat seal layer for the structure—which would have enabled the structure to be simplified because a separate heat seal polymer would then not need to be added—this would reduce manufacturing cost. In the other two cases, a soluble heat seal layer was laid on top of the primer layer, so that the soluble polymer rather than the primer would act as the heat seal layer. In the fifth case, as mentioned earlier, we did not use a primer at all to topcoat the aluminum—instead we just used a layer of PVOH.

Making of Example 6 Structures at the Fraunhofer Institute IVV, Freiburg, Germany:

In one non-limiting embodiment (HPX-O-A100-P1, HPX-O-A100-P2, HPX-O-A100-P1-4A, HPX-O-A100-P1-3C and HPX-O-A100-3B), a biodegradable and recyclable 62 μm thick paper grade traded as PackPro 7.0 from Brigl and Bergmeister (B&B) was taken. The paper has two sides—once side which is sized by Brigl and Bergmeister using a mineral coating to prepare it for subsequent coatings, whereas the other side was not sized. The sized side of this paper was then coated with the PVOH-based aqueous lamination layer composition FROZEN 3A (see recipe above) held at 85° C., using an anilox roll. The water from the solution was partially absorbed into the paper but was also dried using a convective drier/heater (Drytec brand from Krönert) at 90° C., creating a PVOH layer that was ~9 um thick when dried. The composition of the resulting dry lamination layer was 80% Selvol 205 PVOH from Sekisui Chemicals and 20% glycerol from Cremer. As a next step, a layer of liquid bio-ORMOCER® primer was added on top of the first layer, also using an anilox roll. This bio-ORMOCER® layer was then cured using the same convective drier/heater (Drytec brand from Krönert) held at 100° C., whilst the substrate was moved through the drier at a speed of 5m/minute to ensure that the residence time of the coating within the dryer was approximately 1 minute. This curing process formed a very flat surface of a bio-ORMOCER® primer layer that once dry was ~4.5 um. To make an even more perfect, stiffer support layer for metallization, we then repeated the application and curing of the bio-ORMOCER® primer layer, in order to create a layer that was ~9 um thick in total once cured. After curing of the second bio-ORMOCER® layer, an extremely flat, stable surface was formed that was an excellent surface to receive the subsequent aluminum coating. The prepared roll was then placed into the vacuum system of an electron beam evaporation unit (manufactured by Leybold) and was pumped down to create a vacuum—a process that took several hours due to the porosity of the paper layer within the substrate. Typically, the system was pumped down to a vacuum of $1.5 \times 10^{-5}$ mbar (which is ~0.01 Torr). Once inside the system, the film rollers cooled the substrate with liquid nitrogen to a temperature range of −5° C. to −10° C. ahead of deposition, so that any residual water was frozen in place. The system then unrolled the substrate, moving at a web speed in the range of 0.9-1.2m/minute, using a web tension of ~50N. Electron beam evaporation of the aluminum source was used to create a vapor which then deposited aluminum onto the substrate as it was unrolled. The aluminum target used had a purity of 99.999%. In order to vaporize the aluminum target, an electric current of 450-500 mA was applied to an electron source to form an electron beam that was focused onto the aluminum target. The coating rate of aluminum onto the substrate was in the range of 45-75 Å/second and so the web was moved at a suitable rate to obtain the desired thickness. Once the inorganic coating was applied, the substrate was rolled up again. In total, 100 nm of aluminum was applied to the top surface of the substrate in order to prepare this particular sample. Before the vacuum chamber could be opened, the aluminum source needed to be cooled down to prevent oxidation, so it was necessary to wait approximately 30 minutes. After that time, air was allowed to enter the chamber and the roll of substrate could be removed.

The next step differed amongst the five samples as follows, using a lab-coater with a wired rod that controls coating thickness and an oven with convective dryer different compositions were used separately as the heat seal layer—to create different new structures HPX-O-A100-P1, HPX-O-A100-P2, HPX-A100-P1-A4 and HPX-A100-3C and HPX-A100-3B. The water from these solutions was dried using the steady state convective drier/heater at 90° C. for 3 minutes, creating a solid layer when dried.

HPX-O-A100-P1: As a next step, a protective layer of liquid PVOH lacquer/primer was added directly on top of the aluminum layer.

HPX-O-A100-P2: As a next step, a protective layer of liquid primer that was a 50% blend of PVOH lacquer/primer with 50% liquid bio-ORMOCER® was added directly on top of the aluminum layer, HPX-O-A100-P1-4A: As a next step, a protective layer of liquid PVOH lacquer/primer was added directly on top of the aluminum layer HPX-O-A100-P1-3C: As a next step, a protective layer of liquid PVOH lacquer/primer was added directly on top of the aluminum layer, Finally, the structure was coated with the aqueous heat seal layer composition FROZEN 3C (PVOH with talc) held at 85° C. A wet layer ~55 um thick was laid down. The water from this solution was dried using a convective drier/heater (Drytec brand from Krönert) at 90° C., creating a heat seal layer that was ~18 um thick when dried. The composition of the resulting dry heat seal layer was 48% Selvol 205 ex Sekisui Chemicals, 40% micro-talc, 6% glycerol and 6% sorbitol.

HPX-O-A100-3B: As a next step, the aluminum was coated with the aqueous heat seal layer composition FROZEN 3B held at 85° C. creating a heat seal layer that was ~18 um thick when dried. The composition of the resulting dry heat seal layer was 80% PVOH, 10% glycerol and 10% sorbitol.

The details of each layer, along with their purpose within the structure created are outlined in TABLE 19 below:

TABLE 19

Structure Details:

ID#: HPX-O-A100-P1, HPX-O-A100-P2, HPX-O-A100-P1-4A, HPX-O-A100-P1-3C and HPX-O-A100-3B

| | Layer # | | | | | |
|---|---|---|---|---|---|---|
| | 1 | 2 | 3 | 4 | 5 | 6 |
| Material | PackPro 7.0 Paper (Sized) | PVOH (FROZEN 3A recipe) | Bio-ORMOCER® | Aluminum | Alternative Primer For HPX-O-A100-P1, HPX-O-A100-P1-4A and HPX-O-A100-P1-3C = PVOH lacquer<br><br>For HPX-O-A100-P2 = 50% PVOH lacquer blended with 50% bio-ORMOCER®<br><br>For HPX-ZZ = no top primer, so no 5$^{th}$ layer | Heat Seal Layer For HPX-P1-A100-3B, primer was also used as heat seal layer - so there was no 6$^{th}$ layer.<br><br>For HPX-V, primer was also used as heat seal layer - so there was no 6$^{th}$ layer.<br><br>For HPX-O-A100-P1-4A, heat seal layer was PEO<br><br>For HPX-O-A100-P1-3C, heat seal layer was PVOH blended with 40% micro-talc<br><br>For HPX-O-A100-3B, heat seal layer was PVOH |
| Purpose | Main Substrate Base Layer - Biodegradable and Recyclable in paper stream | Lamination Layer - Soluble and Biodegradable. Helps paper layer separate quickly from barrier layers during repulping or biodegradation. | 1$^{st}$ Biodegradable Primer Layer - Support layer for aluminum | Inorganic Barrier Layer - Barrier to moisture, oxygen, perfume, grease etc. | 2$^{nd}$ Biodegradable Primer Layer - Protective layer for aluminum | Heat Seal Layer - Soluble and Biodegradable. Separates from rest of structure and dissolves quickly during repulping or biodegradation. |

TABLE 19-continued

Structure Details:

ID#:
HPX-O-A100-P1, HPX-O-A100-P2, HPX-O-A100-P1-4A, HPX-O-A100-P1-3C and HPX-O-A100-3B Layer #

|  | 1 | 2 | 3 | 4 | 5 | 6 |
|---|---|---|---|---|---|---|
| Basis Weight | 80 gsm | | | | | |
| Thickness (Dry) | 62 μm (All sample ID's) | 9 μm (All sample ID's) | 6 μm (All sample ID's) | 100 nm (All sample ID's) | 3.5 μm (All sample ID's) | 18 μm (All sample ID's) |
| Supplier | B&B | HPX | Fraunhofer | Fraunhofer | Fraunhofer | HPX |
| Application Method | NA | Solution Coating via Anilox Roll | Solution Coating via Anilox Roll | Vapor Deposition | Solution Coating via Anilox Roll | Solution Coating via Anilox Roll |
| Number of Coating Applications Used to Form Layer | 1 | 1 | 2 | 1 | 1 | 1 |

The structure created was then subjected to a range of physical tests, in order to assess its suitability for the application. The tests included moisture vapor transmission rate testing, oxygen transmission rate testing, grease resistance testing, heat seal strength testing, recyclability testing and biodegradation testing. Results from these samples are summarized in TABLE 20 below:

TABLE 20

Results from Physical Testing of Structures:

| Sample Number | WVTR g/m2·day at 38 C./90% RH | OTR cc/m2/day At 23 C./80% RH | Grease Resistance Kit Test | Heat Seal Strength max. force [N/25.4 mm] | PTS Recyclability Result Recyclable % | OECD301B Biodegradation Test Results |
|---|---|---|---|---|---|---|
| HPX-O-A100-P1 | 4.5 | 0.12 | >12 | 23.3 Paper Tear | Not yet tested | Not yet tested |
| HPX-O-A100-P2 | Not tested yet | Not tested yet | Not tested yet | Not yet tested | Not yet tested | Not yet tested |
| HPX-O-A100-P1-4A | Not tested yet | Not tested yet | Not tested yet | 1.2 | Not yet tested | Not yet tested |
| HPX-O-A100-P1-3C | Not tested yet | Not tested yet | Not tested yet | Very weak | Not yet tested | Not yet tested |
| HPX-O-A100-3B | 4.8 | Not tested yet | Not tested yet | 7.4 | Not yet tested | Not yet tested |

The results so far show that using the PVOH lacquer as the top primer still provides a moisture transmission below the target value, indicating that this structure could be used to package even very humidity sensitive dry products. It also shows that the PVOH lacquer could be used as the heat seal layer in the structure, potentially allowing us to eliminate the need to add an additional heat seal polymer onto the structure. We also found that the PVOH lacquer was not as sensitive to moisture as PVOH alone is.

The results for HPX-O-A100-3B show that it is possible to not have a primer at all as the top primer, though a bottom primer is required given the results already shown if both primers are removed. Instead, a soluble polymer layer can be used to topcoat the aluminum and still maintain a moisture barrier that is less than the target of <5 g/m2·day at 38° C./90% RH.

Figure 11A:
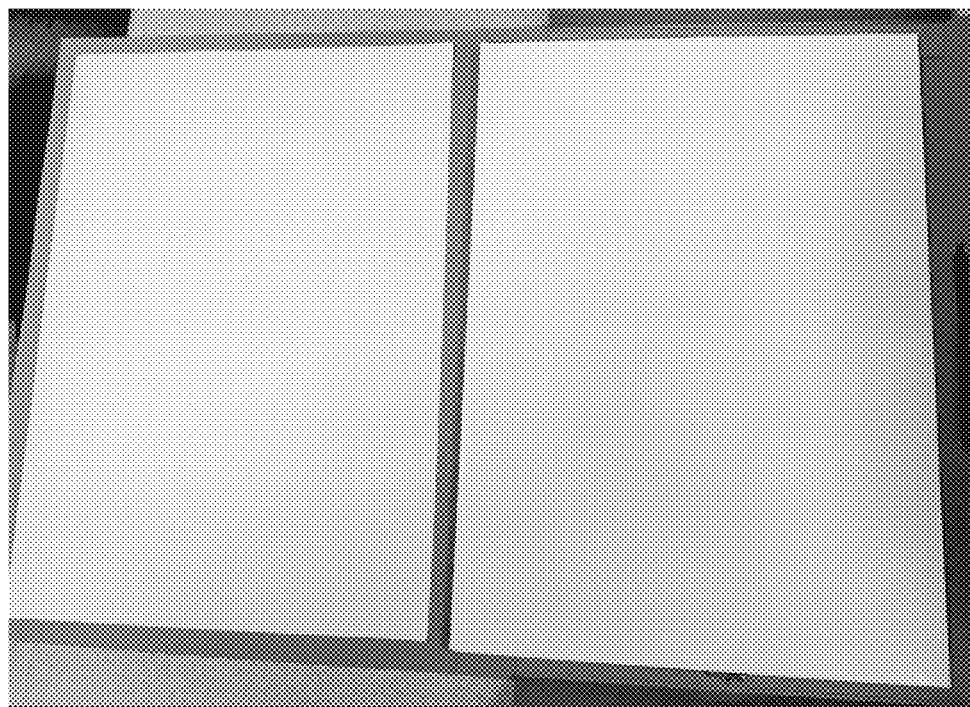
FIG. 11 shows photographs of two different biodegradable & recyclable barrier paper laminates 150. The photograph in FIG. 11a) shows the front-side and back-side of a biodegradable & recyclable paper barrier laminate made using an SiOx-based inorganic coating—you can clearly see the underlying biodegradable & recyclable paper layer (which is white) from both the front and the back sides. The photograph in FIG. 11b) shows the front-side and back-side of a biodegradable & recyclable paper barrier laminate made using an aluminum based inorganic coating—you can only see the underlying biodegradable & recyclable paper layer (which is white) from the back-side—you cannot see it from the front-sides. These photos demonstrate how the SiOx layer is transparent, whilst the aluminum coating is very opaque.
Figure 11B:
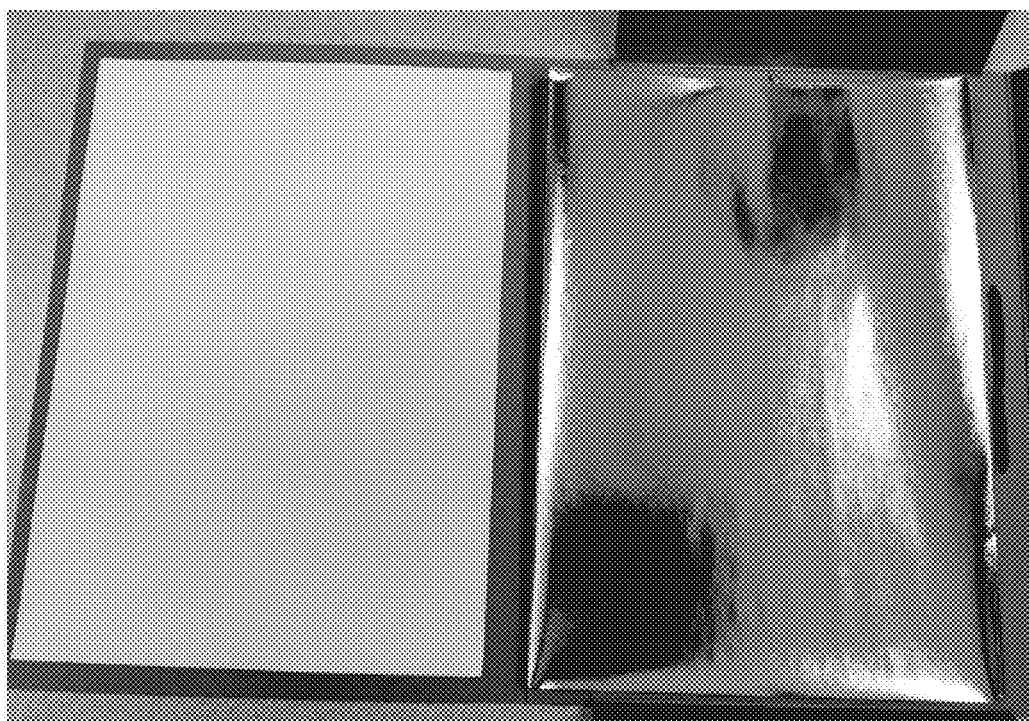

Example 7: Biodegradable Barrier Paper Laminate Based on Paper, Polyvinyl Alcohol Lamination Layer, Bio-ORMOCER® Primer, SiOx Barrier and Polyvinyl Alcohol Heat Seal Layer We also explored the use of SiOx barriers, instead of aluminum barriers. SiOx barriers tend to be significantly more expensive than aluminum barriers and are more brittle than aluminum so it is hard to maintain the barrier during processing, shipping and usage. However, one advantage is that they are clear. One advantage of having a clear barrier includes that it is likely easier to pass the visual assessment in a paper recycling protocol test. Another advantage is that if a translucent paper package was desired, this could be achieved by combining a vellum based transparent paper with an SiOx based barrier layer. FIG. 11 shows a photograph of a paper sample that we created using an aluminum barrier compared to a sample created using an SiOx barrier, showing that you can see straight through the SiOx barrier to the paper underneath—whilst the aluminum barrier is so opaque that you cannot see the paper underneath.

Making of Example 7 Structures at the Fraunhofer Institute IVV, Freiburg, Germany:

In the non-limiting embodiments (HPX-O6-SiOx-3B and HPX-O3-SiOx-3B), a biodegradable and recyclable 62 μm thick paper grade traded as PackPro 7.0 from Brigl and Bergmeister (B&B) was taken. The paper has two sides—one side which is sized by Brigl and Bergmeister using a mineral coating to prepare it for subsequent coatings, whereas the other side was not sized. The sized side of this paper was then coated with the PVOH-based aqueous lamination layer composition FROZEN 3A (see recipe above) held at 85° C., using an anilox roll. The water from the solution was partially absorbed into the paper but was also dried using a convective drier/heater (Drytec brand from Krönert) at 90° C., creating a PVOH layer that was ~9 um thick when dried. The composition of the resulting dry lamination layer was 80% Selvol 205 PVOH from Sekisui Chemicals and 20% glycerol from Cremer. As a next step, a layer of liquid bio-ORMOCER® primer was added on top of the first layer, also using an anilox roll. This bio-ORMOCER® layer was then cured using the same convective drier/heater (Drytec brand from Krönert) held at 100° C., whilst the substrate was moved through the drier at a speed of 5m/minute to ensure that the residence time of the coating within the dryer was approximately 1 minute. This curing process formed a very flat surface of a bio-ORMOCER® primer layer that once dry was ~3 um. Sample HPX-O3-SiOx-3B only had this first layer of bio-ORMOCER® added, whereas for Sample HPX-O6-SiOx-3B, to make an even more perfect, stiffer support layer for laydown of the SiOx layer, we then repeated the application and curing of the bio-ORMOCER® primer layer, in order to create a layer that was ~6 um thick in total once cured. After curing of the second bio-ORMOCER® layer, an extremely flat, stable surface was formed that was an excellent surface to receive the subsequent SiOx coating. The prepared roll was then placed into the vacuum system of an electron beam evaporation unit (manufactured by Leybold) and was pumped down to create a vacuum—a process that took several hours due to the porosity of the paper layer within the substrate. Typically, the system was pumped down to a vacuum of $12\times10^{-5}$ mbar (which is ~0.01 Torr). Once inside the system, the film rollers cooled the substrate with liquid nitrogen to a temperature range of −5° C. to −10° C. ahead of deposition, so that any residual water was frozen in place. The system then unrolled the substrate, moving at a web speed in the range of 4m/minute, using a web tension of ~50N. Electron beam evaporation of the SiOx source was used to create a vapor which then deposited SiOx onto the substrate as it was unrolled. The SiOx target used had a purity of >99% (mono-crystalline from Amcor) In order to vaporize the SiOx target, an electric current of 85-90 mA was applied to an electron source to form an electron beam that was focused onto the SiOx target—this was much lower than what was required for the aluminum coatings. The coating rate of SiOx onto the substrate was in the range of 200 Å/second (more than for aluminum coatings) and so the web was moved at a suitable rate to obtain the desired thickness. Once the SiOx coating was applied, the substrate was rolled up again. In total, 50-60 nm of SiOx was applied to the top surface of the substrate in order to prepare this particular sample. Before the vacuum chamber could be opened, the SiOx source needed to be cooled down to prevent thermal shock, so it was necessary to wait approximately 30 minutes. After that time, air was allowed to enter the chamber and the roll of substrate could be removed. As a next step, another layer of liquid bio-ORMOCER® primer was added directly on top of the SiOx layer, also using an anilox roll. This layer was cured using the same convective drier/heater (Drytec brand from Krönert) held at 120-° C., whilst the substrate was moved through the drier at a speed of 5m/minute to ensure that the residence time of the coating within the dryer was approximately 1 minute. Finally, the structure was coated with the aqueous heat seal layer composition FROZEN 3B held at 85° C., using an anilox roll. A wet layer ~55 um thick was laid down. The water from this solution was dried using a convective drier/heater (Drytec brand from Krönert) at 90° C., creating a heat seal layer that was ~18 um thick when dried. The composition of the resulting dry heat seal layer was 80% Selvol 205 ex Sekisui Chemicals, 10% glycerol and 10% sorbitol.

The details of each layer, along with their purpose within the structure created are outlined in TABLE 21 below:

TABLE 21

Structure Details:

ID#: HPX-O6-SiOx-3B A and HPX-O3-SiOx-3B

| Layer # | 1 | 2 | 3 | 4 | 5 | 6 |
|---|---|---|---|---|---|---|
| Material | PackPro 7.0 Paper (Sized) | PVOH (FROZEN 3A recipe) | Bio-ORMOCER® | SiOx | Bio-ORMOCER® | PVOH (FROZEN 3B recipe) |
| Purpose | Main Substrate Base Layer - Biodegradable and Recyclable in paper stream | Lamination Layer - Soluble and Biodegradable. Helps paper layer separate quickly from barrier layers during repulping or biodegradation. | $1^{st}$ Biodegradable Primer Layer - Support layer for aluminum | Inorganic Barrier Layer - Barrier to moisture, oxygen, perfume, grease etc. | $2^{nd}$ Biodegradable Primer Layer - Protective layer for aluminum | Heat Seal Layer - Soluble and Biodegradable. Separates from rest of structure and dissolves quickly during repulping or biodegradation. |
| Basis Weight | 80 gsm | | | | | |
| Thickness (Dry) | 62 μm (All sample ID's) | 9 μm (All sample ID's) | HPX-O6-SiOx-3B = 6 μm HPX-O3-SiOx-3B = 3 μm | 30-50 nm (All sample ID's) | 3.5 μm (All sample ID's) | 18 μm (All sample ID's) |
| Supplier | B&B | HPX | Fraunhofer | Fraunhofer | Fraunhofer | HPX |
| Application Method | NA | Solution Coating via Anilox Roll | Solution Coating via Anilox Roll | Vapor Deposition | Solution Coating via Anilox Roll | Solution Coating via Anilox Roll |
| Number of Coating Layer Applications Used to Form Layer | 1 layer | 1 layer | HPX-O6-SiOx-3B = 2 HPX-O3-SiOx-3B = 1 | 1 layer | 1 layer | 1 layer |

The structure created was then subjected to a range of physical tests, in order to assess its suitability for the application. The tests included moisture vapor transmission rate testing. Results from these samples are summarized in TABLE 22 below:

TABLE 22

Results from Physical Testing of Structures:

| Sample Number | WVTR g/m2 · day at 38 C./90% RH | OTR cc/m2/day At 23 C./80% RH | Grease Resistance Kit Test | Heat Seal Strength max. force [N/25.4 mm] | PTS Recyclability Result Recyclable % | OECD301B Biodegradation Test Results |
|---|---|---|---|---|---|---|
| HPX-O6-SiOx-3B | 14.8 | Not tested yet | Not tested yet | Not tested yet | Not tested yet | Not tested yet |
| HPX-O3-SiOx-3B | 378 | Not tested yet | Not tested yet | Not tested yet | Not tested yet | Not tested yet |

As one can see from this table, the barrier properties when using the SiOx barrier instead of the aluminum barrier are worse than the target of <5 g/m2·day. For that reason, it could not be used to package the most demanding products. However, it may still be useful for some less demanding products, if the higher cost and more fragile structure can be managed. If stiffer or higher gsm paper could be used, it may help to protect the fragile structure somewhat. The table above shows the increased fragility of the sample when the primer layer is reduced in thickness—the HPX-O6-SiOx-3B sample contains a 6 um thick layer of bio-ORMOCER® but the HPX-O3-SiOx-3B only contains a 3 um thick layer of bio-ORMOCER® and has a much higher moisture transmission rate. Apart from the bio-ORMOCER® thickness, the two structures are the same in construction. Furthermore, the MVTR of this structure when measured at a lower humidity of 40° C./50% RH was very low i.e. 0.732. Clearly this shows that humidity affects the value of this structure quite a lot.

Example 8: Biodegradable Barrier Paper Laminate Based on Paper, PHA Lamination Layer, Bio-ORMOCER® and SiOx Following on from the SiOx barrier examples described in Example 7, we made another version of that structure but using PHA as the heat seal instead of PVOH. The reason for testing PHA is that it actually has better biodegradation kinetics than PVOH—and also it is likely to be less susceptible to humidity than PVOH. We also re-arranged the layers in this structure, their purpose within the structure is outlined in Table 23 below.

Making of Example 8 at the Fraunhofer Institute IVV, Freiburg, Germany:

In one non-limiting embodiment (HPX-O-A100-3B: KOTH1), a biodegradable & recyclable 62 μm thick paper grade traded as PackPro 7.0 from Birgl & Bergmeister (B&B) was taken. The paper has two sides—one side which is sized by Birgl & Bergmeister using a mineral coating to prepare it for subsequent coatings, whereas the other side was not sized. The sized side of this paper was then coated with a PHA aqueous suspension from Danimer, using a lab-coater with wired rod coating tool and convective drier. The water from the solution was partially absorbed into the paper but was also dried by using the steady state convective drier/heater at 120° C., creating a PHA layer that was ~9 um thick when dried. The PHA layer was then heated to a higher temperature of 170° C. for 30 seconds using a heated press to form a continuous PHA layer. As a next step, a layer of liquid bio-ORMOCER® primer was added on top of the PHA layer, also using a moving wired rod coating tool. This bio-ORMOCER® layer was then cured using the same convective drier/heater held at 120° C., for 5 minutes. This curing process formed a very flat surface of the cured bio-ORMOCER® primer layer that once dry was ~4.5 um. The prepared sheet was then fixed on a continuous paper roll, placed into the vacuum system of an electron beam evaporation unit (manufactured by Leybold) and was pumped down to create a vacuum—a process that took several hours due to the porosity of the paper layer within the substrate. Typically, the system was pumped down to a vacuum of $1.5 \times 10^{-5}$ mbar (which is ~0.01 Torr). Once inside the system, the film rollers cooled the substrate with liquid nitrogen to a temperature range of −5° C. to −10° C. ahead of deposition, so that any residual water was frozen in place. The system then unrolled the substrate, moving at a web speed in the range of 4m/minute, using a web tension of ~50N. Electron beam evaporation of the SiOx source was used to create a vapor which then deposited SiOx onto the substrate as it was unrolled. The SiOx target used had a purity of >99%. In order to vaporize the SiOx target, an electric current of 85-90 mA was applied to an electron source to form an electron beam that was focused onto the SiOx target—this was much lower than what was required for the aluminum coatings. The coating rate of SiOx onto the substrate was in the range of 200 Å/second (much slower than for aluminum coatings) and so the web was moved at a suitable rate to obtain the desired thickness. Once the SiOx coating was applied, the substrate was rolled up again. In total, 50-60 nm of SiOx was applied to the top surface of the substrate in order to prepare this particular sample. Before the vacuum chamber could be opened, the SiOx source needed to be cooled down to prevent thermal shock, so it was necessary to wait approximately 30 minutes. After that time, air was allowed to enter the chamber and the roll of substrate could be removed. Finally, the SiOx was coated again with a PHA aqueous suspension from Danimer, using a lab-coater with wired rod coating tool and convective drier at 120° C., creating a PHA layer that was ~10 um thick when dried.

TABLE 23

Structure Details:

ID#:
HPX-PHA-O6-SiOx-PHA

| | Layer # | | | | |
|---|---|---|---|---|---|
| | 1 | 2 | 3 | 4 | 5 |
| Material | PackPro 7.0 Paper (Sized) | PHA | bio-ORMOCER ® | SiOx | PHA |
| Purpose | Main Substrate Base Layer - Biodegradable and Recyclable in paper stream | Lamination Layer - Soluble and Biodegradable. Helps paper layer separate quickly from barrier layers during repulping or biodegradation. | 1st Biodegradable Primer Layer - Support layer for aluminum | Inorganic Barrier Layer - Barrier to moisture, oxygen, perfume, grease etc. | Heat Seal Layer - Soluble and Biodegradable. Separates from rest of structure and dissolves quickly during repulping or biodegradation. |
| Basis Weight | 80 gsm | | | | |
| Thickness (Dry) | 62 μm | 9 μm | 6 μm | 30-50 nm | 9 μm |
| Supplier | B&B | HPX | Fraunhofer | Fraunhofer | HPX |
| Application Method | NA | Solution Coating via Anilox Roll | Solution Coating via Anilox Roll | Vapor Deposition | Solution Coating via Anilox Roll |
| Number of Coating Layer Applications Used to Form Layer | 1 layer | 1 layer | 2 layers | 1 layer | 1 layer |

The structure created was then subjected to a range of physical tests, in order to assess its suitability for the application. The tests included moisture vapor transmission rate testing, oxygen transmission rate testing, grease resistance testing, heat seal strength testing, recyclability testing and biodegradation testing. Results from these samples are summarized in TABLE 23 below:

TABLE 24

Results from Physical Testing of Structures:

| Sample Number | WVTR g/m2 · day at 38 C./90% RH | OTR cc/m2/day At 23 C./80% RH | Grease Resistance Kit Test | Heat Seal Strength max. force [N/25.4 mm] | PTS Recyclability Result Recyclable % | OECD301B Biodegradation Test Results |
|---|---|---|---|---|---|---|
| HPX-PHA-O6-SiOx-PHA | 24 | Not yet tested | Not yet tested | Not yet tested | Not yet tested | Not yet tested |

The data above shows that in fact the particular arrangements used did not provide a better barrier versus Example 7.

Figure 12:
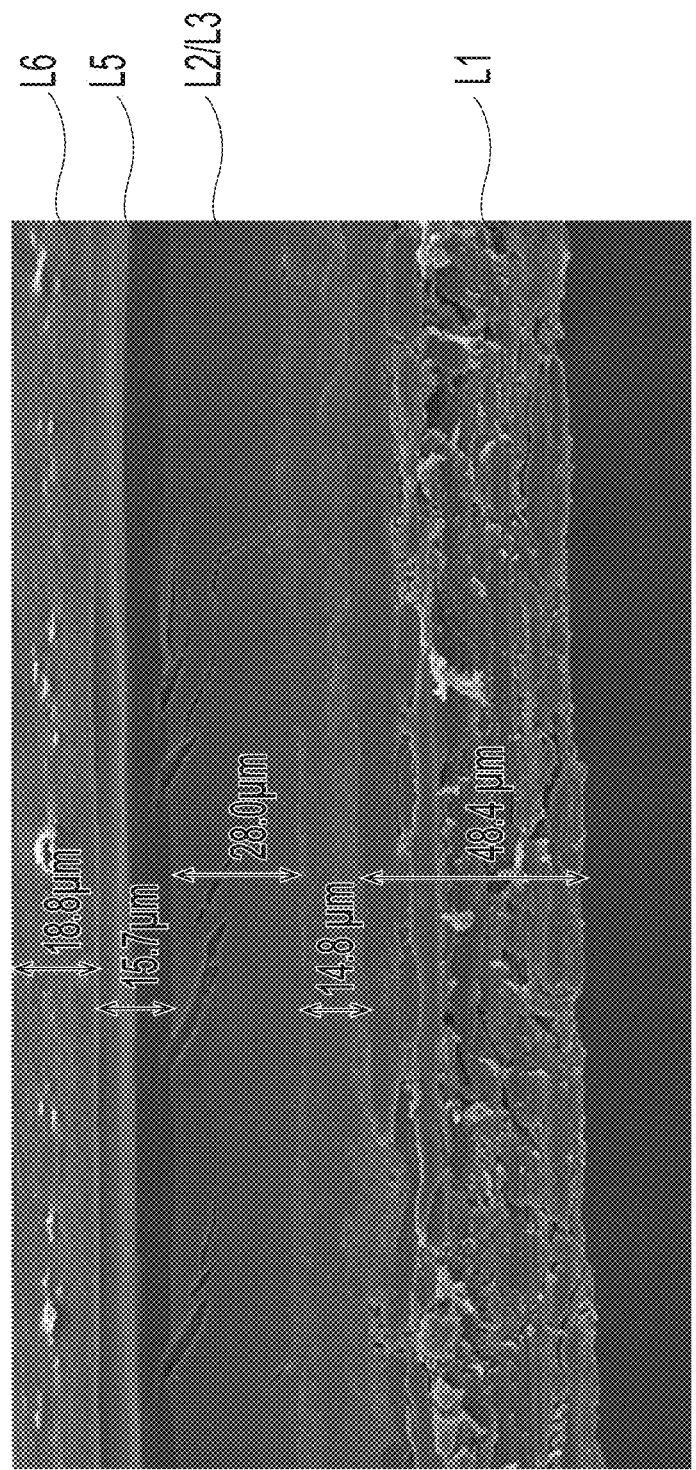
FIG. 12 shows a cross-sectional image of the biodegradable & recyclable barrier paper laminate described in Example 5 named HPX-KOTH-IS-1, obtained via scanning electron microscopy.

Making of Example 9: Biodegradable and Recyclable Barrier Paper Laminate Based on Paper, Polyvinyl Alcohol Lamination Layer, Bio-ORMOCER® Primer and an Aluminum Barrier without a Sealant Layer:

During the industrial scale construction of Example 5, HPX-KOTH-IS-1 (FIG. 12) to make larger rolls of material, an additional sample of Example 9 was also produced which was the same material as Example 5 but without an adhesive and heat seal layer. For that material, the details of each layer, along with their purpose within the structure created are outlined in TABLE 26 below. We worked with Jura-Plast GmbH/Jura-Tech GmbH (Bavaria, Germany) a film converter, in order to make for us a one meter wide by 500 meter long run of material. This converter had the ability to solution coat onto paper and other substrates, blown films, and also adhesively laminate different layers together. Layer 2 (the PVOH FROZEN 3A layer) and Layer 3 (the bio-ORMOCER® layer) were coated onto the paper layer at Jura-Plast GmbH/Jura-Tech GmbH. They then sent the roll of substrate to a third party metallizer ROWO Coatings GmbH (Baden-Wurttemberg, Germany) to apply the aluminum vapor-deposited layer. The roll of substrate was then sent back to Jura-Plast GmbH/Jura-Tech GmbH and then returned to P&G for additional testing. This material has been useful for generation of samples with different sealant layers.

TABLE 25

Example 9 Structure Details for Laminates Constructed at a Combination of Jura-Plast GmbH/Jura-Tech GmbH and ROWO Coatings GmbH ID#
HPX - KOTH-IS-1 nil-adhesive and nil-sealant layer
Layer #

| | 1 | 2 | 3 | 4 |
|---|---|---|---|---|
| Material | PackPro 7.0 Paper (Sized) | PVOH (FROZEN 3A recipe) | Bio-ORMOCER® | Aluminum |
| Purpose | Main Substrate Base Layer - Biodegradable and Recyclable in paper stream | Lamination Layer - Soluble and Biodegradable. Helps paper layer separate quickly from barrier layers during repulping or biodegradation. | 1$^{st}$ Biodegradable Primer Layer - Support layer for aluminum | Inorganic Barrier Layer - Barrier to moisture, oxygen, perfume, grease etc. |
| Basis Weight | 80 gsm | 33.6 gsm for both PVOH and Bio-ORMOCER® together (could not differentiate between them) | 33.6 gsm for both PVOH and Bio-ORMOCER® together (could not differentiate between them) | 80 nm |
| Thickness (Dry) | 62 μm | 28 μm for both PVOH and Bio-ORMOCER® together (could not differentiate between them) | 28 μm for both PVOH and Bio-ORMOCER® together (could not differentiate between them) | 100 nm |
| Supplier | B&B | Jura-Plast GmbH/ Jura-Tech GmbH | Jura-Plast GmbH/ Jura-Tech GmbH | ROWO Coatings GmbH |
| Application Method | NA | Solution Coating via Gravure Roll | Solution Coating via Gravure Roll | Vapor Deposition |
| Number of Coating Layer Applications Used to Form Layer | 1 layer | 1 layer | 2 layers | 1 layer |

Making of Example 10-12: Biodegradable and Recyclable Barrier Paper Laminate Based on Paper, Polyvinyl Alcohol Lamination Layer, Bio-ORMOCER® Primer and an Aluminum Barrier with PBAT/TPS Blended Sealant Layers:

In the non-limiting embodiments for Examples 10-12 with PBAT/TPS blends as the sealant layers as described below, were prepared from Example 9, HPX-KOTH-IS-1 without adhesive and sealant layers. A compostable adhesive layer (Epotal CF 430 supplied by BASF) was coated onto the Example 9 material on the vacuum metalized aluminum layer and dried at 80° C. for 5 minutes; coat weights of 5 gsm were used for these samples. Films of PBAT blended with TPS that were obtained from BiologiQ were then laminated onto the structure at 80° C. in a benchtop laminator. The BiologiQ PBAT/TPS samples had 20-25 micron thickness and had different ratios of PBAT to TPS, 95:5, 90:10, and 75:25. The samples are designated BQ PBAT/TPS (5%), BQ PBAT/TPS (10%), and BQ PBAT/TPS (25%), and were Examples 10, 11 and 12, respectively.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of producing a biodegradable and recyclable barrier paper laminate comprising:
   a) applying a first aqueous system of a water-borne biodegradable polymeric composition onto a biodegradable and recyclable paper layer;
   b) removing the water from the first aqueous system of a water-borne biodegradable polymeric composition to produce a first biodegradable polymeric layer;
   c) applying a first liquid system of a biodegradable primer composition onto the first biodegradable polymeric layer;
   d) applying heat to remove liquid from the first liquid system of a biodegradable primer composition to produce a first biodegradable primer layer;
   e) applying a vapor deposited continuous layer of an inorganic barrier onto the first biodegradable primer layer;
   f) applying a second liquid system of a biodegradable primer composition onto the vapor deposited inorganic barrier layer;
   g) applying heat to remove liquid from the second liquid system of a biodegradable primer composition to produce a second biodegradable primer layer.

2. The method of claim 1, wherein the biodegradable and recyclable paper layer is machine glazed.

3. The method of claim 1, wherein the biodegradable and recyclable paper layer comprises at least one of vellum paper or glassine paper.

4. The method of claim 1, further comprising:
   h) applying a second aqueous system of a water-borne biodegradable polymeric composition onto the inner surface of the second biodegradable primer layer; and
   i) removing the water from the second aqueous system of the water-borne biodegradable polymeric composition to produce a second biodegradable polymeric layer.

5. The method of claim 1, further comprising:
   h) producing a film made from a biodegradable polymeric composition that is made by at least one of: solution casing, thermal cast film extrusion or thermal blown film extrusion; and
   i) applying said film made from a biodegradable polymeric composition onto the second biodegradable primer layer and heat laminating them together to form the second biodegradable polymeric layer.

6. The method of claim 1, further comprising:
   h) applying a biodegradable adhesive to the second biodegradable primer layer;
   i) producing a film made from a biodegradable polymeric composition that is made by at least one of: solution casing, thermal cast film extrusion or thermal blown film extrusion; and
   j) applying said film made from a biodegradable polymeric composition onto the surface of the biodegradable adhesive to form the second biodegradable polymeric layer.

7. A method of producing a biodegradable and recyclable barrier paper laminate comprising the following steps:
   a) applying a first aqueous system of a water-borne biodegradable polymeric composition onto a biodegradable and recyclable paper layer;
   b) removing water from the first aqueous system of a water-borne biodegradable polymeric composition to obtain a first biodegradable polymeric layer;
   c) applying a first liquid system of a biodegradable primer composition onto the first biodegradable polymeric layer;
   d) removing liquid from the first system of a water-borne biodegradable primer composition to obtain a first biodegradable primer layer;
   e) applying a vapor deposited continuous layer of an inorganic barrier onto the inner surface of the first biodegradable primer layer.

8. The method of claim 7, wherein the biodegradable and recyclable paper layer is machine glazed.

9. The method of claim 7, wherein the biodegradable and recyclable paper layer comprises at least one of vellum paper or glassine paper.

10. The method of claim 7, wherein removing liquid from the first system of a water-borne biodegradable primer composition to obtain a first biodegradable primer layer is done using heat.

11. The method of claim 7, further comprising the steps of:
    f) applying a biodegradable adhesive to the inner surface of the inorganic barrier layer;
    g) separately obtaining a film made from a biodegradable polymeric composition that can be made by a variety of methods including solution casing, thermal cast film extrusion and thermal blown film extrusion; and
    h) applying said film made from a biodegradable polymeric composition onto the surface of the biodegradable adhesive to form the second biodegradable polymeric layer.

12. A method of producing a biodegradable and recyclable barrier paper laminate comprising:
    a) applying a first aqueous system of a water-borne biodegradable polymeric composition onto a biodegradable and recyclable paper layer;
    b) removing the water from the first aqueous system of a water-borne biodegradable polymeric composition to produce a first biodegradable polymeric layer;
    c) applying a first liquid system of a biodegradable primer composition onto the first biodegradable polymeric layer;
    d) applying heat to remove the liquid from the first system of a biodegradable primer composition to produce a first biodegradable primer layer;
    e) applying a vapor deposited continuous inorganic barrier layer onto the first biodegradable primer layer;
    f) applying a second liquid system of a biodegradable primer composition onto the vapor deposited inorganic barrier layer;
    g) applying heat to remove the liquid from the second system of a biodegradable primer composition to produce a second biodegradable primer layer;
    h) applying a corona treatment to the surface of the second biodegradable primer layer;
    i) providing a film made from a biodegradable polymeric composition; and
    j) applying said film made from a biodegradable polymeric composition onto the second biodegradable primer layer and heat laminating them together to form a second biodegradable polymeric layer.

13. The method of claim 12, wherein the biodegradable and recyclable paper layer is machine glazed.

14. The method of claim 12, wherein the biodegradable and recyclable paper layer comprises at least one of vellum paper or glassine paper.

15. The method of claim 12, wherein the film is produced by at least one of solution casing, thermal cast film extrusion, or thermal blown film extrusion.

* * * * *